(12) United States Patent
Shim et al.

(10) Patent No.: US 8,090,280 B2
(45) Date of Patent: Jan. 3, 2012

(54) COLOR REGISTRATION APPARATUS AND METHOD, IMAGE FORMING APPARATUS EMPLOYING THE SAME APPARATUS, AND IMAGE OUTPUT METHOD OF THE IMAGE FORMING APPARATUS

(75) Inventors: Woo-jung Shim, Suwon-si (KR); Seock-deock Hong, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 902 days.

(21) Appl. No.: 11/960,967

(22) Filed: Dec. 20, 2007

(65) Prior Publication Data

US 2008/0193151 A1  Aug. 14, 2008

(30) Foreign Application Priority Data

Feb. 8, 2007  (KR) ........................ 10-2007-0013172

(51) Int. Cl.
*G03G 15/00* (2006.01)
(52) U.S. Cl. .............. 399/49; 399/40; 399/41; 399/394; 399/395
(58) Field of Classification Search .................... 399/40, 399/41, 49, 394, 395
See application file for complete search history.

(56) References Cited

U.S. PATENT DOCUMENTS

| | | |
|---|---|---|
| 2002/0181021 A1 | 12/2002 | Stephens |
| 2003/0202810 A1 | 10/2003 | Udaka et al. |
| 2006/0013603 A1 * | 1/2006 | Matsuyama .................... 399/49 |
| 2006/0289813 A1 | 12/2006 | Jeong et al. |

FOREIGN PATENT DOCUMENTS

| | | |
|---|---|---|
| EP | 0 998 128 A2 | 5/2000 |
| JP | 56-88041 | 7/1981 |
| JP | 57-145750 | 9/1982 |
| JP | 63-134276 | 6/1988 |
| JP | 5-338859 | 12/1993 |
| JP | 10-126611 | 5/1998 |
| JP | 10-194526 | 7/1998 |
| JP | 10-210228 | 8/1998 |
| JP | 2000-275915 | 10/2000 |
| KR | 1994-11208 | 6/1994 |
| KR | 10-2000-00277725 | 5/2000 |
| KR | 2004-110501 | 12/2004 |
| KR | 2005-39890 | 5/2005 |

OTHER PUBLICATIONS

European Search Report issued Mar. 8, 2011 in EP Application No. 08 15 1119.8.
Korean Office Action issued Apr. 16, 2011 in KR Application No. 10-2007-0013172.

* cited by examiner

*Primary Examiner* — Ryan Walsh
(74) *Attorney, Agent, or Firm* — Stanzione & Kim, LLP

(57) ABSTRACT

A color registration apparatus that independently forms images of predetermined respective colors and compensates a mis-registration between the overlapped images of respective colors employed in an image forming apparatus of forming a color image by overlapping the images of respective colors, includes a detecting unit to detect a contour form and positional information of respective color patterns formed on an image transfer path by the image forming apparatus proportional to a corresponding format of a printing medium where the color image will be transferred, and a controller to compensate a mis-registration between the overlapped images of respective colors through based on data detected by the detecting unit.

43 Claims, 30 Drawing Sheets

COLOR REGISTRATION APPARATUS AND METHOD, IMAGE FORMING APPARATUS EMPLOYING THE SAME APPARATUS, AND IMAGE OUTPUT METHOD OF THE IMAGE FORMING APPARATUS

CROSS-REFERENCE TO RELATED APPLICATIONS

This application claims priority from Korean Patent Application No. 10-2007-0013172 filed on Feb. 8, 2007 in the Korean Intellectual Property Office, the disclosure of which is incorporated herein by reference in its entirety.

BACKGROUND OF THE INVENTION

1. Field of the Invention

The present inventive concept relates to an apparatus and method that forms images based on a detection of characteristics of the fed printing medium (for example, size, skew and/or shift of the printing medium) and/or based on a detection of detection patterns.

2. Description of the Related Art

A printer may use printing medium of different standard formats and may be equipped with at least one printing medium feed unit that loads the printing medium. The printing medium feed unit may include a cassette on which a standard format printing medium is loaded and a multipurpose tray on which a printing medium of a nonstandard format may be loaded. The printer receives the printing medium from the printing medium feed unit for a printing image.

However, the printing medium may have a format different from the expected format set by the user during a print job. For example, a printing medium having a size smaller than the print image may have been loaded into the cassette, unknown to the user setting the print job for the print image. When the image is printed on the loaded printing medium, portions of the printing image will be missing. In addition to the waste of the unwanted printed image, the inside the image forming apparatus is undesirably polluted as a result of the printing operations exterior to the printing medium.

Also, when the printing medium is fed, the printing medium may be skewed during its transport. Here again, a part of the printed image may fail to align with the printing medium thus obtaining similar poor results; the printed printing medium may become useless since the print image is not properly printed and undesirable contamination of the interior of the image forming apparatus may occur.

In order to solve the mentioned problem in feeding the printing medium, various arts of detecting a state of feeding have been introduced. The published examples are, a method controlling an image forming timing by detecting a leading edge of the printing medium and a method using a detected width of the printing medium for image forming.

Especially, the present applicant has disclosed an apparatus and a method detecting the feeding state of the printing medium through United States Patent Publication No. US 2006/0289813 A1 (published date: Dec. 28, 2006, titled of "PAPER DETECTION APPARATUS AND PRINTING METHOD") including detecting a way of feeding a printing medium, a printing medium size and a printing medium skew, to prevent a printing error owing to disagreement between the printing medium size and an image size, and the skew of the printing medium.

Further, in an electro-photographic color image forming apparatus, particularly, in a single path electro-photographic color image forming apparatus, a color registration method to align overlapped color images has been suggested to solve a misalignment problem of color images of respective colors when forming a full color image. However, conventional methods of color registration demands a complex arithmetical operation and/or has a problem of being sensitive to an error produced by a noise component in a registration mark.

SUMMARY OF THE INVENTION

The present inventive concept provides a color registration apparatus and method to improve a configuration for compensating a registration between overlapped color images, and an image forming apparatus and an image output method employing the color registration apparatus and its method in consideration of the mentioned problems.

Additional aspects and utilities of the present general inventive concept will be set forth in part in the description which follows and, in part, will be obvious from the description, or may be learned by practice of the general inventive concept.

Also, the forgoing and/or other aspects and utilities of the present general inventive concept provide an image output method based on information acquired through the medium detecting device about a fed printing medium to optimally transfer a developed image on a photosensitive body to a printing medium.

The foregoing and/or other aspects and utilities of the present inventive concept can be achieved by providing a color registration apparatus that independently forms images of predetermined respective colors and compensates a registration between the overlapped images of respective colors employed in an image forming apparatus of forming a color image by overlapping the images of respective colors, including a detecting unit to detect a contour form information and a positional information of respective color patterns formed on an image transfer path by the image forming apparatus proportional to a corresponding format of a printing medium where the color image will be transferred, and a controller to compensate a registration between the overlapped images of respective colors through feed backing an extent of a mis-registration based on data detected by the detecting unit.

Each test pattern may include a first edge corresponding to a top edge part of the printing medium and a second edge corresponding to one side edge of the printing medium.

The detecting unit may include a light source to radiate a light, and a plurality of light receiving elements arranged larger than a maximum permitted width of the printing medium across in a width direction of the test color patterns, and detects the contour form information, the skew quantity and the shift quantity of each test pattern through selectively receiving the light radiated from the light source depending on an interference of each test pattern.

The color patterns may be separately formed on opposite side edges along the image transfer path, and the detecting unit is separately formed to correspond with the separated test patterns on the opposite side edges along the image transfer path.

The plurality of light receiving elements may have same size with each other and are separated from each other by a constant interval.

The color registration apparatus may further include a discriminating unit which discriminates whether there is a mis-registration and an extent of the mis-registration based on the data detected in the detecting unit.

The discriminating unit may include a memory to store the contour form information of the respective color test patterns, and a counter to calculate a transfer time between the respective color patterns, and determines the color registration between the respective color patterns through comparing information on the respective color patterns detected by the detecting unit and the counter and the information of the respective color patterns stored in the memory.

Each color pattern may include a first test color pattern corresponds to a leading edge and opposites side edges at the leading edge of the printing medium, and a second test color pattern corresponds to a trailing edge and opposites side edges at the trailing edge of the printing medium.

The foregoing and/or other aspects and utilities of the present inventive concept may also be achieved by providing a method of a color registration that independently forms images of predetermined respective colors and compensates a mis-registration between the overlapped images of respective colors employed in an image forming apparatus of forming a color image by overlapping the images of respective colors, the method including forming respective color patterns on an image transfer path proportional to a corresponding format of a printing medium where the color image will be transferred, detecting a contour form information of each test pattern, and compensating the color registration through feed backing based on the detected contour form information of the fed printing medium.

Detecting the contour form information of each test pattern may include radiating a light, outputting a signal after receiving the radiated light through a plurality of light receiving elements which are arranged longer than a maximum permitted width of the printing medium across in a width direction of the fed printing medium in every predetermined time interval dependent on an existence of the respective test color patterns, and recognizing the contour form information of the respective test color patterns using the output signal.

The method of the color registration may further include discriminating whether there is a mis-registration and an extent of the mis-registration based on detected data.

Discriminating may include determining the sizes of the respective color test patterns, determining the skew quantities of the respective color test patterns, and determining the shift quantities of the respective color test patterns.

Determining the sizes of the respective color test patterns may include calculating widths of the respective color test patterns with the output signal from the detecting of the respective color test patterns contour form information, and calculating sizes of the respective color test patterns by an arithmetic operation with a pass time of the respective test patterns at a location of the detecting unit and a predetermined moving speed of the image transfer path.

Determining the sizes of the respective test color patterns may include determining a moving direction of the respective color test patterns, calculating widths of the respective color test patterns with the output signal from the detecting of the contour form information of the fed printing medium, storing formats of the respective color test patterns, and deciding formats of the respective color test patterns through comparing the widths of the respective color test patterns and preset formats.

Calculating the widths of the respective test color patterns with the output signal may satisfy following equations: $P_{width}=\sqrt{X^2+Y^2}$; $X=(i\_ccw-i\_cw)\times(w+d)+m$; and $Y=f\times V\times T$ where i_cw is an index value of the light receiving element disposed at a location which first meets a vertex of each test pattern and i_ccw is an index value of the light receiving element disposed at a location which meets an opposite other vertex of each test pattern, w is the width of the light receiving element, d is the interval between the light receiving elements, m is a margin that compensates to consider when the edge of each test pattern covers one light receiving element or the interval, f is a number of counts counted during an entering of the test pattern from the first entering of a vertex of the test pattern till the last entering of the other vertex of the test pattern, V is a moving speed of each test pattern, and T is a detecting period of the light receiving element.

The plurality of light receiving elements may be separated from their adjacent light receiving elements by a predetermined interval, and the determining the sizes of the respective test patterns further includes deciding vertex positions of leading edges of the respective test patterns when the vertexes of the respective test patterns enter the interval between the adjacent light receiving elements.

Deciding the vertex positions may include storing an output pattern transition of the light receiving elements in a lookup table according to the skew quantity, storing sensing values detected in the light receiving elements in a periodic time interval, deciding the skew quantity by comparing the sensing values detected by the light receiving elements with the pattern stored in the lookup table, calculating a first line extended straight from the leading edge of each test pattern and a second line extended straight from one side edge of each test pattern, and calculating the vertex position of the leading edge of each test pattern from an intersection point of the first line and the second line.

Determining the skew quantities of the respective test patterns may include storing numbers of counts from a time when the respective test patterns are first detected until two opposite side edges of the respective test color patterns are detected, deciding whether the respective test color patterns are skewed according to which light receiving element among the plurality of light receiving elements first detects the respective test color patterns, storing index values of the light receiving elements disposed at locations which first meet vertexes of the respective test patterns and index values of the light receiving elements disposed at locations which meet opposite other vertexes of the respective test patterns, and calculating the skew quantities through comparing the numbers of counts and the stored index values stored.

The skew quantities may satisfy following equations: Skew quantity=$\arctan(Y/X)$; $X=(i\_ccw-i\_cw)\times(w+d)+m$; and $Y=f\times V\times T$ where i_cw is an index value of the light receiving element disposed at locations which first meet vertexes of the respective test color patterns and i_ccw is an index value of the light receiving element disposed at locations which meet opposite other vertexes of the respective test color patterns, w is the width of the light receiving element, d is the interval between the light receiving elements, m is a margin that compensates to consider when the edges of the respective test color patterns cover one light receiving element or the interval, f is a number of counts counted during an entering of the test pattern from the first entering of a vertex of the test pattern till the last entering of the other vertex of the test pattern, V is a moving speed of the respective test color patterns, and T is a detecting period of the light receiving element.

Determining the skew quantities of the respective test patterns further includes discerning whether the skew quantities are changed while transferring the respective test patterns, and calculating the skew quantities at a predetermined target location if the skew quantities change.

Determining the shift quantities of the respective test patterns includes deciding which light receiving elements among the plurality of the light receiving element located at left and right parts of leading edges of the respective test color patterns detect the respective test color patterns, storing the output values from the corresponding light receiving elements respectively located at the left and right top boundaries of the respective test color patterns in first indexes (i_cw) and second indexes (i_ccw), and calculating the shift quantities of the respective test color patterns at locations of the light receiving elements through comparing the stored values in the first indexes and the second indexes.

The shift quantities may satisfy the following equation: shift quantity=[(i_cw+i_ccw)/2−i_cnt]×(w+d)+m where w is the width of each light receiving element, d is an interval between each light receiving element, m is a margin and i_cnt is an index value at a center. If the shift quantity from equation (3) is negative, each test color pattern is shifted to left side, and if the shift quantity from equation (3) is positive, each test color pattern is shifted to right side.

Determining the shift quantities of the respective test patterns may further include discerning whether the shift quantities are changed while transferring the respective test color patterns, and calculating the shift quantities at a predetermined target location if the shift quantities changes.

The foregoing and/or other aspects and utilities of the present inventive concept may also be achieved by providing an image forming apparatus that independently forms images of predetermined respective colors and forms a color image by overlapping the images of respective colors, including an image forming unit to form respective color patterns formed on an image transfer path proportional to a corresponding format of a fed printing medium where the color image will be transferred, and a color registration apparatus.

Each test pattern may include a first edge corresponding to a top edge part of the printing medium and a second edge corresponding to one side edge of the printing medium.

The detecting unit may include a light source to radiate a light, and a plurality of light receiving elements arranged larger than a maximum permitted width of the printing medium across in a width direction of the test color patterns, and detects the contour form information, the skew quantity and the shift quantity of the test color patterns through selectively receiving the light radiated from the light source depending on an interference of each test color pattern.

The plurality of light receiving elements may have same size with each other and are separated from each other by a constant interval.

The plurality of light receiving elements may have same size with each other and are separated from each other by a constant interval.

The image forming apparatus may further include a discriminating unit to discriminate whether there is a mis-registration and an extent of the mis-registration based on data detected in the detecting unit.

The discriminating unit may include a memory to store the contour form information of respective test color patterns, and a counter to calculate a transfer time between the respective test color patterns, determines the color registration between the respective color patterns through comparing information on the respective color patterns detected by the detecting unit and the counter and the information of the respective color patterns stored in the memory.

Each color patterns may include a first test color pattern corresponds to a leading edge and opposites side edges at the leading edge of the printing medium, and a second test color pattern corresponds to a trailing edge and opposites side edges at the trailing edge of the printing medium.

The image forming apparatus may further include a user interface unit to inform a user whether sizes of the respective test color patterns accord with preset formats.

The foregoing and/or other aspects and utilities of the present inventive concept may also be achieved by providing a method of image outputting of an image forming apparatus that independently forms images of predetermined respective colors and forms a color image by overlapping the images of respective colors, the method including outputting an image compensated by the color registration method.

Detecting the contour form information of each test pattern may include radiating a light, outputting a signal after receiving the radiated light through a plurality of light receiving elements which are arranged longer than a maximum permitted width of the printing medium across in a width direction of the fed printing medium in every predetermined time interval dependent on an existence of the respective test color patterns, and recognizing the contour form information of the respective test color patterns using the output signal.

The method of image outputting of the image forming apparatus may further include discriminating whether there is a mis-registration and an extent of the mis-registration based on detected data.

Discriminating may include determining the sizes of the respective test color patterns, determining the skew quantities of the respective test color patterns, and determining the shift quantities of the respective test color patterns.

Determining the sizes of the respective test color patterns may include calculating widths of the respective test color patterns with the output signal from the detecting of the respective test color patterns contour form information, and calculating respective sizes of the respective test color patterns by an arithmetic operation with a pass time of the respective test color patterns at a location of the detecting unit and a predetermined speed of the image transfer path.

Determining the sizes of the respective test color patterns may include determining a moving direction of the respective test patterns, calculating widths of the respective test color patterns with the output signal from the detecting of the contour form information of the respective test color patterns, and deciding sizes of the respective test color patterns through comparing the widths of the respective test color patterns and preset formats.

Calculating the widths of the respective test color patterns with the output signal may satisfy following equations: $P_{width}=\sqrt{X^2+Y^2}$; $X=(i\_ccw-i\_cw)\times(w+d)+m$; and $Y=f\times V\times T$ where i_cw is an index value of the light receiving element disposed at a location which first meets a vertex of each test color pattern and i_ccw is an index value of the light receiving element disposed at a location which meets an opposite other vertex of each test color pattern, w is the width of the light receiving element, d is the interval between the light receiving elements, m is a margin that compensates to consider when the edge of each test pattern covers one light receiving element or the interval, f is a number of counts counted during an entering of the test pattern from the first entering of a vertex of the test pattern till the last entering of the other vertex of the test pattern, V is a moving speed of each test pattern, and T is a detecting period of the light receiving element.

The plurality of light receiving elements may be separated from their adjacent light receiving elements by a predetermined interval, and the determining the sizes of the respective test color patterns further includes deciding vertex positions of leading edges of the respective test color patterns when the vertexes of the respective test color patterns enter the interval between the adjacent light receiving elements.

Deciding the vertex position may include storing an output pattern transition of the light receiving elements in a lookup table according to the skew quantity, storing sensing values detected in the light receiving elements in a periodic time interval, deciding the skew quantity by comparing the sensing values detected by the light receiving elements with the pattern stored in the lookup table, calculating a first line extended straight from the leading edge of each test pattern and a second line extended straight from one side edge of each test pattern, and calculating the vertex position of the leading edge of each test color pattern from an intersection point of the first line and the second line.

Determining the skew quantities of the respective test color patterns may include storing numbers of counts from a time when the respective test color patterns are first detected until two opposite side edges of the respective test color patterns are detected, deciding whether the respective test color patterns are skewed according to which light receiving element among the plurality of light receiving elements first detects the respective test color patterns, storing index values of the light receiving elements disposed at locations which first meet vertexes of the respective test color patterns and index values of the light receiving elements disposed at locations which meet opposite other vertexes of the respective test color patterns, and calculating the skew quantities through comparing the numbers of counts and the stored index values stored.

The skew quantities may satisfy the following equations: Skew quantity=$\arctan(Y/X)$; $X=(i\_ccw-i\_cw)\times(w+d)+m$; $Y=f\times V\times T$ where $i\_cw$ is an index value of the light receiving element disposed at locations which first meet vertexes of the respective test color patterns and $i\_ccw$ is an index value of the light receiving element disposed at locations which meet opposite other vertexes of the respective test color patterns, w is the width of the light receiving element, d is the interval between the light receiving elements, m is a margin that compensates to consider when the edges of the respective test patterns cover one light receiving element or the interval, f is a number of counts counted during an entering of the test pattern from the first entering of a vertex of the test pattern till the last entering of the other vertex of the test pattern, V is a moving speed of the respective test color patterns, and T is a detecting period of the light receiving element.

Determining the skew quantities of the respective test color patterns may further include discerning whether the skew quantities are changed while transferring the respective test color patterns, and calculating the skew quantities at a predetermined target location if the skew quantities change.

Determining the shift quantities of the respective test color patterns may include deciding which light receiving elements among the plurality of the light receiving element located at left and right parts of leading edges of the respective test color patterns detect the respective test color patterns, storing the output values from the corresponding light receiving elements respectively located at the left and right top boundaries of the respective test color patterns in first indexes ($i\_cw$) and second indexes ($i\_ccw$), and calculating the shift quantities of the respective test color patterns at locations of the light receiving elements through comparing the stored values in the first indexes and the second indexes.

The shift quantities may satisfy the following equation: shift quantity=$[(i\_cw+i\_ccw)/2-i\_cnt]\times(w+d)+m$ where w is the width of each light receiving element, d is an interval between each light receiving element, m is a margin and $i\_cnt$ is an index value at a center. If the shift quantity from equation (6) is negative, each test color pattern is shifted to left side, and if the shift quantity from equation (6) is positive, each test color pattern is shifted to right side.

Determining the shift quantities of the respective test patterns may further include discerning whether the shift quantities are changed while transferring the respective test patterns, and calculating the shift quantities at a predetermined target location if the shift quantities changes.

The foregoing and/or other aspects and utilities of the present inventive concept may also be achieved by providing a method of aligning images formed by an image forming apparatus having at least first and second printing units separated along an image transfer path, the method comprising printing a first test pattern by the first printing unit at a first location on the image transfer path, printing a second test pattern by the second printing unit at a second location on the image transfer path, obtaining position information of a position of at least a part of each of the first and second test patterns, determining a misalignment amount between the first and second test patterns based on the detected positions, printing a composite image by superimposing a first image of the first printing unit and a second image of the second printing unit using the misalignment amount to adjust at least one of the first and second images.

The foregoing and/or other aspects and utilities of the present inventive concept may also be achieved by providing an image forming apparatus, comprising a transfer path on which a printing medium is transferred along a transfer direction, first and second printing units located at different locations along the transfer path to print a respective image on the printing medium, a plurality of sensors extending across the transfer path downstream of the first and second printing units with respect to the transfer direction, the plurality of sensors positioned to sense images of the first and second printing units, and a controller adjusting a printing operation of the first and second printing units when output signals of the plurality of sensors indicate that a test pattern image printed by the first or second printing unit does not correspond to an expected position.

BRIEF DESCRIPTION OF THE DRAWINGS

The above and/or other aspects and utilities of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Figure 1:
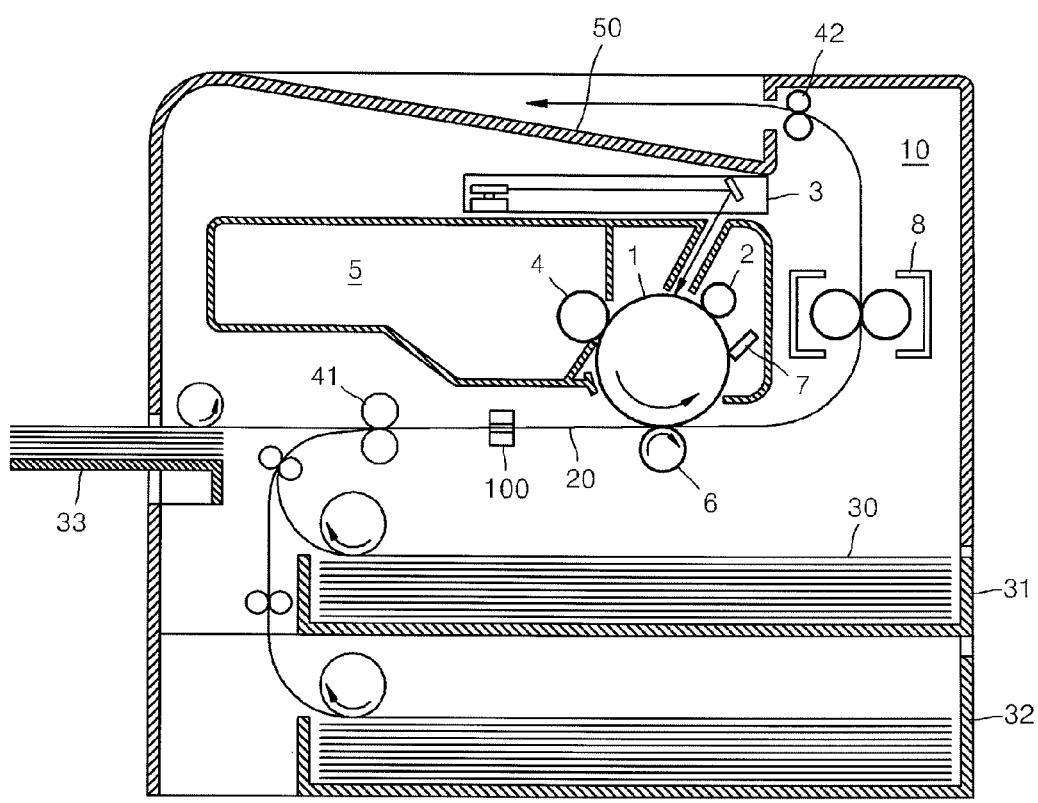
FIG. 1 is an image forming apparatus employing a medium detecting device according to an exemplary embodiment.

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

FIG. 1 illustrates one example of an image forming apparatus employing a medium detecting device 100 according to an exemplary embodiment of the present general inventive concept.

Referring to FIG. 1, the image forming apparatus according to the exemplary embodiment of the present general inventive concept is equipped with an image forming unit 10 that prints an image on a printing medium 30 by electro-photographic method, printing medium feed units 31, 32 and 33, and a medium detecting device 100.

The image forming unit 10 includes a photosensitive body 1, a charger 2, an exposure unit 3, a development roller 4 and toner chamber 5 comprising a development unit (4 and 5), a transfer unit 6, a cleaning blade 7 and a fusing unit 8. The maximum size of the printing medium 30 used by the image forming unit 10 is limited by the physical size of the image forming unit 10.

The photosensitive body 1 of a cylindrical shape drum is formed with a photoconductive layer on its outer circumferential surface. The charger 2 may include a charge roller of a structure as illustrated or a corona discharger (not shown). The charger 2 may be disposed to contact or be spaced away from the photosensitive body 1 and supplies a charge to the photosensitive body 1 to charge the outer circumferential surface of the photosensitive body 1 to have a uniform electrical potential level.

The exposure unit 3 forms an electro-static latent image by selectively radiating light corresponding to image information on the photosensitive body 1. The exposure unit 3 may include, for example, a light scanning unit having a structure that can scan light radiated from a light source by a beam deflector.

The development unit includes a development roller 4 and a toner chamber 5 that accommodates a toner therein and develops a toner image in an area formed the electro-static latent image.

The development roller 4 may be rotated in contact with the outer circumferential surface of the photosensitive body 1 or may have a development gap separating it from the photosensitive body 1. Here, it is preferable but not necessary that the development gap is within a range of approximately several tens to several hundreds micrometers. The development roller 4 has a development bias voltage applied to it and supplies the toner accommodated in the toner chamber 5 to the electro-static latent image formed on the photosensitive body 1 to form the toner image.

The transfer unit 6 is disposed to face the photosensitive body 1 and transfers the toner image formed on the photosensitive body 1 to the printing medium 30.

The cleaning blade 7 removes a waste toner remaining on the photosensitive body 1 after transferring the toner image to the printing medium 30. The fusing unit 8 presses and heats up a non-fused toner image transferred by the transfer unit 6 on the printing medium 30 to fuse the image on the printing medium 30.

An image forming process of the image forming apparatus configured as mentioned may be as follows. First, the photosensitive body 1 is charged with the uniform electric potential. When a light signal corresponding to the screen image information is scanned by the exposure unit 3, an electro-static latent image is formed on the photosensitive body 1 surface as an electric potential level of the part of the photosensitive body 1 scanned by the light beam is decreased. Subsequently, the toner image is formed by attaching the toner on the electro-static latent image when the development bias voltage is applied to the development roller 4.

Further, the printing medium 30 drawn out from one of the printing medium feed units 31, 32 and 33 is transported to the image forming unit 10 through a medium transport path 20 with a predetermined transfer speed by a transfer roller 41.

The arrival of the printing medium 30 to a transfer nip (of the photosensitive body 1 and the transfer unit 6) is adjusted to correspond to the arrival of a leading edge of the toner image formed on the photosensitive body 1 at the transfer nip. Accordingly, when the transfer bias voltage is applied to the transfer unit 6, the toner image is transferred from the photosensitive body 12 to the printing medium 30. After the printing medium with the toner image passes the fusing unit 8, the printing of an image is completed by fusing the toner image on the printing medium 30 with heat and pressure. Then, the completed printing medium 30 is discharged by a discharge roller 42 to a discharge tray 50.

The image forming apparatus according to the exemplary embodiment includes an ink-jet type image forming apparatus instead of the electro-photographic type image forming apparatus described above. This ink-jet type image forming apparatus includes a cartridge including an inkjet head, a carriage transporting the cartridge and a cartridge driving unit. Because the configuration of ink-jet type image forming apparatuses are well known, their detailed explanation is omitted.

Hereinafter, a medium detecting device according to an exemplary embodiment will be explained in detail.

The printing medium feed units 31, 32 and 33 may be classified as a cassette type and a multi-purpose feeder type according to their shapes.

In FIG. 1, first and second printing medium feed units 31 and 32 of the cassette type are loaded with a printing medium having a standard format such as B4, B5, A4, A5, etc. The respective first and the second printing medium feed units 31 and 32 can selectively load the printing medium 30 of different standard formats by adjusting a medium guide (not shown) provided inside thereof according to side feeding or center feeding. Here, side feeding transports the printing medium 30 based on one end edge of the printing medium 30 vertical to its width direction as a transport reference. Center feeding transports the printing medium based on the center part of the printing medium 30 width as a transport reference.

A third printing medium feed unit 33 is a multi purpose feeder (MPF) to load not only printing mediums of standard formats, but also a medium of a nonstandard format. The third printing medium feed unit 33 is used to feed a printing medium 30 appropriate for printing an image having a size different from the standard formats of the printing medium 30 used in the first and the second printing medium feed units 31 and 32.

A method to feed the appropriate printing medium 30 for a desired image using the first, second and third printing medium feeding units 31, 32 and 33 described above may be as follows.

A user designates that the printing medium 30 is to be fed from one of the first, second or third printing medium feed units 31, 32 and 33 through an interface program of a computer connected to the image forming apparatus or a user interface tool of the image forming apparatus. At this time, printing medium designation information designating one of the printing medium feed units 31, 32 and 33 is stored in a built in memory (not shown) in the image forming apparatus. Then, the image is printed on the appropriate printing medium 30 fed from the first, second or third printing medium feed unit 31, 32 or 33 based on the stored printing medium designation information.

However, if a user loads a printing medium 30 in the first, second or third printing media feed unit 31, 32 and 33 different from the designation information stored in the memory, a poor printing may result.

For example, when the designation information designates the first, second and the third printing medium feed units 31, 32 and 33 to be loaded with the printing media 30 of standard formats A4, B4 and B5 respectively, the first, second and the third printing medium feed units 31, 32 and 33 may have in fact been loaded with the printing media 30 of standard formats B4, A4 and B5 respectively.

Then, if an image of the size A4 is desired to be printed, the B4 sized printing medium 30 may be drawn out from the first printing medium feed unit 31 in accordance with the stored designation information. This case will not cause a loss of the image since the standard format of the B4 printing medium 30 is larger than the A4 image size, but results in a waste in the printing medium 30 and a problem of printing on the printing medium size that a user does not want.

Further, if an image of the size B4 is to be printed, a printing medium 30 of size A4 smaller than B4 may be drawn out from the second printing medium feed unit 32 in accordance with the stored designation information. This case will cause a loss of the image since the standard format of the A4 printing medium 30 is smaller than the B4 image size and results not only a waste in the printing medium 30 but also a problem of polluting elements of the image forming apparatus.

A medium detecting device 100 according to an exemplary embodiment addresses the problem of feeding of an inappropriate printing medium 30 and to correctly control an operation of forming an image by detecting a feeding characteristic of the fed printing medium 30.

Figure 2:
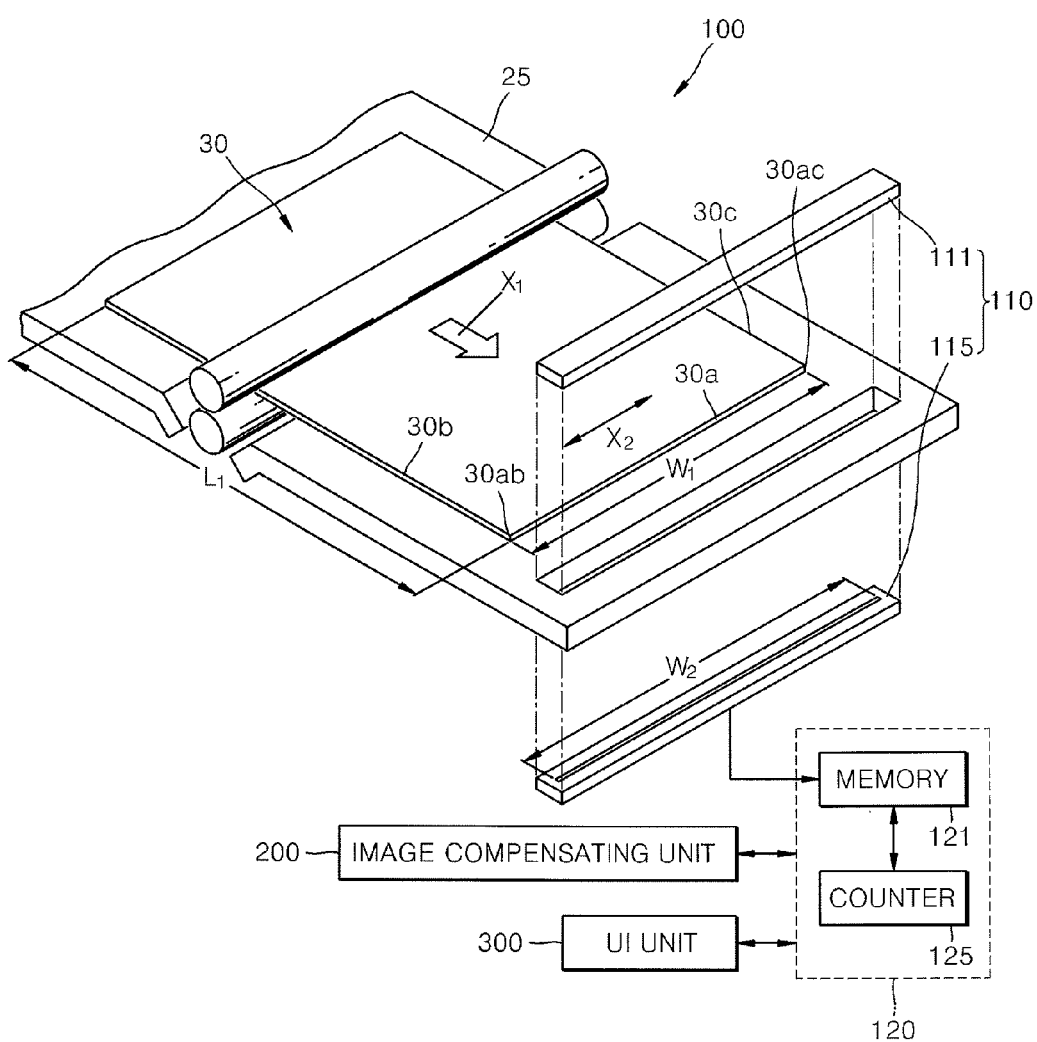
FIG. 2 is a schematic perspective view illustrating the medium detecting device according to the exemplary embodiment of FIG. 1.

Referring to FIGS. 1 and 2, the medium detecting device 100 according to an embodiment of the present general inventive concept includes a detecting unit 110 that detects a contour form of the printing medium 30 transported in a feeding direction (the $X_1$ direction indicated as an arrow in FIG. 2), and a discriminating unit 120 that determines a format of the printing medium 30 and a feeding position. Here, the contour form may not only be the overall appearance of the printing medium 30 but may also include a partial appearance of the printing medium 30. For example, the contour form may include the appearance of the overall printing medium 30 as illustrated, and/or the leading edge 30*a*, and/or a printing medium opposite side edges 30*b* and 30*c* of the printing medium 30 as well.

The detecting unit 110 is arranged across with the width $W_2$ larger than the maximum permitted width $W_1$ of the printing medium 30. In this embodiment, the printing medium is fed in its lengthwise direction, and thus the detecting unit 110 is arranged in a direction $X_2$ parallel to the width direction of printing medium 30. The detecting unit 110 is provided on a guide frame 25 which is provided in the medium transport path 20. Accordingly, a detecting error in detecting the size of the printing medium 30 can be reduced.

Figure 3:
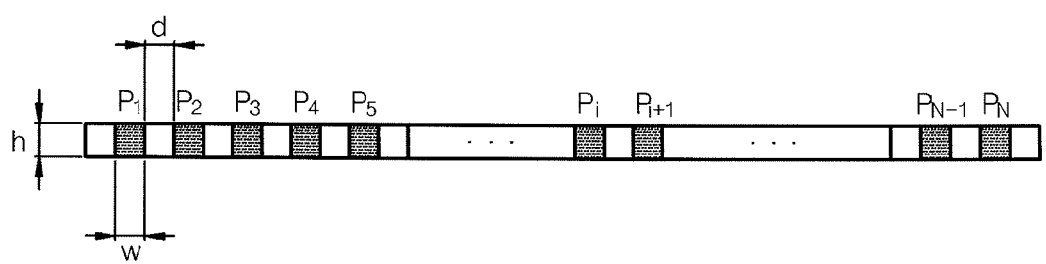
FIG. 3 is a schematic view illustrating a configuration of a detecting unit according to one exemplary embodiment.
Figure 4:
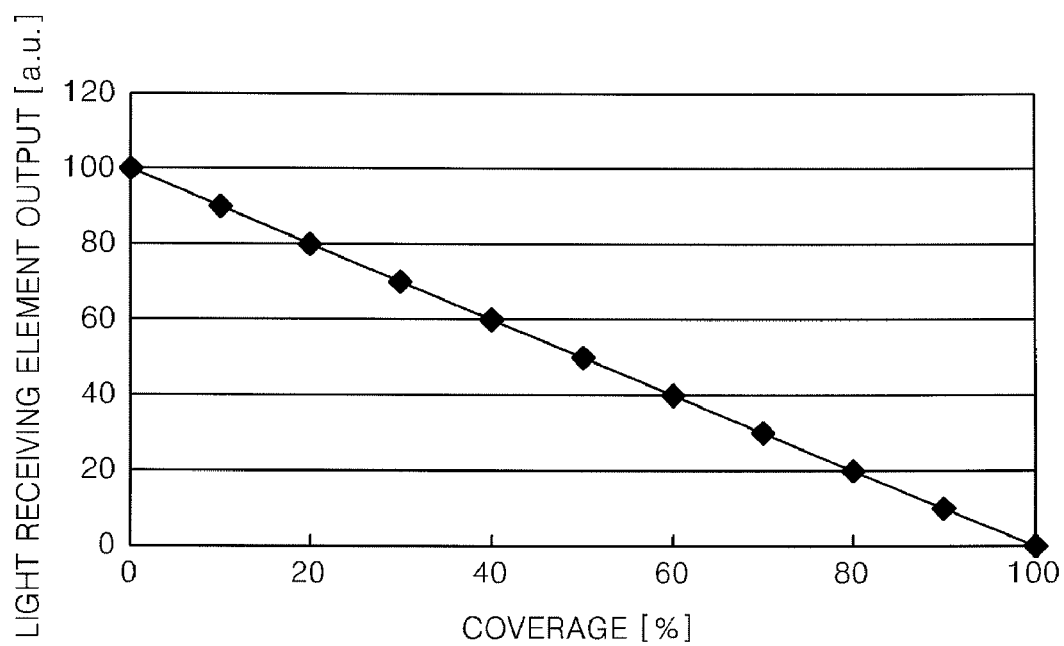
FIG. 4 is a graph illustrating an output of the detecting unit of FIG. 3 dependent on a coverage rate by a printing medium.

FIG. 3 illustrates a schematic configuration of the detecting unit 110 and FIG. 4 is a graph displaying an output of the detecting unit 110 dependent on a coverage rate by the printing medium 30.

Referring to FIG. 3, the detecting unit 110 includes a light source 111 (not shown) that radiates a light, a light receiving unit 115 that selectively detects the radiated light from the light source 111 dependent on an existence of the printing medium 30.

Here, the light receiving unit 115 as illustrated in FIG. 3, includes a plurality of the light receiving elements ($P_1$, $P_2$, ..., $P_i$, $P_{i+1}$, ..., $P_{n-1}$, $P_n$) consecutively arranged in one line along the print medium 30 width direction $X_2$. Then, position information of the printing medium 30 facing the plurality of the light receiving elements P may be detected.

Also, since the printing medium 30 is being fed on the frame guide 25 in the $X_1$ direction, the light receiving unit 115 can continuously detect the contour information of the printing medium 30 line by line. Accordingly, two-dimensional contour form information of the printing medium 30 including the width $W_1$, vertex positions 30*ab*, 30*ac* and the length $L_1$ may be detected in the form of an image. As a result, a size of the printing medium 30, a shift quantity and a skew quantity can be detected.

The medium detecting device according to the present exemplary embodiment may be configured with various kinds of devices for the light receiving elements P. For example, the light receiving elements P may include widely used photo sensors, solar cells, or be replaced by mechanical detecting devices, etc. It is preferred but not necessary that the light receiving elements ($P_1$, $P_2$, ..., $P_i$, $P_{i+1}$, ..., $P_{n-1}$, $P_n$) are of a same size with each other, as represented by the height h and the width w. It is also preferred but not necessary to be separated by a constant interval d.

The light source 111 may have a plurality of individual light sources to correspond with the light receiving elements P. Alternatively, the light source 111 may be configured in a stripe type lamp structure arranged in the direction $X_2$ along the width $W_1$ of the printing media 30. The light source 111 may alternatively be configured to include a bulb type lamp and an optical fiber guiding a light radiated from the bulb type lamp to the light receiving unit 115.

Also, the detecting unit 110 may instead detect the printing medium 30 by reflection. That is, the printing medium 30 may be detected through receiving the light reflected from the printing medium 30 by the light receiving unit 115. In this alternative, the light source 111 may be arranged adjacent to the light receiving unit 115.

Since the detailed configuration of the light source 111 and the light receiving unit 115 is known, a detailed description is omitted.

Referring back to the example illustrated in FIG. 2, the light source 111 and the light receiving unit 115 face each other with the medium transport path 20 interposed therebetween. The light from the light source 115 is radiated toward the light receiving unit 115 until the printing medium 30 enters the medium transport path 20 between the light source 111 and the light receiving unit 115. After the printing medium 30 enters this location, the light from the light source 111 is blocked by the printing medium 30. This change is reflected by an electrical signal (for example a current) output from the light receiving unit 115 and becomes reference information to calculate data for the printing medium 30 in the discriminating unit 120.

That is, since respective efficiencies of the plural light receiving elements ($P_1, P_2, \ldots, P_i, P_{i+1}, \ldots, P_{n-1}, P_n$) are not substantially different, a summed output signal may be a value corresponding to an area covered by the printing medium 30. In other words, an output value p of a detected signal satisfies the equation 1.

$$p = c \times A \qquad \text{Equation (1)}$$

where c is a proportional constant and A is total area of the light receiving unit 115 covered with the printing medium 30.

In calculating the output value p, an error from the interval d between the light receiving elements P may be reduced through narrowing the interval d and the output value p may be compensated by linearly interpolating the detected values of the adjacent light receiving elements P, respectively.

Referring to FIG. 4, the output from the plural light receiving elements ($P_1, P_2, \ldots, P_i, P_{i+1}, \ldots, P_{n-1}, P_n$) is plotted against and illustrated to be proportional to an area of the light incident to the light receiving unit 115. Here, the output of the light receiving unit 115 is 100 for the case that all of the light receiving elements fail to be covered by the printing medium 30 (coverage rate=0%). As illustrated, the output is reduced linearly with the increase of the coverage percentage until the output of the light receiving unit 115 becomes 0 for the case where all of the entire light receiving elements P are covered by the printing medium 30 (coverage rate=100%).

Here, the light receiving elements ($P_1, P_2, \ldots, P_i, P_{i+1}, \ldots, P_{n-1}, P_n$) are preferably arranged close to each other. In other words, the adjacent light receiving elements P are preferred to be arranged without any interval separating neighboring light receiving elements P or to be arranged with a predetermined interval which is less than the width w of the light receiving unit 115. Such arrangements increase the accuracy to detect the shift quantity and the skew quantity of the fed printing medium 30.

If the light from the light source 111 is not covered with the printing medium 30, the respective light receiving elements P ideally have a same output value (e.g., the same current output by each light receiving element P) since each light receiving element P receives the same amount of light. However, in fact, there may be a variation in the output values because of a difference in efficiencies of the light receiving elements P and/or a light interference by the diffraction of the radiated light. However, this variation may be taken into account. Hereinafter, an ideal case will be explained as an example.

The length of the detecting unit 110 resulting from the arrangement of the plural light receiving elements ($P_1, P_2, \ldots, P_i, P_{i+1}, \ldots, P_{n-1}, P_n$) is preferably determined by taking into account the acceptable shift quantity, skew quantity and maximum width of the printing medium 30 of the image forming apparatus.

The shift quantity means an amount the printing medium 30 deviates in a width direction from the regular medium transport path 20. For example, the shift quantity is represented as +5 mm if the printing medium 30 is shifted 5 mm to the right of a reference position indicating a normal transport path, and as −5 mm if it is shifted 5 mm to the left of the reference position.

Here, if the position of the printing medium 30 deviates beyond a permitted shift quantity during transport, some part of the printing medium 30 will fall outside an image forming area and the image will not be normally formed. A printing fault may be prevented through by presetting the permitted shift quantity in advance and determining whether the shift quantity measured by the medium detecting device 100 is within the permitted quantity.

The skew quantity means an amount the printing medium 30 rotates with respect to the advancing direction $X_1$ of the printing medium 30. Generally, the printing medium 30 is formed as a rectangle shape with vertices of right angles.

Normally, the leading edge 30a of the printing medium 30 should form a right angle to the printing medium 30 advancing direction. However, there may be a case that the leading edge 30a of the printing medium 30 is rotated by some angle during transport. For example, a clockwise 5° rotation of the leading edge 30a of the printing medium 30 may be represented as +5° and a counter clockwise 5° rotation as −5°. Here, the skew quantity may be measured with respect to the leading edge 30a of the printing medium 30 or the center line of the printing medium 30 advancing direction.

For the convenience in describing the exemplary embodiment, the shift quantity and the skew quantity are defined using the leftmost side edge 30c and the leading edge 30a as references respectively. The references are selected arbitrarily for the convenience of description, and as noted above, other portions of the printing medium 30 may be used as a reference for the shift and the skew quantities.

Even if the skew quantity varies in maximum range from −90° to +90°, the image formed on the photosensitive body 1 can rotate to correspond with the skew quantity to correctly form the image on the printing medium 30. Meanwhile, if the printing medium 30 is rarely transported with a skew quantity range in excess of ±45°, then, it is preferred but not necessary, to set a permitted skew quantity within a predetermined range considering the transport characteristic and loading capability after discharging the printing medium 30. Thus, permitted ranges of the shift quantity and the skew quantity should consider the size of the usable printing medium 30, especially the printing medium 30 width direction size, in designing the image forming apparatus.

Hereinafter, an available length S is used as a reference for designing the image forming apparatus (e.g., the length of the photosensitive body 1).

The available length S serving as a reference for designing the image forming apparatus may be determined from the maximum width $W_1$ of the printing medium 30, the total permitted shift quantity and the permitted skew quantity.

Figure 5:
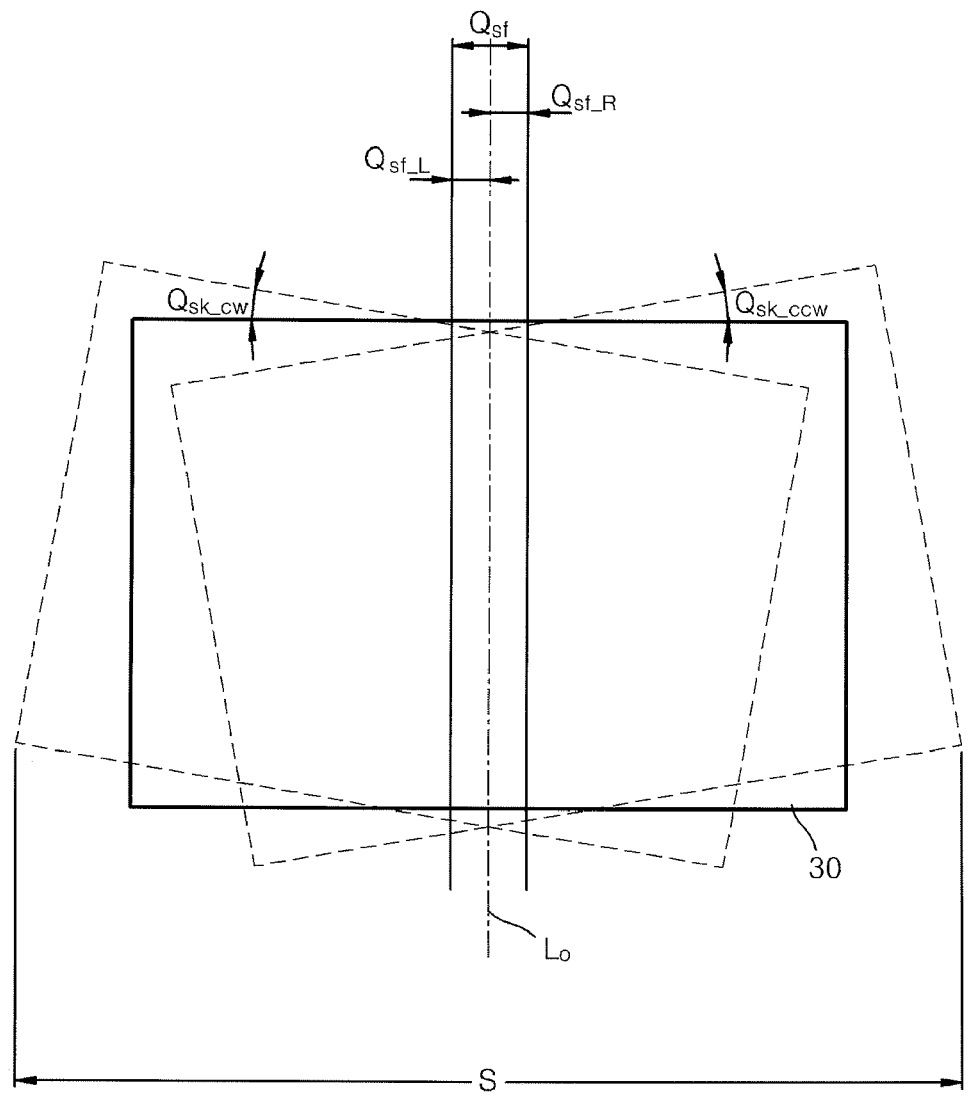
FIG. 5 is a view illustrating the printing medium and the width of a photosensitive body which is a reference for an inner design rule of the image forming apparatus by an available length S, a skew quantity and a shift quantity.

Referring to FIG. 5, a specific determination of the available length S is as follows.

For the convenience of description, the example contemplates the printing medium 30 of A4 standard format is set as a maximum possible standard format, the permitted shift quantity is 10% of the maximum width $W_1$ of the printing medium 30, the permitted skew quantity is ±10°, and the image forming apparatus is designed to feed the printing medium 30 in a center feeding manner to feed along a center line $L_0$ as a reference. Here, the available length S is a length summed with the maximum width $W_1$ and the maximum permitted shift quantity. The permitted skew quantity is restricted by the shift quantity of the printing medium 30.

The A4 standard format size is 210×297 mm², and since a landscape printing or a portrait printing are possible, the maximum printing width $W_1$ is 297 mm. The maximum permitted shifted quantity $Q_{sf}$ is 10% of the maximum width which is 29.7 mm. The shifted quantity is permitted in both right and left directions so right and left permitted shift quantities $Q_{sf\_R}$ $Q_{sf\_L}$ are 29.7/2=14.85 mm. The available length S is 326.7 mm (S=297+14.85×2).

Accordingly, if the available length S is 326.7 mm when designing the image forming apparatus according to the exemplary embodiment, the printing on the A4 printing medium 30 is possible if the printing medium 30 is transported within the total permitted shift quantity 29.7 mm (plus or minus 14.85 mm) and the skew quantity±10 degrees.

Referring to FIG. 2, the discriminating unit 120 includes a memory 121 that stores information on the format of the printing medium 30 and relative positions of the plural light receiving elements 115, and a counter 125 that is used to calculate a transport time required for the printing medium 30 to pass.

Information on respective positions of the light receiving elements ($P_1, P_2, \ldots, P_i, P_{i+1}, \ldots, P_{n-1}, P_n$) and the intervals between the light receiving elements P are stored through matching in an imaginary coordinate.

Accordingly, the discriminating unit 120 analyzes information of the exact positions and the format of the fed printing medium 30 through the detected signals of the respective light receiving elements P and the stored information in the memory 121. For example, a detecting signal of 0% of the light receiving unit 115 means the printing medium 30 fully covers the light receiving unit 115 while the detecting signal of 100% means the light receiving unit 115 is fully uncovered.

The counter 125 calculates the transporting time of the printing medium 30 between its leading edge 30a and the trailing edge.

Accordingly, the discriminating unit 120 compares the detected format information of the fed printing medium 30 from the detecting unit 110 with standard format information stored in the memory 121, and can determine the standard format of the fed printing medium 30. In other words, the discriminating unit 120 can determine the two dimensional contour form information including lengths in width and lengthwise directions of the printing medium 30 fed to the discriminating unit 120 and the fed position.

Figure 6A:
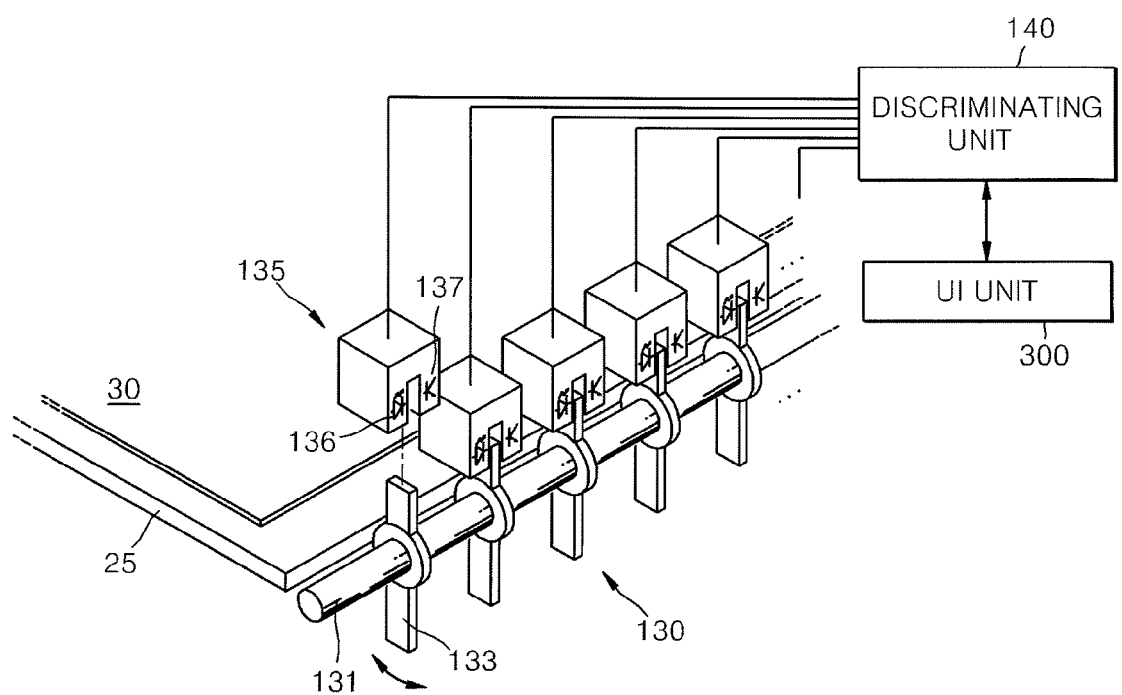
FIG. 6A is a schematic perspective view illustrating the medium detecting device according to another exemplary embodiment.
Figure 6B:
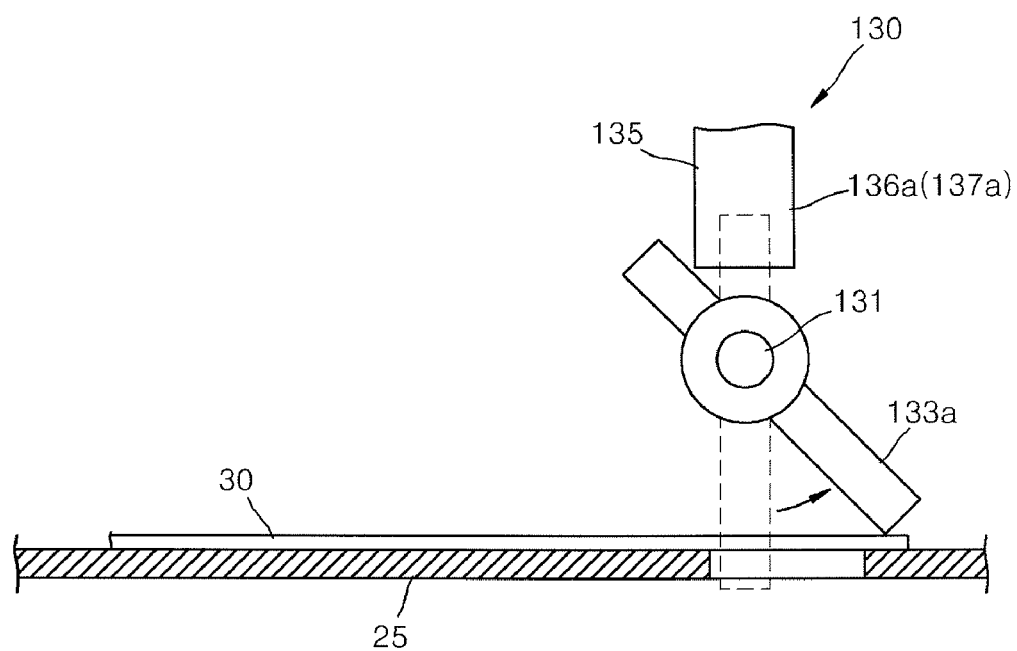
FIG. 6B is a view illustrating an arrangement of the detecting unit when an interference occurs by a printing medium.

FIG. 6A is a schematic perspective view illustrating a main part of a medium detecting device 100 according to another exemplary embodiment, and FIG. 6B is a view illustrating an arrangement of the medium detecting device 100 when a printing medium 30 is contacted.

Referring to FIGS. 6A and 6B, the medium detecting device 100 according to the additional exemplary embodiment includes a detecting unit 130 to detect a format and a feeding position of the printing medium 30 and a discriminating unit 140 to determine the standard format and the fed position of the printing medium 30. The detecting unit 130 detects the information of the printing media 30 through contacting with the printing medium 30 in a way different from the former exemplary embodiment.

The detecting unit 130 includes a shaft 131 arranged in a width direction of the printing medium 30 on a medium transport path where the printing mediums 30 are being fed, a plurality of sensing bars 133 installed on the shaft 131 to be rotated freely and a plurality of sensors 135 that sense respective rotation states of the sensing bars 133.

The sensing bars 133 are arranged vertically as illustrated in FIG. 6A by their own weight when there is no contact with the printing medium 30. Further, the sensor 135 includes a light emitting element 136 and a light receiving element 137 that face with each other with the sensing bar 133 therebetween. Accordingly, when there is no feeding of the printing medium 30, the light receiving element 137 can not detect a light signal since the light emitted from the light emitting element 136 is blocked by the sensing bar 133.

Meanwhile, when the printing medium 30 is being fed, as illustrated in FIG. 6B, and contacts at least one of the plural sensing bars 133, a sensing bar 133a contacting the printing medium 30 rotates about the shaft 131 and stops blocking the light. Then, a light receiving element 137a receiving light emitted from the corresponding light emitting element 136a can detect whether the printing medium 30 is being fed or not. Analysis of signals output by the array of light receiving elements 137 as the printing medium 30 travels past allows detection of the shift and the skew quantities of the printing medium 30.

As the discriminating unit 140 is substantially same as the discriminating unit 120 of the previous exemplary embodiment, a detail explanation of it will be omitted.

Here, the configuration of the detecting unit 110 is different from that according to the previous exemplary embodiment and contour form information can be obtained in the same manner as the medium detecting device 100 according to the previous exemplary embodiment since an interference of the printing medium 30 can be sensed as the light receiving element 137 detects light when the printing medium 30 is positioned adjacent the light receiving element 137.

Hereinafter, an operation of the medium detecting device 100 according to exemplary embodiments of the present general inventive concept will be explained by describing a case that has a skew in a feeding of the printing medium 30 and a case that has no skew.

Figure 7:
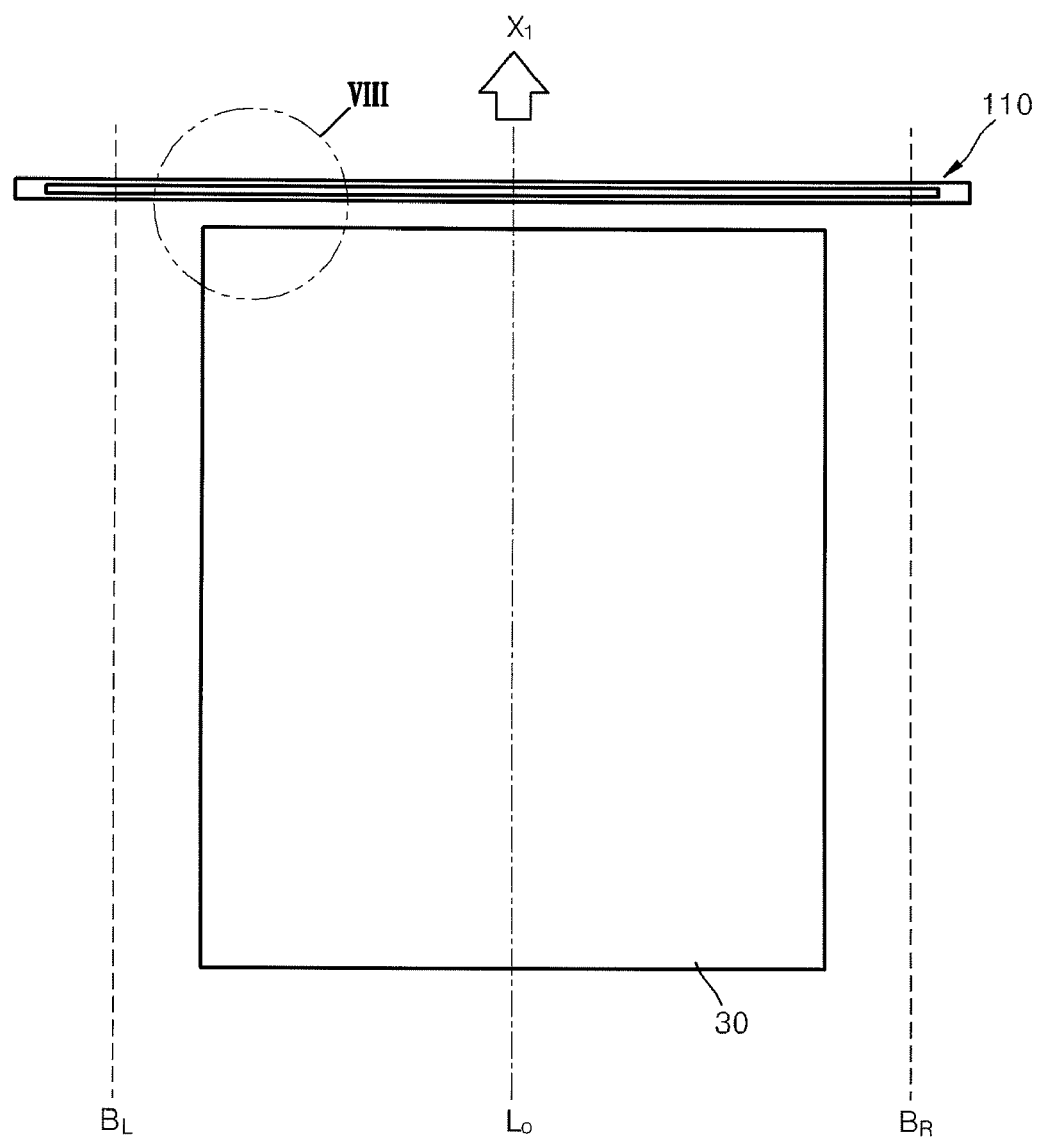
FIG. 7 is a schematic plan view illustrating the printing medium without a skew and an arrangement of the medium detecting device according to an exemplary embodiment.

FIG. 7 is a schematic plan view illustrating the printing medium 30 without a skew and an arrangement of the medium detecting device 100.

In the present exemplary embodiment, an image forming apparatus printing on printing medium 30 of A4 standard format (210 mm×297 mm) progressing in a lengthwise direction is used as an example. Here, center feeding which references a position of the printing medium 30 with respect to a center line $L_0$, a 10% permitted shift quantity, a ±10° permitted skew quantity are assumed. $B_L$ denotes a left side boundary and $B_R$ denotes a right side boundary.

Assuming a print size of A4, a 10% permitted shift quantity (without any permitted skew quantity) requires an available length S of 231 mm (=print width(210 mm)+shift quantity (21 mm)) for a portrait type printing operation. The sizes of configuring elements related to the width of the printing medium 30 may be determined by the available length S as their reference.

Also, the size of the light receiving elements B have a height h=1 mm and a width w=1 mm with a rectangular shape and an interval between the light receiving elements is 1 mm.

FIGS. 8A through 8E are enlarged views of a region VIII of FIG. 7 illustrating a feeding process order of the printing medium 30 when there is no skew using the medium detecting device 100 as mentioned above.

Figure 9:
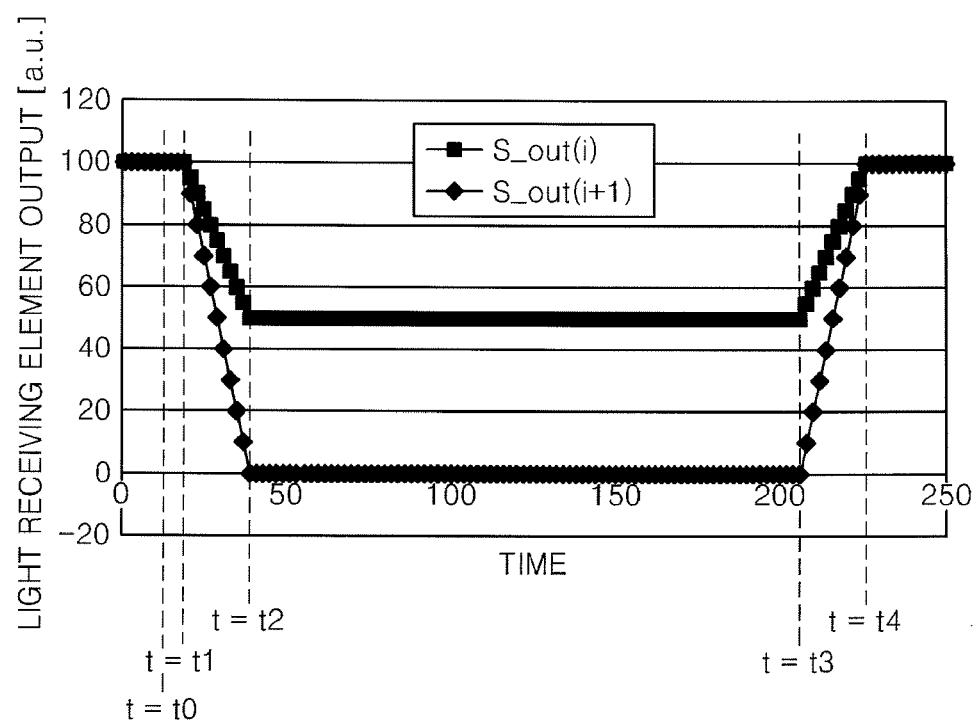
FIG. 9 is a graph illustrating a light receiving element output according to a sequential change of time in FIG. 8A through FIG. 8E.

FIG. 9 is a graph illustrating an output of the light receiving element according to a time sequence. In FIG. 9, S_out(i) is an output value of the light receiving element ($P_i$) and S_out(i+1) is an output value of the light receiving element ($P_{i+1}$).

Figure 8A:
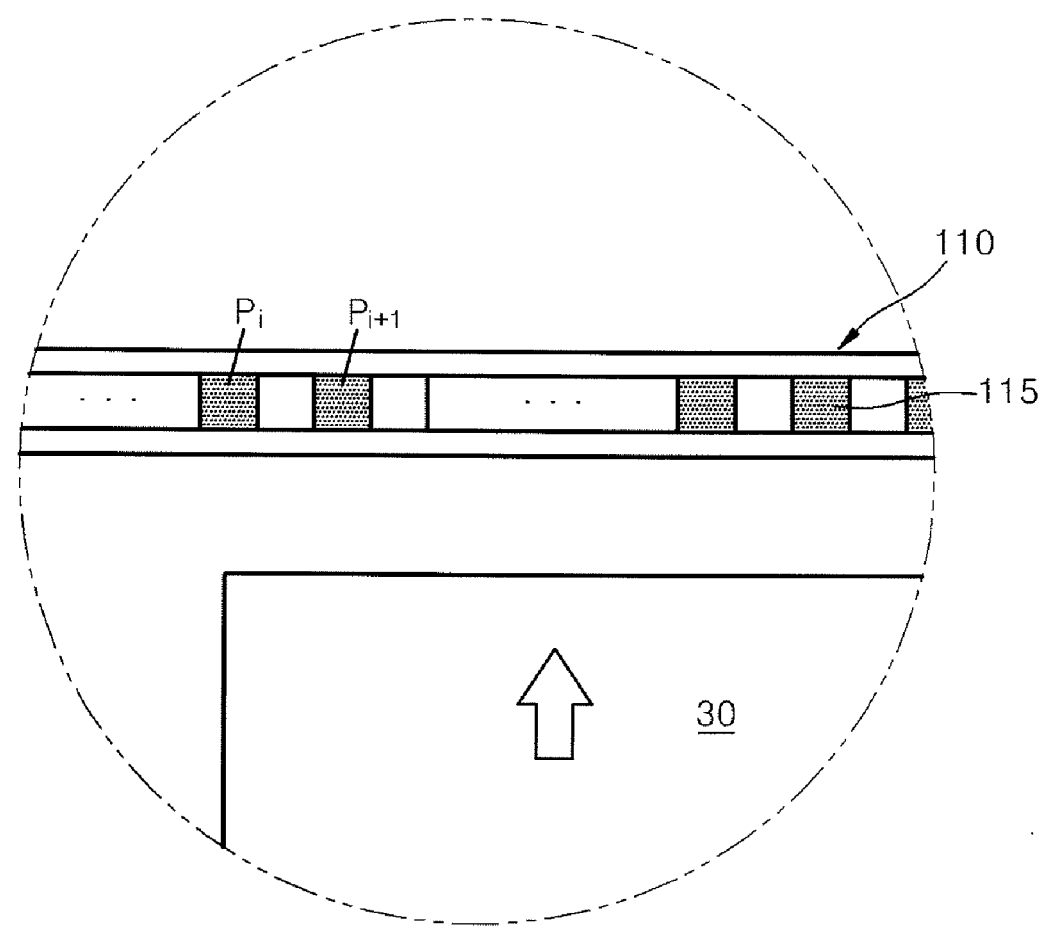
FIGS. 8A through 8E are enlarged views of a region VIII of FIG. 7 illustrating a printing medium feeding process order when there is no skew.

FIG. 8A illustrates a state (t=t0) before the printing medium 30 enters the detecting unit 110. At this state, all output values of the $i^{th}$ light receiving element and the $i+1^{th}$ light receiving element are 100%.

Figure 8B:
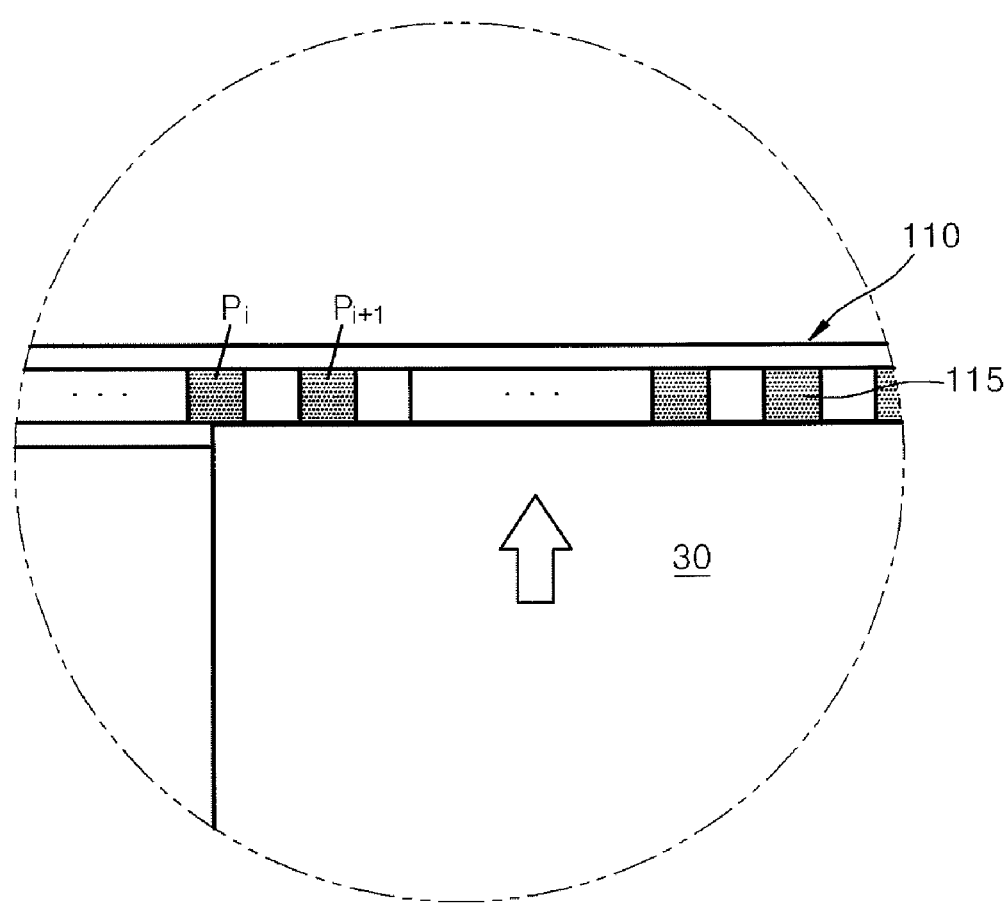

Meanwhile, as illustrated in FIG. 8B, as the printing medium 30 is transported for time t1 and covers part of the light receiving unit 115, the output values of the $i^{th}$ and the $i+1^{th}$ light receiving elements $P_i$ and $P_{i+1}$ start to decrease. At this time, in view of an arrangement direction of the light receiving unit 115, the $i^{th}$ light receiving element $P_i$ is covered partially in its lengthwise direction by the printing medium 30 while the $i+1^{th}$ light receiving element is covered entirely across the lengthwise direction. As illustrated in FIG. 9, the decreasing rates of the output values are different. That is, the output value decreasing rate of the $i+1^{th}$ light receiving element $P_{i+1}$ is larger than that of the $i^{th}$ light element light receiving element $P_i$.

As time elapses from time t=$t_0$ to t=$t_1$, the exact time which the printing medium 30 crosses the medium detecting device 100 can be detected from the change in output values of the light receiving elements P. At this time, the mapping of the printing medium 30 is performed on the position information obtained by the light receiving unit 115. Here, the mapping means a process of detecting and recognizing the related information of the printing medium 30 by comparing a length in the width direction, the shifted quantity and a length in the lengthwise direction of the printing medium 30 with the stored position information in the memory (121 in FIG. 2).

Figure 8C:
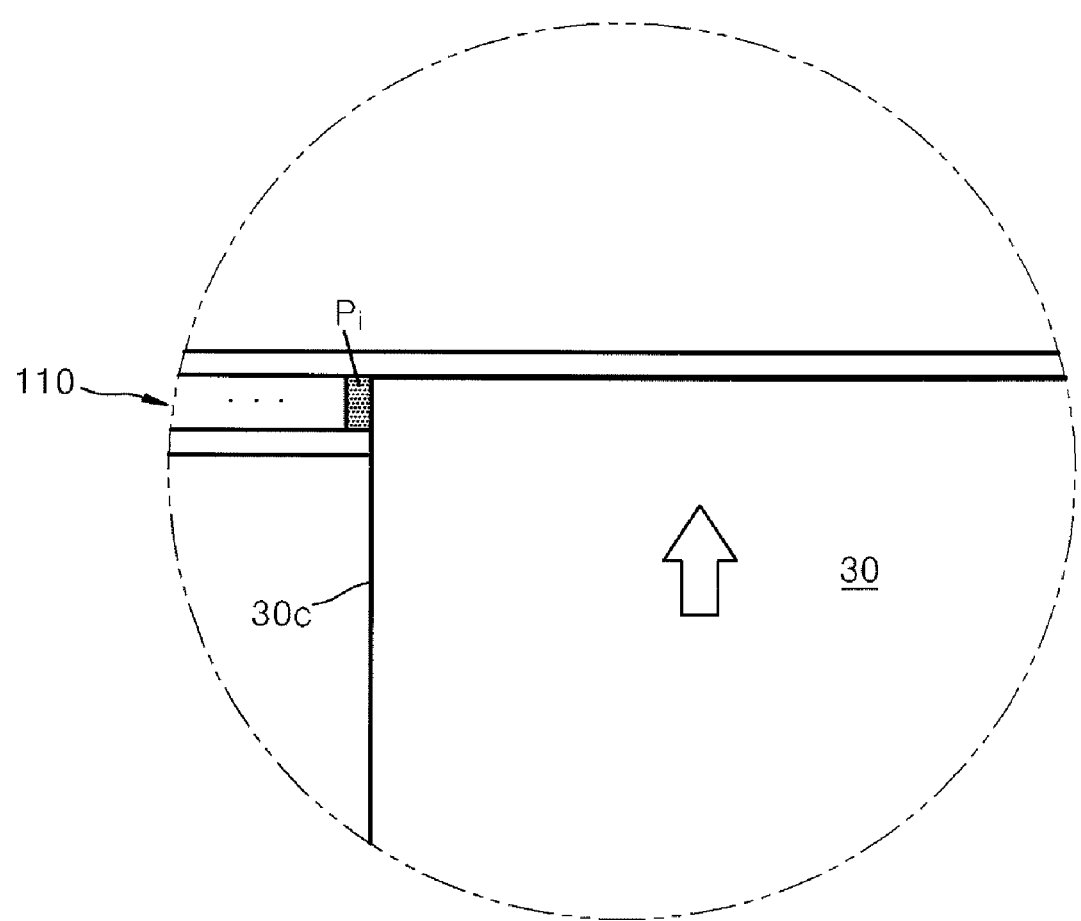

As illustrated in FIG. 8C, when the printing medium 30 is transported continuously until time t2, the $i+1^{th}$ light receiving element $P_{i+1}$ is completely covered by the printing medium 30. Also at time t2, the $i^{th}$ light receiving element $P_i$ is partially covered (for example 50% coverage rate) by the printing medium 30. Since t2 is the time when the complete covering of the light receiving element $P_{i+1}$ occurs, the discriminating unit (120 in FIG. 2) can recognize that the leading edge 30a of the printing medium 30 is positioned at the end part (reference line) of the light receiving unit 115. Further, the leftmost side edge 30c of the printing medium 30 may be recognized to be positioned across the center part of the $i^{th}$ light receiving element $P_i$ from the 50% output value of the $i^{th}$ light receiving element $P_i$.

Also, the number n of the light receiving elements P expected to be 100% covered by the printing medium 30 may be calculated based on the known width w (1 mm) and the interval d (1 mm) respectively, and the width of the printing medium 30 (210 mm).

$$n=210-(0.5+g+m) \quad \text{Equation (2)}$$

where g is the number of intervals fully covered and m is a margin.

g has a value equal to n or n±1 (here, because the interval=1 mm). m is a compensating value to consider when the right edge of the printing medium 30 partially covers one light receiving element or the interval.

FIGS. 8A through 8E represents a case when the $i^{th}$ light receiving element $P_i$ is partially covered while its right side interval is completely covered by the printing medium 30. Accordingly, if n and g are 104 and 105 respectively, a value of 0.5+g+n is 209.5 mm. Further, with the printing medium extending the whole 210 mm across the light receiving unit 115, the interval of length 1 mm between the $i+104^{th}$ light receiving element and the $i+105^{th}$ element will be completely covered by the printing medium 30, and the rightmost side edge 30b of the printing medium 30 extends over a center of the $i+105^{th}$ light receiving element.

Then, in this medium detecting device 100, the opposite side edges 30c and 30b of the printing medium 30 respectively cover the centers of the $i^{th}$ and $i+105^{th}$ light receiving elements while being fed.

Table 1 lists the change of output values of the respective light receiving elements with time as the printing medium 30 is fed as mention above.

TABLE (1)

| | $P_{i-1}$ | $P_i$ | $P_{i+1}$ | ... | $P_{i+104}$ | $P_{i+105}$ | $P_{i+106}$ |
|---|---|---|---|---|---|---|---|
| t1 | 100 | 100 | 100 | 100 | 100 | 100 | 100 |
| (t1 + t2)/2 | 100 | 75 | 50 | 50 | 50 | 75 | 100 |
| t2 | 100 | 50 | 0 | 0 | 0 | 50 | 100 |

Referring to table 1, the $i-1^{th}$ light receiving element $P_{i-1}$ disposed left to the $i^{th}$ light receiving element $P_i$ and the $i+106^{th}$ light receiving element $P_{i+106}$ disposed right to the $i+105^{th}$ light receiving element $P_{i+105}$ do not show a change in their output values. This means there is no interference to the light receiving element by the printing medium 30.

The $i^{th}$ light receiving element $P_i$ illustrates the output value 50% at time t2. This means that the printing medium 30 is being transported along the center line of the $i^{th}$ light receiving element $P_i$. The output values of the $i+1^{th}$ light receiving element $P_{i+1}$ and the $i+104^{th}$ light receiving element $P_{i+104}$ are 0% respectively at time t2, indicating a complete coverage of these light receiving elements by the printing medium 30.

Though the number of interfered light receiving elements is represented for an ideal case to understand the operation principle, the exact length and the positions of the printing media can be calculated through a real time mapping of the detected values of the respective light receiving elements to coordinates in the discriminating unit 120.

At time t1, the leading edge 30a of the printing medium 30 is positioned at the reference line on the coordinate map and the printing medium 30 width is calculated. Further, the discriminating unit 120 continuously senses the outputs of the respective light receiving elements as time passes and recognizes the light receiving element that produces a change in the output value.

Figure 8D:
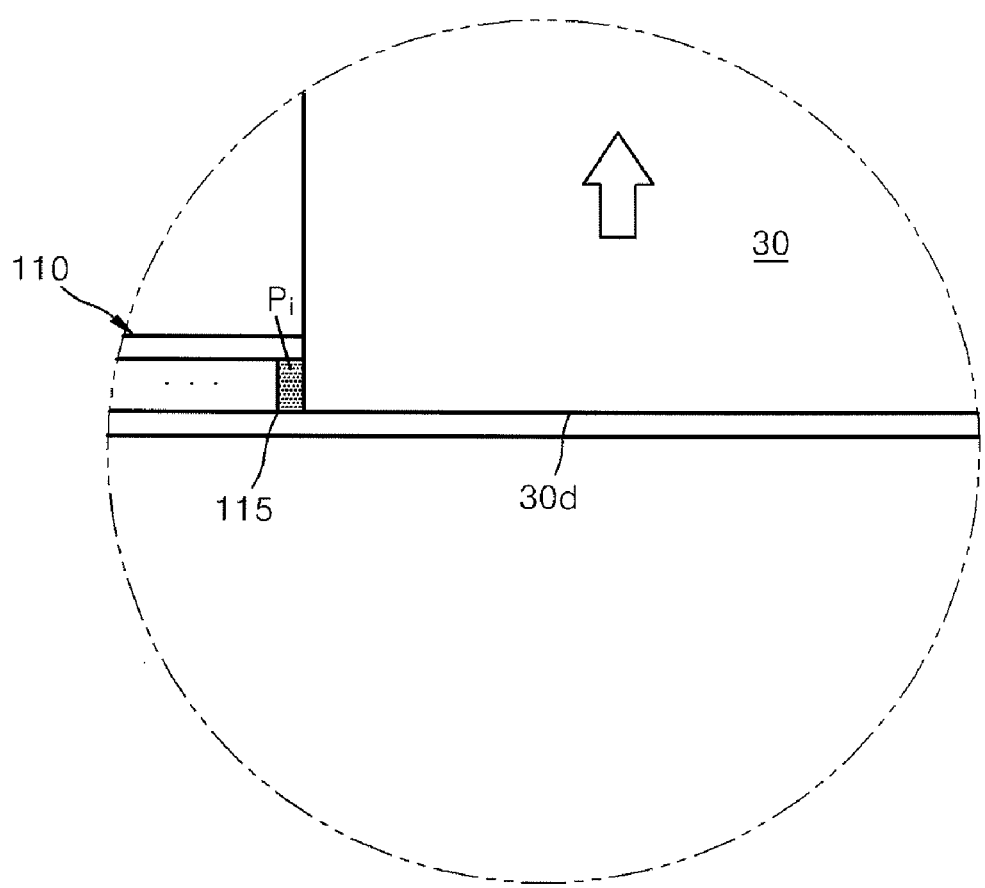
Figure 8E:
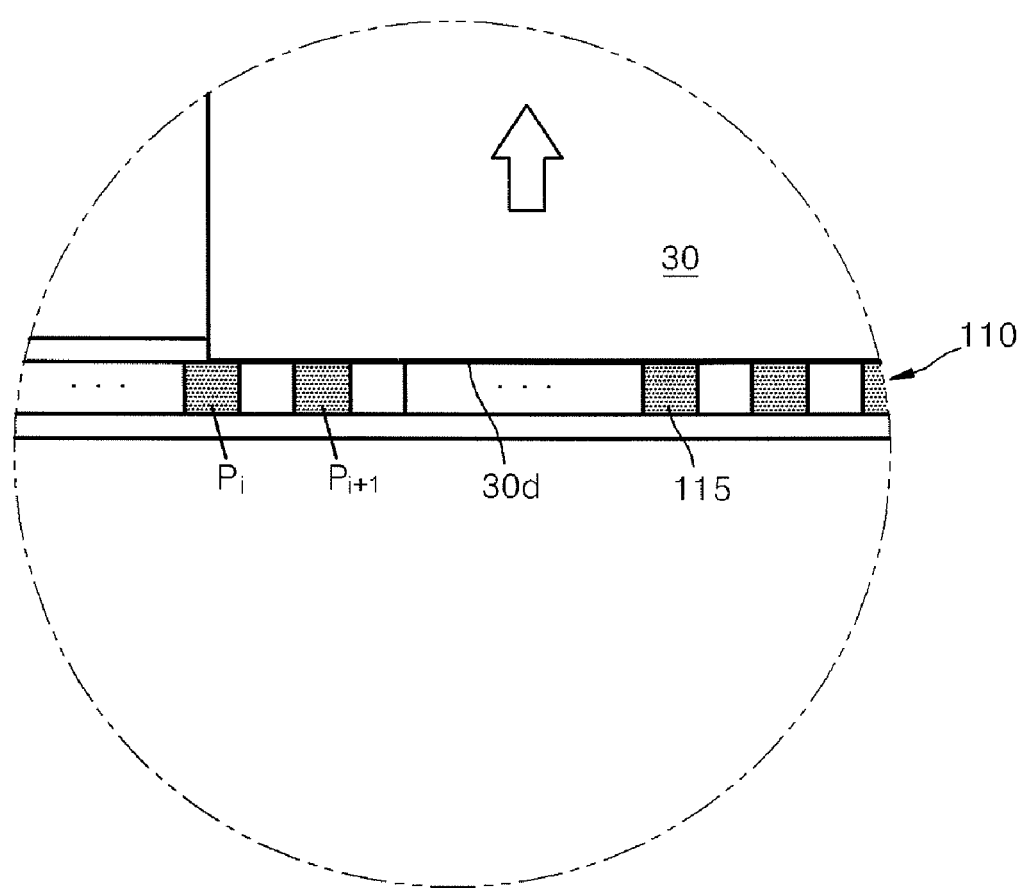

FIGS. 8D through 8E illustrates a course that the trailing edge 30d of the printing medium 30 passes through the detecting unit 110. Since the detection of the signal is same as that for the leading edge 30a, a detailed explanation is omitted.

When the printing medium 30 is arranged as illustrated in FIG. 8E, the discriminating unit 120 recognizes that the printing medium 30 has completely passed the medium detecting device at time t4, and can calculate the length $L_1$ of the printing medium 30 based on a feeding speed and the passing time it took the printing medium to pass through the detecting unit 110.

For example, if the printing medium 30 is fed in speed 100 mm/s and the passing time is 2.97 s, the printing medium 30 length (=speed×passing time=100×2.97) is 297 mm.

As mentioned, the media detecting device can determine whether the printing medium 30 is normally fed by recognizing the shift amount, the width and the length of the printing medium 30 through the discriminating unit 120.

On the other hand, since the permitted shift amount is set to 10% of the width of the printing medium 30 in the present exemplary embodiment, the medium detecting unit needs additional light receiving elements to detect any shift to the left or right sides within the permitted shift amount besides the $i^{th}$ light receiving element $P_i$ and the $i+105^{th}$ light receiving element $P_{i+105}$ used for the medium detection in the case of 0 shift quantity.

If the printing medium 30 is center fed, the total permitted shift quantity is divided in half, and the left and right sides will both have the a permitted shift quantity as of 10.5 mm for the A4 example (210 mm×10%/2). Further, a mid point between the $i^{th}$ light receiving element $P_i$ and the $i+105^{th}$ light receiving element $P_{i+105}$ serves as a center for the center feeding. Here, the mid point is positioned at the center in the interval between the $i+52^{th}$ light receiving element $P_{i+52}$ and the $i+53^{th}$ light receiving element $P_{i+53}$.

Since a centered A4 printing medium has edges ending at centers of the $i^{th}$ light receiving element $P_i$ and the $i+105^{th}$ light receiving element $P_{i+105}$, 0.5 mm of each of these light receiving elements are left uncovered with a centered A4 printing medium. Thus, five more light receiving elements are required on both the left and right sides respectively to detect a printing medium within the permitted shift quantity of 10.5 mm on the left and right sides respectively (each light receiving element and interval therebetween being 1 mm in this example).

Figure 10:
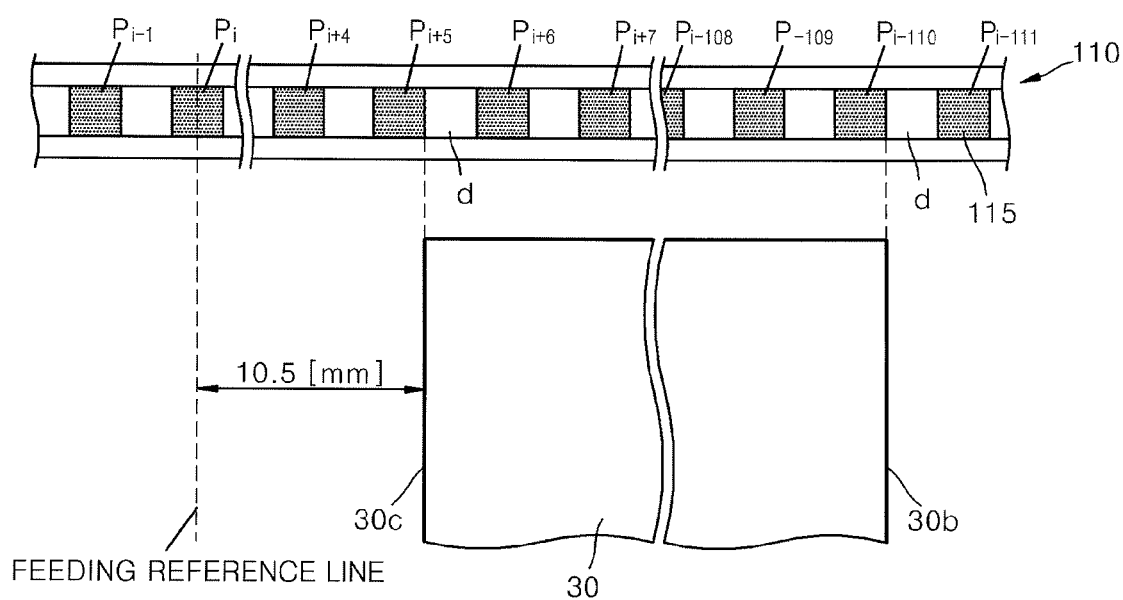
FIG. 10 is a view illustrating an example of transporting the printing medium shifted to right as much as 10.5 mm from a reference feeding line.

A printing medium 30, shifted as much as the permitted shift quantity of 10.5 mm to the right from a feed reference line, will be examined as an example, referring to FIG. 10.

In the present exemplary embodiment, the printing medium 30 is shifted 10.5 mm to the right of the feeding reference line, and a line extends from the leftmost side edge 30c of printing medium 30 coincides with the right edge of the $i+5^{th}$ light receiving element $P_{i+5}$. Further a line from the rightmost side edge 30b of printing media 30 extends to the right edge of the $i+110^{th}$ light receiving element $P_{i+110}$.

At this time, the discriminating unit (120 in FIG. 2) senses that the printing medium 30 is shifted 10.5 mm from the feeding reference line from the output values of the light receiving elements 115. At this time if the shift quantity is greater than the permitted shift quantity, an error message is sent to the user, but if it is within the permitted shift quantity as in the present exemplary embodiment, the feeding of the printing medium 30 continues normally.

Meanwhile, if the printing medium 30 is shifted an additional 0.5 mm more to the right side, the shift quantity is greater than the permitted shift quantity. At this time, because the leftmost side edge 30c and right most side edge 30b are respectively positioned above the intervals to the right of the $i+5^{th}$ light receiving element $P_{i+5}$ and the $i+110^{th}$ light receiving element $P_{i+110}$, no change occurs in the detecting signal and the exceeded shift quantity can not be sensed. So, it may be inferred that the detecting signal includes an error range of 1 mm.

However, the error resulting from the interval formed between the light receiving elements P will be insignificant if the interval d is within a set permissible error range, for example 1 mm. Of course, if the intervals between the adjacent light receiving elements P is zero, the error will not be produced.

Adjusting an arrangement of the feeding reference line with the medium detecting device to detect the permitted shift quantity related to the produced error is also possible. That is, if the interference occurs in the light receiving elements disposed in the left and right boundaries considering the maximum shift quantity, the abnormal feeding of the printing media may be sensed through interpreting of the deviation of the printing medium 30 from the available length range.

As mentioned above, errors occurring from the feeding of a printing medium 30 with a format different from a set standard format or from feeding with a shift quantity can be prevented. Accordingly, image quality is increased and unwanted contamination inside the image forming apparatus can be reduced.

Figure 11:
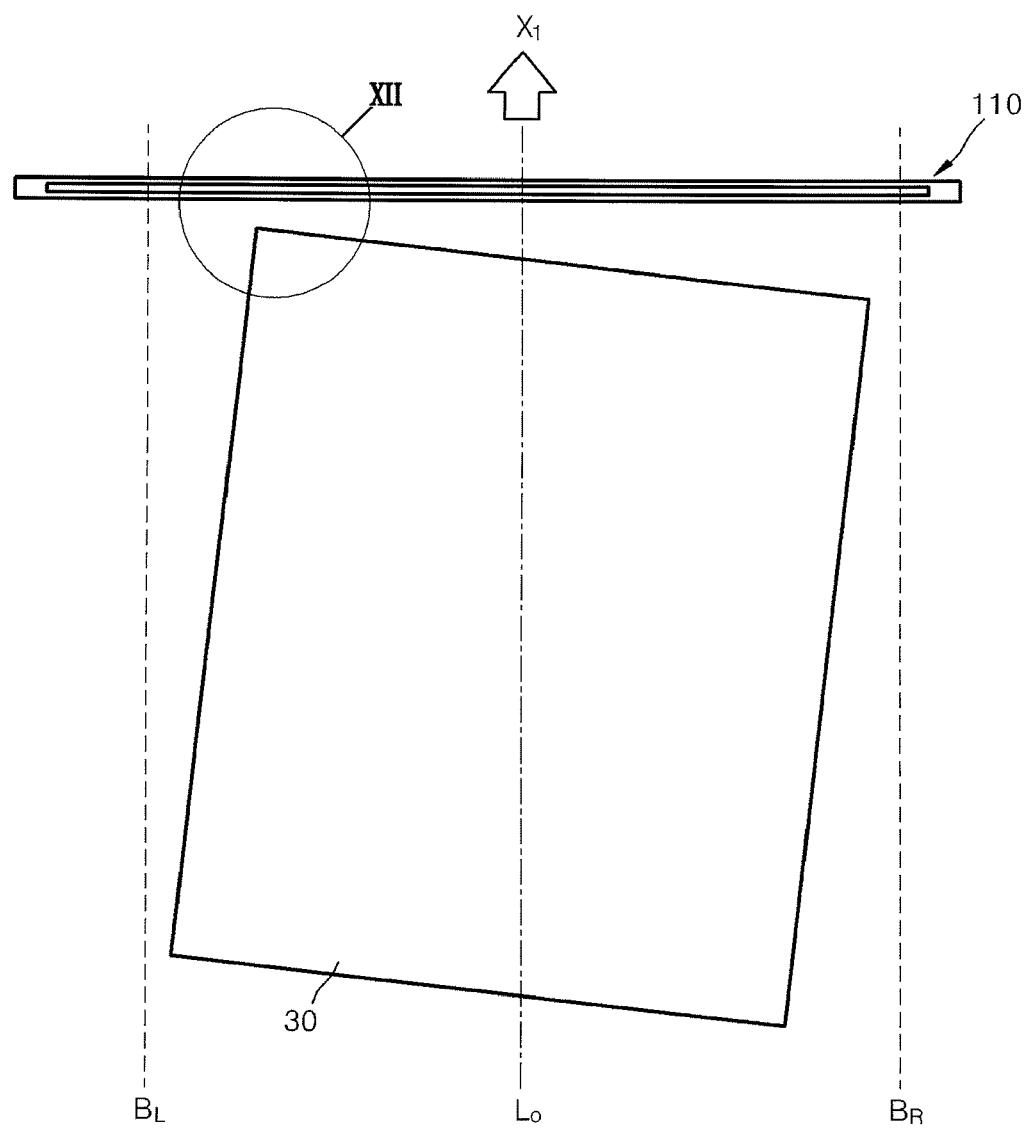
FIG. 11 is a schematic plan view illustrating the skewed printing medium and an arrangement of the medium detecting device according to an exemplary embodiment.

FIG. 11 is a schematic plan view illustrating the skewed printing medium and an arrangement of the medium detecting.

For exemplary purposes, the image forming apparatus prints a printing medium of A4 standard format (210 mm×297 mm) which is transported in a lengthwise direction. Here, center feeding, a permitted shift quantity of 30% and a permitted skew quantity of ±10° are assumed.

Thus, the print width equals 210 mm, the shift quantity equals 63 mm (210×30%), and the available length S equals print width+shift quantity=273 mm.

FIG. 11 is an example illustrating a case of feeding the printing medium when the printing medium is skewed 10° in the clockwise direction. As illustrated, the left bottom edge of the printing medium 30 is spaced away from the center line $L_o$ and disposed adjacent to the left boundary line $B_L$. The right top edge is spaced 10.5 mm away from the right boundary $B_R$.

Here, if the printing medium 30 crosses the left boundary line $B_L$, the discriminating unit senses it and sends an error message. Further, a subsequent operation such as a system stop, a discharge of the printing medium 30, etc. is performed.

FIGS. 12A through 12D are respective enlarged views of a region XII of FIG. 11 illustrating the printing medium 30 feeding process of the skewed and shifted printing medium 30 as it is transported. Further, FIG. 13 is a graph illustrating the output of the light receiving elements P with respect to time. In FIG. 13, S_out(i), S_out(i+1), S_out(i+2) represent the $i^{th}$, $i+1^{th}$, $i+2^{th}$ light receiving elements $P_i$, $P_{i+1}$ and $P_{i+2}$ output values respectively.

Figure 12A:
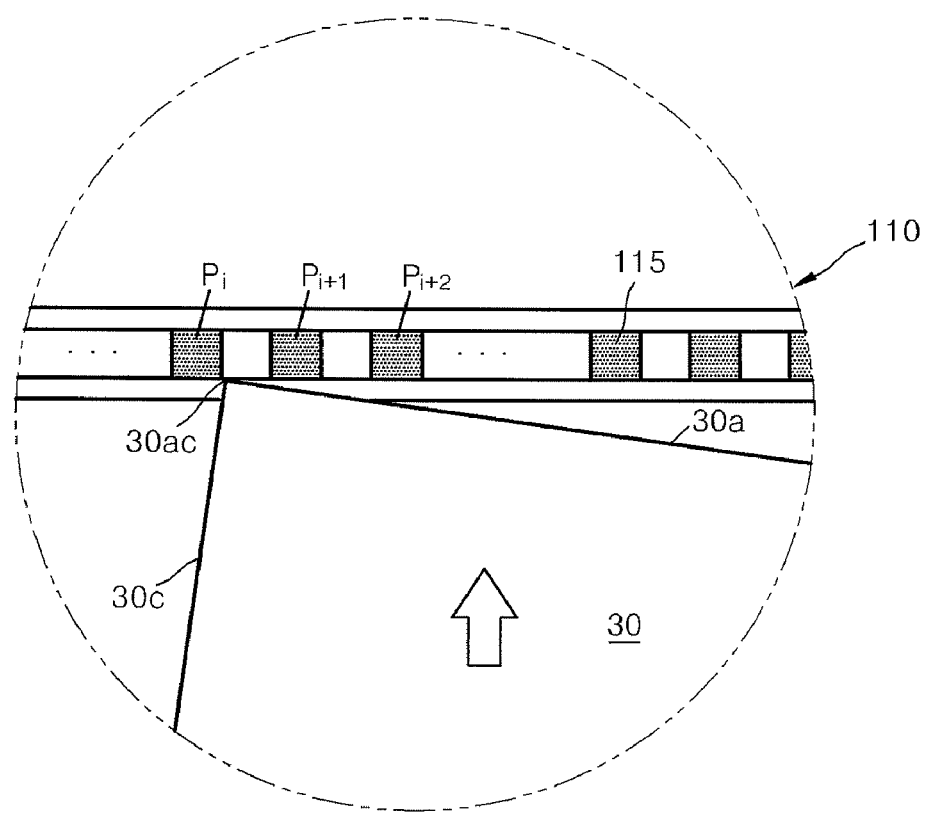
FIGS. 12A through 12D are respective enlarged views of a region XII of FIG. 11 illustrating the printing medium feeding process order of the skewed and shifted printing medium when the printing medium is transported.
Figure 12B:
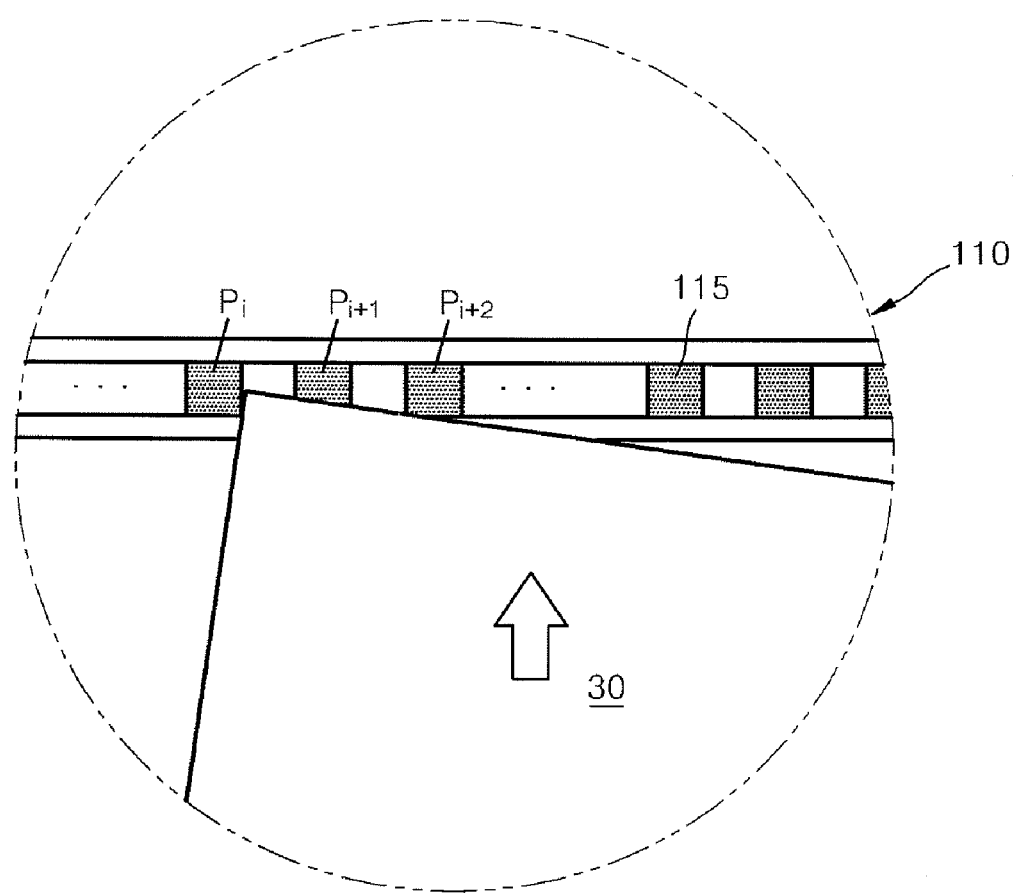
Figure 13:
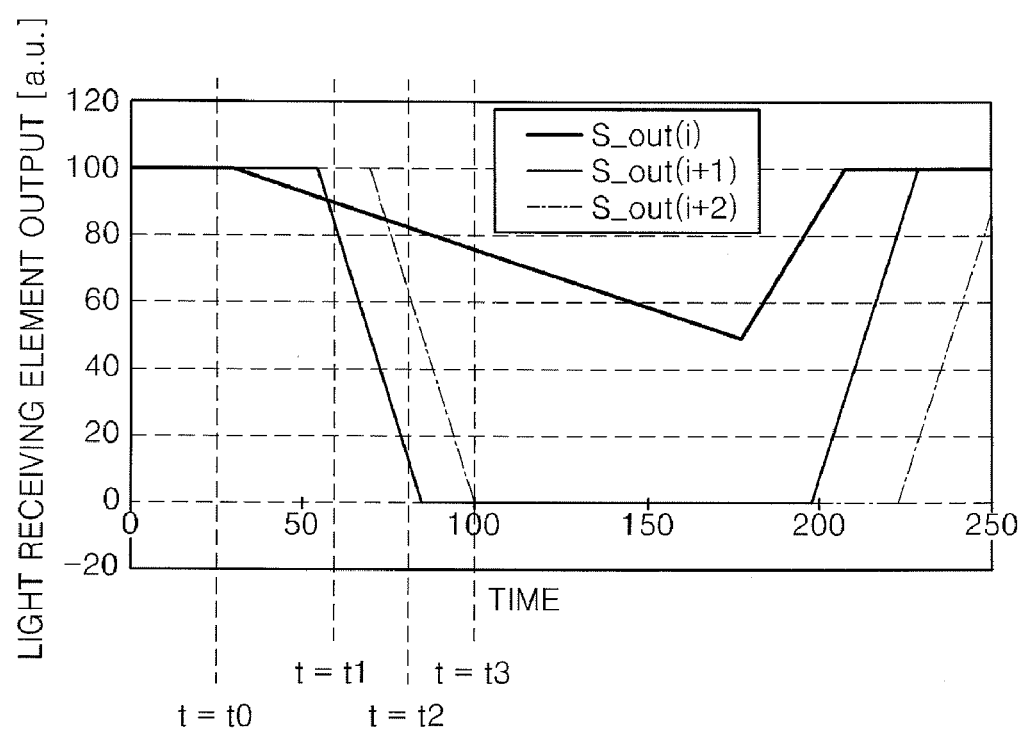
FIG. 13 is a graph illustrating the light receiving element output according to a sequential change of time in FIGS. 12A through 12D.

FIG. 12A illustrates a state (t=t0) just before the entry of the printing medium 30 before the printing medium 30 covers the detecting unit 110. Thus, as illustrated in FIG. 12A and FIG. 13, every light receiving element including the $i^{th}$, $i+1^{th}$, $i+2^{th}$ light receiving elements $P_i$, $P_{i+1}$ and $P_{i+2}$ has an output value of 100.

At this time, when the feeding of the printing medium 30 starts, the discriminating unit (120 in FIG. 2) reads and stores the output values of the light receiving elements of the detecting unit 110. Further the discriminating unit 120 periodically compares subsequent outputs of the light receiving elements with previous values of the light receiving elements. If there is no difference in values through the comparison, the discriminating unit 120 can discriminate that the printing medium 30 has not crossed into the location of the detecting unit 110.

Meanwhile, when the fed printing medium 30 starts covering part of the light receiving elements 115 at time t=t1, the output values of the covered light receiving elements 115 begin to decrease below 100%. For example, if a part of the $i+1^{th}$ light receiving elements $P_{i+1}$ is covered by the printing medium 30, the output values from the i+1$^{th}$ light receiving elements $P_{i+1}$ becomes lower than the output values of the other uncovered light receiving elements.

At this time, the feeding of the printing medium 30 can be detected by sensing the difference in the subsequent output values from the previously stored output values.

Figure 12C:
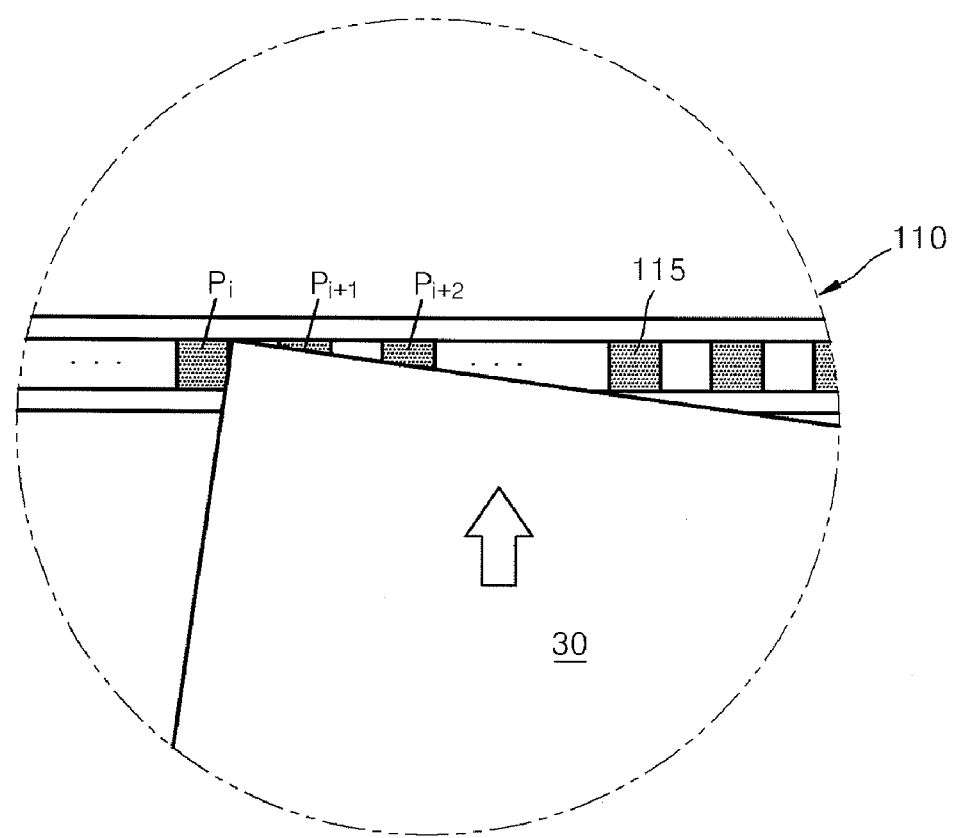
Figure 12D:
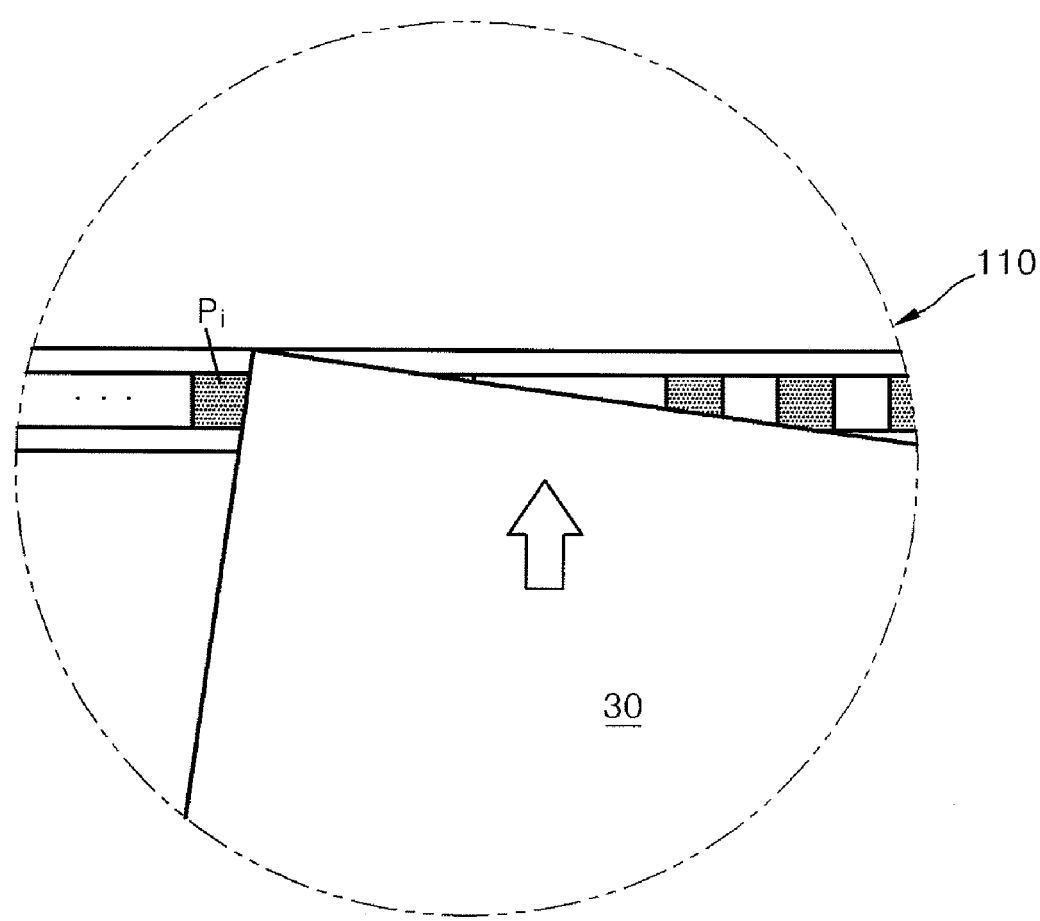

Also, as illustrated in FIGS. 12C and 12D for time t=t2 and t=t3 respectively, the locations and the extent of the coverage are changed with the elapsed time and the skew quantity can be determined from the change in the outputs of the light receiving elements as illustrated in 13.

More specifically, information related to the skew quantity can be calculated through calculating the contour form information of the printing medium 30 by mapping the output signal detected in each light receiving element P on an imaginary coordinate system stored in the memory 121. In the other words, through setting coordinates matching the location of each light receiving element P and extracting a transition of the output value at each location of the coordinates with the elapsed time, the whole contour of the printing medium 30 may be determined and confirmed and the skew quantity is possible to calculate.

In this example, the imaginary coordinate system refers to a format of storing information regarding the location of the light receiving elements, permitted print width, etc., to store the information as printing medium 30 contour form information in the memory 121. The imaginary coordinates are mapped according to the output value of each light receiving element that changes due to the interference of the printing medium 30. Thus, through the mapping, the skew and the shift quantities can be determined.

If the medium detecting device is configured as mentioned above, the skew and the shift quantities of the printing medium 30 fed to the detecting unit 110 can be determined. After the detecting unit 110, it is assumed that the printing medium 30 has constant skew and shift quantities along the remainder of the medium transport path. That is, the printing medium 30 passes an image transfer location (a position where the photosensitive body 1 and the transfer unit 6 face each other in FIG. 1) while constantly maintaining the skew and the shift quantities measured at the detecting unit 110.

However, the printing medium 30 with a constant skew quantity may be shifted in the width direction of the medium transport path while transported from medium feeding unit to the image transfer location. In this situation, the difference in the shift quantity from the detecting unit 110 to the image transfer location at transfer unit 6 should be determined. Also, especially during center feeding transport, the printing medium 30 may be skewed in a predetermined direction during transport from medium feeding unit to the image transfer location. In this instance, the difference in skew from the detecting unit 110 to the image transfer location at transfer unit 6 should be determined.

Figure 14:
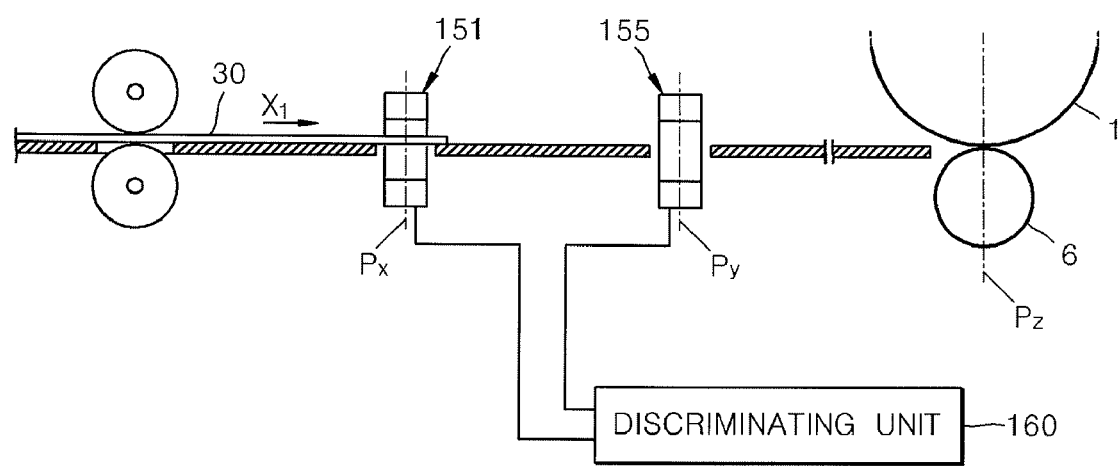
FIG. 14 is a schematic cross sectional view illustrating a medium detecting device according to another exemplary embodiment.

The exemplary embodiment illustrated in FIG. 14 addresses these additional shift and skew quantities.

Referring to FIG. 14, the medium detecting device according to this exemplary embodiment includes a first detecting unit 151 disposed at a first location Px on the medium transport path arranged along the width direction of the printing medium 30, a second detecting unit 155 disposed at a second location Py on the medium transport path arranged along the width direction of the printing medium 30, and a discriminating unit 160 that discriminates the format and the feeding position of the printing medium 30 based on the data detected in the first and the second detecting units 151 and 155.

The first detecting unit 151 detects the format and the feeding position of the printing medium 30 at the first location Px. That is, the shift and the skew quantities of the printing medium 30 at the first location is detected. The second detecting unit 155 detects the feeding position of the printing medium 30 at the second location Py distanced from the first location Px. Here, a configuration and an arrangement of the first and second detecting units 151 and 155 may be substantially the same as the configurations and the arrangements of the medium detecting units 110 and 130 of the medium detecting device 100 described above and thus their detailed description will be omitted.

The discriminating unit 160 determines information related to the skew and shift quantities detected respectively in the first and second locations Px and Py by the first and second detecting units 151 and 155.

If the respective skew and shift quantities are same at two locations, it may be determined that the skew and shift quantities are constant while the printing medium 30 is transported to the image transfer location and the image appropriate to the printing medium 30 may be formed based on the assumption.

On the other hand, if the skew quantity is constant and the shift quantity is varied between the first and second locations, the shift quantity at the image transfer location Pz can be estimated using equation (3).

Figure 15:
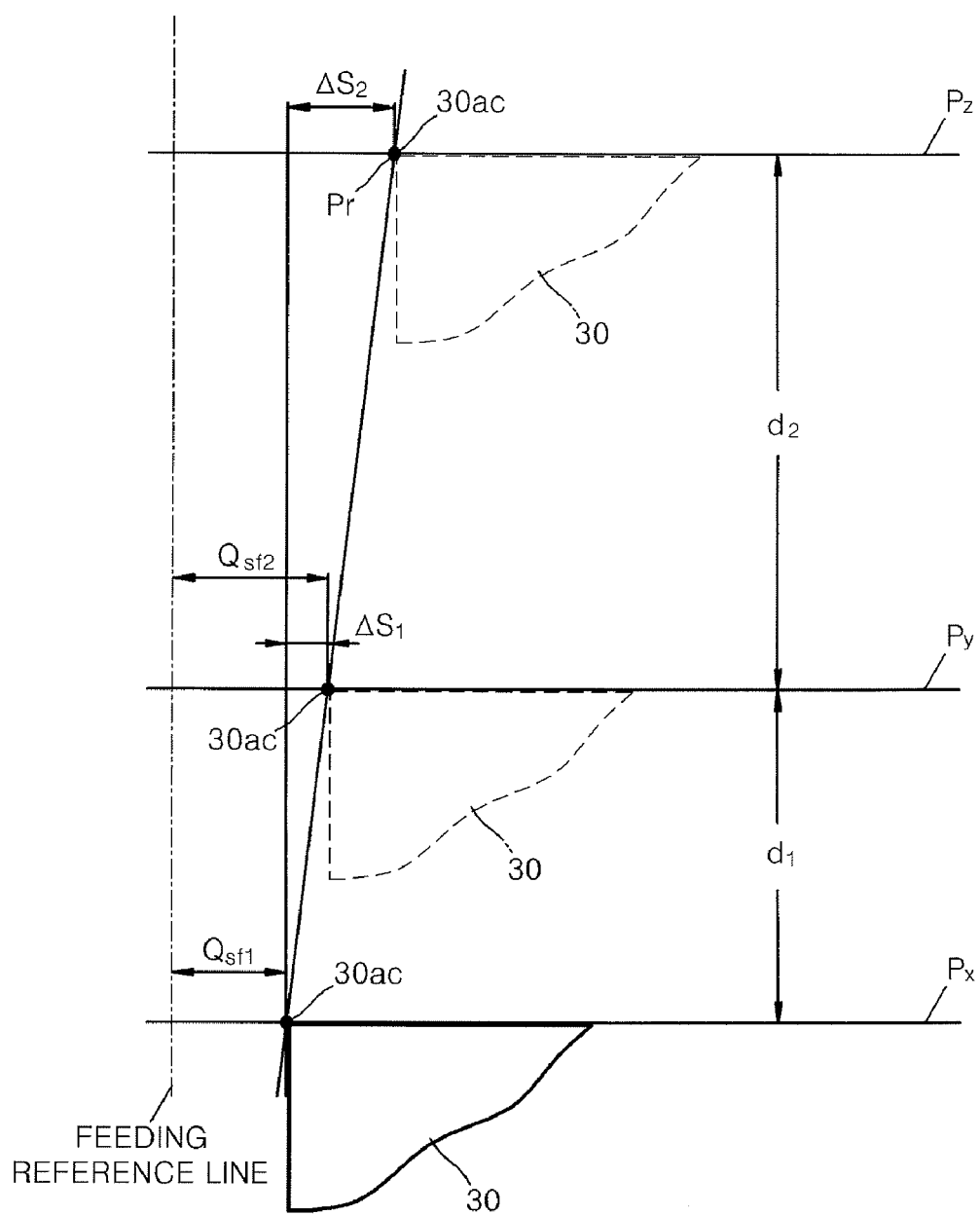
FIG. 15 is a view explaining a difference in shifted length at a transfer location Pz from a shift length $Q_{sf1}$ at a first location Px in FIG. 14.

Referring to FIG. 15, $\Delta S_2$, defined as a difference of the shift quantity at the image transfer location Pz from the shift quantity $Q_{sf1}$ at the first location Px, may be estimated by equation (3).

$$\Delta S_2 = \Delta S_1 \times (1 + d_2/d_1) \qquad \text{Equation (3)}$$

where $\Delta S_1$ is a difference of shift quantity $Q_{sf2}$ at the second location Py from the shift quantity $Q_{sf1}$ at the first location Px, $d_1$ is a distance from the first location Px to the second location Py, and $d_2$ is a distance from the second location Py to the image transfer location Pz.

Accordingly, the exact shift quantity at the transfer location of the toner image can be calculated using the equation (3) if the shift quantity changes linearly while feeding the printing medium 30.

On the other hand, if the shift quantity is constant and the skew quantity is varied between the first and second locations, the skew quantity at the image transfer location Pz can be calculated using the equation (4).

Figure 16:
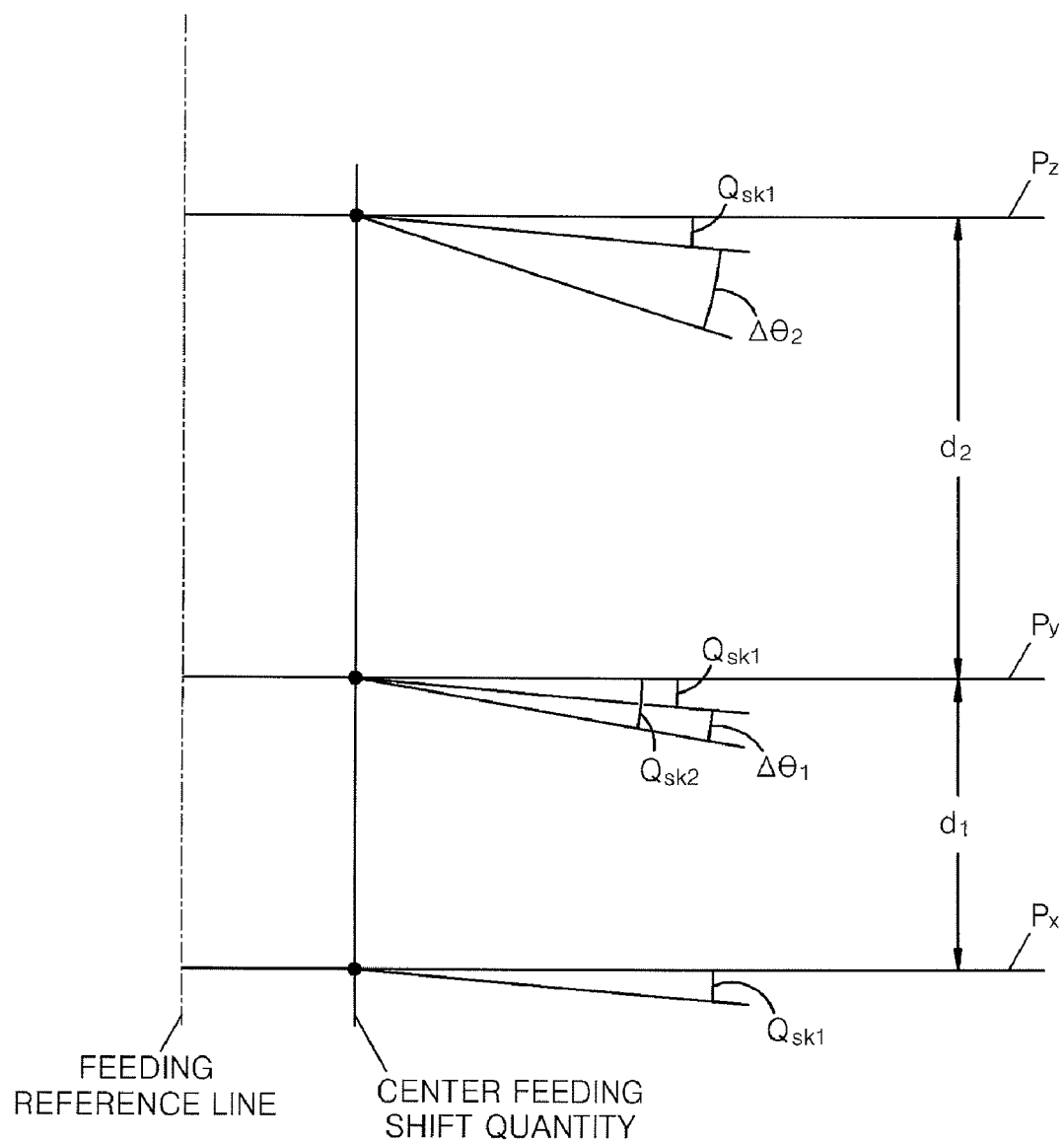
FIG. 16 is a view explaining a difference in skew quantity at a transfer location Pz from a skew quantity $Q_{sk1}$ at a first location Px in FIG. 14.

Referring to FIG. 16, $\Delta\theta_2$, defined as a difference in the skew quantity between the skew quantity at the image transfer location Pz and the skew quantity $Q_{sk1}$ at the first location Px may be estimated with equation (4).

$$\Delta\theta_2 = \Delta\theta_1 \times (1 + d_2/d_1) \qquad \text{Equation (4)}$$

where $\Delta\theta_2$ is a difference of the skew quantity at the transfer location Pz from the skew quantity $Q_{sk1}$ at the first location Px, $\Delta\theta_1$ is a difference of the skew quantity $Q_{sk2}$ at the second location Py from the skew quantity $Q_{sk1}$ at the first location Px, $d_1$ is the distance from the first location Px to the second location Py, and $d_2$ is the distance from the second location Py to the image transfer location Pz as in equation (3).

Accordingly, the exact skew quantity at the transfer location of the toner image can be calculated using the equation (4) if the skew quantity changes linearly while feeding the printing medium 30.

Also, the shift and skew quantities of the printing medium 30 can be estimated using the equations (3) and (4) when the shift and the skew quantities of the printing medium 30 both change.

Though the media detecting device with the first and second detecting units 151 and 153 according to this exemplary embodiment is used as an example, a configuration of three or more than three detecting units may be possible. In such alternative embodiments, other types of extrapolation rather than linear extrapolation may be used to estimate the additional shift and skew which may occur after the printing medium leaves the last detecting unit location and travels to the image transfer location.

Hereinafter, a method of detecting the printing medium 30 according to an exemplary embodiment is described.

The method of detecting the printing medium 30 according to this exemplary embodiment may use the above described medium detecting device mainly and includes, detecting the contour form information of the fed printing medium 30 and discriminating the format and the feeding position of the fed printing medium 30 based on the detected contour form information of the printing medium 30.

The detecting of the contour form information of the fed printing medium 30 is performed through the detecting units 110, 130 and 150 with the discriminating units 120, 140 and 150 of the medium detecting device, and includes radiating the light, outputting the signal after receiving the radiated light at successive predetermined time intervals dependent on an existence of the fed printing medium 30 and recognizing the contour form information of the fed printing medium 30 using the output signal.

The discriminating of the format and the feeding position of the fed printing medium 30 further includes determining the format of the fed printing medium 30, the skew and shift quantities respectively. Hereinafter, the determining operation will be sectioned and examined in detail.

Determination of the fed printing medium standard format may be by two different methods, which are 1) determining through detecting the width and the length of the fed printing medium, and 2) determining through detecting only the width (or alternatively, only the length) of the fed printing medium 30 with the known printing media standard formats.

The exemplary method of the determining the standard format through detecting the width and the length of the fed printing medium includes calculating the width of the fed printing medium with the output signal from the detecting of the fed printing medium contour form information and calculating the length of the fed printing medium by an arithmetic operation using the pass time of the fed printing medium through the location of the detecting unit and the preset feeding speed of the fed printing medium. Also, the determining operation may further include storing a standard format in the memory (121 in FIG. 2) and determining a standard format of the fed printing medium format by comparing the stored standard format with the calculated width and length of the fed printing medium.

Figure 17:
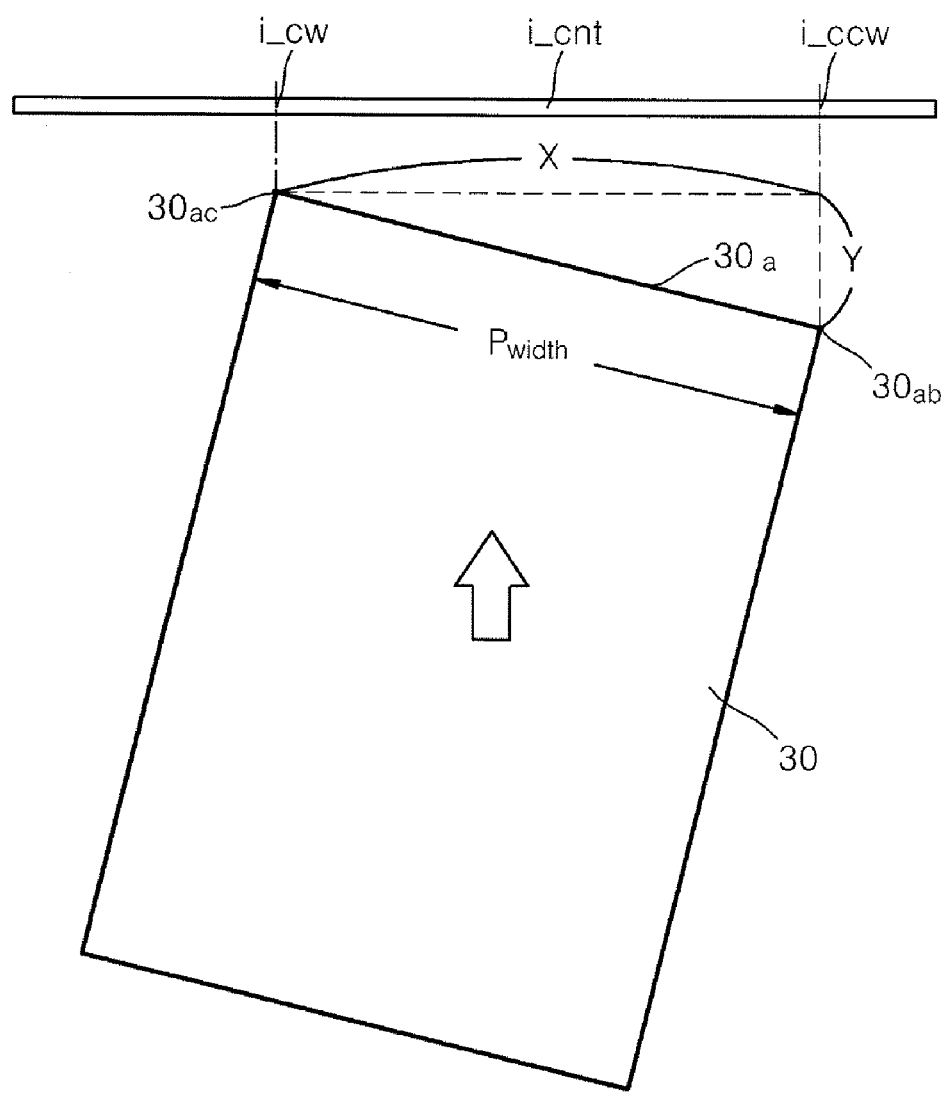
FIG. 17 is a view explaining a relation of X, Y and the width of the printing medium $P_{width}$.

Referring to FIG. 17, the width $P_{width}$ of the fed printing medium can be calculated from equation (5).

$$P_{width} = \sqrt{X^2 + Y^2}$$

$$X = (i\_ccw - i\_cw) \times (w+d) + m$$

$$Y = f \times V \times T \quad \text{Equation (5)}$$

where, during a clockwise skew (as illustrated in FIG. 17), i_cw is an index number of the light receiving element disposed at a location which first detects interference of the printing medium (here, interference from vertex 30ac of the printing medium 30 on the left side of FIG. 17) and i_ccw is an index number of the light receiving element disposed at a location which meets the opposite vertex 30ab on the leading edge 30a of the printing medium 30. It should be noted that "$\sqrt{X^2+Y^2}$" indicates here, and throughout the entire disclosure and claims "the square route of $X^2+Y^2$". During a counterclockwise skew, i_ccw is the index number of the light receiving element disposed at a location which first detects interference of the printing medium (for the printing medium 30 of FIG. 17, interference from vertex 30ab) and i_cw is the index number of the light receiving element disposed at a location which meets the opposite vertex 30ac on the leading edge 30a of the printing medium 30. For both the clockwise skew and counterclockwise skew, w is the width of the light receiving element, d is the width of the interval between the light receiving elements and m is the margin as described above. Accordingly, a distance X between the light receiving elements which meet the opposite vertexes 30ac and 30ab can be calculated through multiplying the difference in the index values (i_cw−i_ccw) by the total sum of the widths of the light receiving elements and intervals added with the margin m. Alternative methods of determining X may also be used, such as use of a look-up table (in memory 121, e.g.) to look up a previously calculated or measured location of the light receiving elements corresponding to the first and second index values, and subtracting the difference of these locations.

Y is a difference in a distance in the lengthwise direction between the opposite two ends 30ac and 30ab of the printing medium 30 and can be expressed by a product of a coefficient f, a feeding speed V of the fed printing medium 30 and a detecting period T of the light receiving element. The coefficient f means a number of counts counted by the counter 125 during an entering of the printing medium 30 from the first entering of the vertex 30ac till the last entering of the other vertex 30ab.

On the other hand, the width $P_{width}$ of the printing medium 30 can be also calculated in case of a counterclockwise skew in a similar manner.

Further, information on the length of the fed printing medium 30 can be calculated by multiplying the feeding speed of the printing medium 30 with the passing time of the printing medium 30 as determined by the counter (125 in FIG. 2).

A method of determining fed printing medium standard format by detecting only the width of the printing medium 30 and comparing the same with the known standard formats includes, determining a feeding direction of the printing medium 30, calculating the width of the printing medium 30 from the detected contour form information of the printing medium 30, storing the standard formats in the memory 121 and determining the standard format of the fed printing medium 30.

Printing media formats occur in many forms by various nations or international standard formats. The format of the printing medium 30 can be determined using the standard formats if a feeding orientation of the printing medium 30 (e.g., a portrait type orientation or a landscape type orientation) is known. Here, the portrait type refers to feeding the printing medium 30 of a rectangular shape with its shorter edge as the width of the printing medium 30, and the landscape type refers to feeding the printing medium 30 with its longer edge as the width of the printing medium 30.

The feeding direction of the printing medium 30 may be determined by recognizing a user set direction with sensors mounted in the printing media feeding units (31, 32, and 33 in FIG. 1). The user may set the direction through a terminal of a computer that controls the image forming apparatus.

The width $P_{width}$ and the length $P_{length}$ of the printing medium 30 may be calculated with the equation (5) above.

When the information on the width $P_{width}$ and the length $P_{length}$ of the printing medium 30 is known, the standard format of the printing medium 30 can be determined through using a formula in table 2 expressing the standard formats with the width and the length and/or, using data in one or more of tables 3 through 5.

TABLE (2)

| standard format | $P_{width}$ m | $P_{length}$ m |
|---|---|---|
| An | $2^{-1/4-n/2}$ | $2^{1/4-n/2}$ |
| Bn | $2^{-n/2}$ | $2^{1/2-n/2}$ |
| Cn | $2^{-1/8-n/2}$ | $2^{3/8-n/2}$ |

TABLE (3)

| A series standard formats | | B series standard formats | | C series standard formats | |
|---|---|---|---|---|---|
| standard format | Size mm² | standard format | Size mm² | standard format | Size mm² |
| 2A0 | 1189 × 1682 | | | | |
| A0 | 841 × 1189 | B0 | 1000 × 1414 | C0 | 917 × 1297 |
| A1 | 594 × 841 | B1 | 707 × 1000 | C1 | 648 × 917 |
| A2 | 420 × 594 | B2 | 500 × 707 | C2 | 458 × 648 |
| A3 | 297 × 420 | B3 | 353 × 500 | C3 | 324 × 458 |
| A4 | 210 × 297 | B4 | 250 × 353 | C4 | 229 × 324 |
| A5 | 148 × 210 | B5 | 176 × 250 | C5 | 162 × 229 |
| A6 | 105 × 148 | B6 | 125 × 176 | C6 | 114 × 162 |
| A7 | 74 × 105 | B7 | 88 × 125 | C7 | 81 × 114 |
| A8 | 52 × 74 | B8 | 62 × 88 | C8 | 57 × 81 |
| A9 | 37 × 52 | B9 | 44 × 62 | C9 | 40 × 57 |
| A10 | 26 × 37 | B10 | 31 × 44 | C10 | 28 × 40 |

TABLE (4)

| standard format | Size mm² | contents format |
|---|---|---|
| C6 | 114 × 162 | A4 folded twice = A6 |
| DL | 110 × 220 | A4 folded twice = 1/3 A4 |
| C6/C5 | 114 × 229 | A4 folded twice = 1/3 A6 |
| C5 | 162 × 229 | A4 folded twice = A5 |
| C4 | 229 × 324 | A4 |
| C3 | 324 × 458 | A3 |
| B6 | 125 × 176 | C6 envelope |
| B5 | 176 × 250 | C5 envelope |
| B4 | 250 × 353 | C4 envelope |
| E4 | 280 × 400 | B4 |

The standard format of the printing medium 30 format is determined by comparing the known widths and lengths of the standard formats of the printing media with the calculated width or length of the printing medium 30 depending on the printing medium 30 feeding direction.

Figure 18:
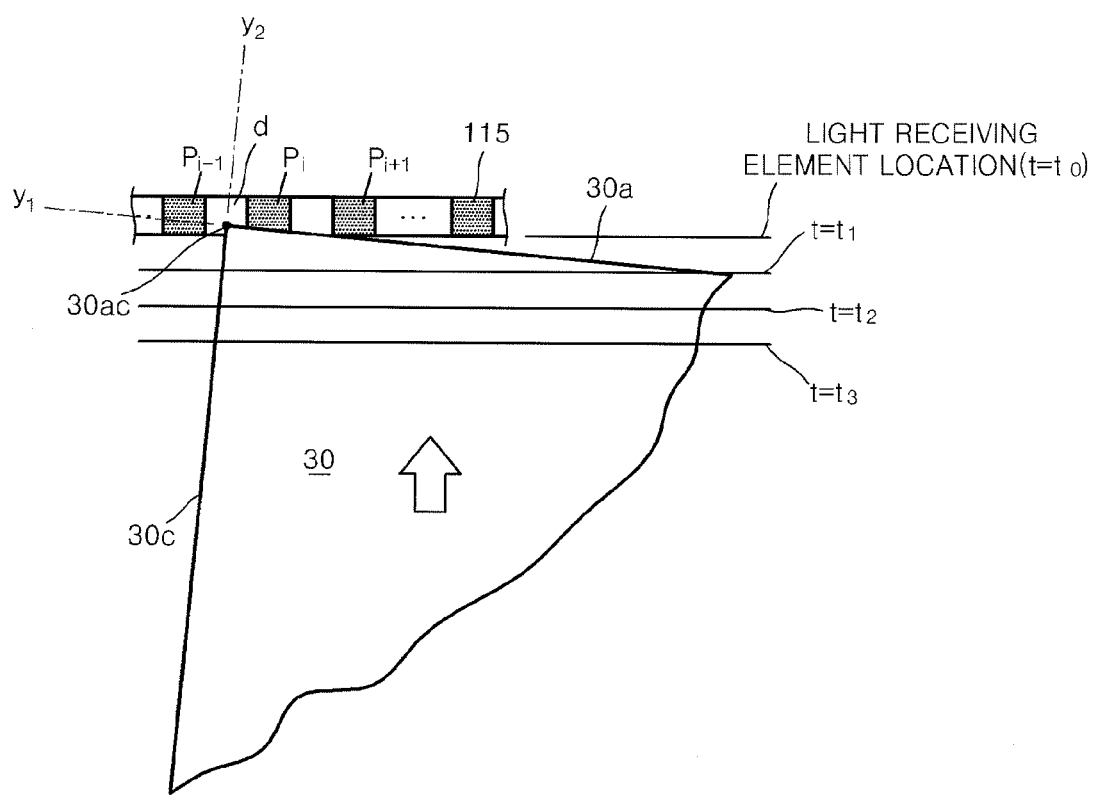
FIG. 18 is a view illustrating a case that a vertex of the skewed printing medium enters an interval between the $i-1^{th}$ and $i^{th}$ light receiving elements.

Also as illustrated in FIG. 18, determining the format of the fed printing medium 30 may also include determining a vertex position of the vertex 30ac when the vertex of the printing medium 30 enters the interval d between the adjacent light receiving elements P.

The vertex position may be determined by storing an output pattern transition of the light receiving elements according to the skew quantity, periodically storing of the output values detected in the light receiving elements, deciding of the skew quantity by comparing the output values detected by the light receiving elements with the pattern stored in a lookup table, calculating a first line which extends straight from the leading edge 30a of the printing medium 30 and a second line which extends straight from one side edge 30b or 30c of the printing medium 30, and calculating of the printing medium vertex position 30ab or 30ac from an intersection point of the first line and the second line.

Here, an accuracy of the contour form information is dependent on an efficiency of the light receiving element. Table 6 represents different sensor pitches of the light receiving elements of different resolutions and a corresponding number of unit sensing elements P per 100 mm. As illustrated, higher resolution narrows the sensor pitch and increases the unit sensing elements P per 100 mm.

TABLE (6)

| resolution dpi | sensor pitch μm | N/100 mm$^{-1}$ |
|---|---|---|
| 600.00 | 42.3 | 2362 |
| 300.00 | 85 | 1181 |
| 150.00 | 169 | 591 |
| 75.00 | 339 | 295 |
| 37.50 | 677 | 148 |
| 18.75 | 1355 | 74 |
| 9.38 | 2709 | 37 |
| 4.69 | 5419 | 18 |
| 2.34 | 10837 | 9 |
| 1.17 | 21675 | 5 |
| 0.59 | 43349 | 2 |
| 0.29 | 86699 | 1 |
| 0.15 | 173397 | 1 |

TABLE (5)

| name | Inch² | mm² | ratio | name | inch² | mm² | ratio |
|---|---|---|---|---|---|---|---|
| Quatro | 10 × 8 | 254 × 203 | 1.25 | Medium | 23 × 18 | 584 × 457 | 1.2778 |
| Foolscap | 13 × 8 | 330 × 203 | 1.625 | Royal | 25 × 20 | 635 × 508 | 1.25 |
| Executive, Monarch | 10½ × 7¼ | 267 × 184 | 1.4483 | Elephant | 35 × 23 | 711 × 584 | 1.2174 |
| Government-Letter | 10½ × 8 | 267 × 203 | 1.3125 | Double Demy | 35 × 23½ | 889 × 597 | 1.4894 |
| Letter | 11 × 8½ | 279 × 216 | 1.2941 | Quad Demy | 45 × 35 | 1143 × 889 | 1.2857 |
| Legal | 14 × 8½ | 356 × 216 | 1.6471 | Statement | 8½ × 5½ | 216 × 140 | 1.5455 |
| Ledger, Tabloid | 17 × 11 | 432 × 279 | 1.5455 | index card | 5 × 3 | 127 × 76 | 1.667 |
| Post | 19¼ × 15½ | 489 × 394 | 1.2419 | index card | 6 × 4 | 152 × 102 | 1.5 |
| Crown | 20 × 15 | 508 × 381 | 1.3333 | index card | 8 × 5 | 203 × 127 | 1.6 |
| Large Post | 21 × 16 | 533 × 419 | 1.2727 | international business card | 33/8 × 21/8 | 86.60 × 53.98 | 1.586 |
| Demy | 22½ × 17½ | 572 × 445 | 1.2857 | U.S. business card | 3½ × 2 | 89 × 51 | 1.75 |

TABLE (6)-continued

| resolution dpi | sensor pitch μm | N/100 mm$^{-1}$ |
|---|---|---|
| 0.07 | 346795 | 0 |
| 0.04 | 693589 | 0 |
| 0.02 | 1387179 | 0 |

Accordingly, relatively more accurate information on the printing medium 30 can be detected if using the light receiving element 115 with better resolution. For example, the light receiving element of 600 dpi resolution has the sensor pitch of 42.3 μm and can measure the vertex 30ac or 30ab of the printing medium 30 with almost no detecting error.

Also, the skew quantity may be calculated by comparing with the output values of the light receiving elements with tabulated values associated with corresponding skew quantities. To calculate the skew quantity, the horizontal displacement between a first light receiving element detecting a transition at a first time, and a second light receiving element detecting a transition at a predetermined time later (or predetermined distance of travel of the printing medium) is determined.

As illustrated in table 7, the horizontal displacement value detected from the light receiving element changes according to the skew quantity. Table 7 illustrates a skew quantity corresponding to a horizontal displacement of two light receiving elements, the two light receiving elements detecting a transition at different times corresponding to a 100 mm transfer amount of the printing medium. The transition may be the change from no coverage to coverage of the light receiving element by the printing medium, or from coverage to no coverage.

Other values associated with a skew quantity may be used in the table rather than the horizontal displacement measured in millimeters. For example, a difference in the index value of the light receiving elements P may be used.

TABLE (7)

| skew quantity ° | horizontal displacement mm |
|---|---|
| 0.0 | 0.000 |
| 0.1 | 0.175 |
| 0.2 | 0.349 |
| 0.3 | 0.524 |
| 0.4 | 0.698 |
| 0.5 | 0.873 |
| 0.6 | 1.047 |
| 0.7 | 1.222 |
| 0.8 | 1.396 |
| 0.9 | 1.571 |
| 1 | 1.745 |
| 2 | 3.490 |
| 3 | 5.234 |
| 4 | 6.976 |
| 5 | 8.716 |
| 6 | 10.453 |
| 7 | 12.187 |
| 8 | 13.917 |
| 9 | 15.643 |
| 10 | 17.365 |
| 11 | 19.081 |
| 12 | 20.791 |
| 13 | 22.495 |
| 14 | 24.192 |
| 15 | 25.882 |
| 16 | 27.564 |
| 17 | 29.237 |
| 18 | 30.902 |

TABLE (7)-continued

| skew quantity ° | horizontal displacement mm |
|---|---|
| 19 | 32.557 |
| 20 | 34.202 |

Therefore, the skew quantity may be obtained by comparing the detected output values with those in the look up table (LUT) after storing the output pattern of the light receiving element and its corresponding skew quantity in LUT format.

FIG. 18 is a view illustrating a case that the vertex 30ac of the skewed printing medium 30 enters an interval d between the i–1$^{th}$ and i$^{th}$ light receiving elements.

Referring to FIG. 18, output values detected from the light receiving elements are stored in the memory at periodic time intervals, for example t=t0, t1, t2, t3, . . . . At this time, if the output value is assumed to be stored as eight bit information distinguishing 256 different values, the stored data for each output value includes the index number and the polling number and is extracted in ordered pair as (i, j). Here, i denotes the index numbers of the light receiving elements $P_{i-1}$, $P_i$, etc. having the detected values ranging from 0 to 255. The detected output values from the light receiving elements are divided into a plurality of sections according to a predetermined reference values and the polling number designates allocating numbers of the each section. Also, j is related to the polling number and the detected output values as, j=polling number×sensor pitch+output value.

The first line $y_1$ corresponds to the front edge 30a of the printing medium 30 and the second line $y_2$ corresponds to the side edge 30c of the printing medium 30. As illustrated in FIG. 18, if the printing medium 30 is skewed clockwise as viewed above from the light receiving element, the first line and the second line may be obtained by connecting a set of the ordered pairs (i, j) in the left side and that of the right side of the light receiving elements.

Also, through measuring the intersection point of the first line y1 and the second line y2, the exact position of the vertex 30ac of the printing medium 30 can be calculated even if the vertex 30ac is positioned at the interval d.

Also, the skew quantity of the printing medium 30 is possible to calculate from slopes of the first and second lines y1 and y2. If the slope of the first line y1 is negative (–), the printing medium 30 is skewed in clockwise direction or if it is positive (+), the printing medium 30 is skewed in counterclockwise direction. Then, the detecting error from the pitch limit and the interval d between the light receiving elements can be solved. The feeding position information of the printing medium 30 is applicable for a color registration compensation that will be described later.

A method of determining the skew quantity of the printing medium 30 referring to FIG. 17 includes counting between the detection of two opposite vertexes 30ac and 30ab of the leading edge 30a, deciding whether the printing medium 30 is skewed, storing the index value according to the skewing of the printing medium 30 and calculating the skew quantity.

The counting stores a count number counted by the counter 125 from the time when the interference of the printing medium 30 is first detected until the time when the opposite of the two vertexes 30ac and 30ab is moved to interfere with the light receiving elements. Deciding which direction the printing medium is skewed is dependent on which light receiving element first detects the interference of the printing medium 30. When the printing medium 30 is first detected, the counter 125 is reset, the counter number is increased every time the output values detected by the light receiving elements are read, and the counter number is updated and stored in the memory 121.

The output values from the light receiving element are stored and analyzed to determine the locations of the forward vertexes of the printing medium. The first vertex location is determined to correspond to the index number of the light receiving element first detecting interference of the printing medium 30. As the printing medium first crosses the light receiving unit 115, if more than one light receiving element together first detect interference of the printing medium 30 (e.g., at t=t0), the first vertex location is determined to correspond to the index number of the light receiving element farthest away from the center index i_cnt. The second vertex location is determined to correspond to the index number first detecting a transition from interference to no interference (when it is determined that skew exists).

More specifically, an index number of the light receiving element that changes its output value is confirmed and compared with a center index (i_cnt) of the light receiving element when the printing medium 30 is initially detected (at this point, the counter number counted in the counter has been previously reset to 0). If at this time the center index (i_cnt) also has a change in its output value indicating interference of the printing medium 30, it is determined that there is no skew. Otherwise, if the detected index value is smaller than the center index (i_cnt), the skew is a left side skew (clockwise rotation) and the output values of the light elements are stored in the first index (i_cw). On the other hand, if the detected index value is larger than the center index (i_cnt), the skew is a right side skew (counterclockwise rotation) and the output values of the light elements are stored in the second index (i_ccw). Here, during a clockwise skew as illustrated in FIG. 18, the counter number counted in the counter 125 is increased after the printing medium 30 is first detected and ceases to be increased after detecting that the right vertex (30ab in FIG. 17) has passed the light receiving elements. Then, the position of the right vertex may be determined from the vertex number of the right vertex (corresponding to its horizontal position in FIG. 17) and from the counter number held in the counter (corresponding to its vertical position in FIG. 17).

Further, the skew quantity may be calculated using the counter number (used to determine T as noted above with respect to Equation (5)) and the index numbers (i_cw) and (i_ccw). Here, the skew quantity is preferred to be represented as an angle which satisfies equation (6).

$$\text{Skew quantity} = \arctan(Y/X) \quad \text{Equation (6)}$$

where X and Y follow the definition according to Equation (5).

Meanwhile, the skew quantity of the printing medium may continuously change while being fed from the printing medium feed unit 31, 32 and 33 to the target location (here, the image transfer location). Therefore, the skew quantity at the transfer location may be extrapolated from the measured skew quantity at the detecting unit 110 location.

For this, a method of determining the skew quantity further includes determining whether the skew quantity continues to change while the printing medium 30 is being transported, and estimating the skew quantity at the target location (for example the transfer location) if the skew quantity is determined to continue to change.

Determining a skew quantity change is examined by referring to FIGS. 14 and 16. First, the respective skew quantities of the fed printing medium 30 are calculated through the first and second detecting units 151 and 155 arranged at locations Px and Py along the media transport path 20 of the printing medium 30. Here, the first and the second detecting units 151 and 155 include the plurality of light receiving elements arranged in the width direction of the printing medium 30. Then, the change of the skew quantity is decided by comparing the skew quantities detected in the first and second detecting units 151 and 155.

If a change is determined, the skew quantity at the target location can be calculated through using Equation (4).

Determining of the shift quantity here uses the leading edge 30a of the printing medium 30 as a reference when the printing medium 30 is shifted and skewed while being fed.

Referring to FIG. 2, the example includes detecting the initial interference of the printing medium 30, storing the output values from the light receiving elements, determining the left and right top boundary locations of the printing medium 30, and calculating the shift quantity of the printing medium 30.

After detecting the initial interference of the printing medium 30, the output values from the light receiving elements are stored over multiple sampling periods to determine indexes i_cw and i_ccw corresponding to locations of the top left and right boundary locations of the printing medium 30).

Then, the shift quantity at the detecting location is calculated. In this example, the shift quantity satisfies is calculated in accordance equation (7).

$$\text{shift quantity} = [(i\_cw + i\_ccw)/2 - i\_cnt] \times (w+d) + m \quad \text{Equation (7)}$$

where w, d and m follow the definition in equation (5). If the shift quantity from equation (7) is negative, it means printing medium 30 has shifted to the left (in FIG. 17, e.g.) and if the shift quantity from equation (7) is positive, it means the printing medium 30 has shifted to the right.

Meanwhile, the shift quantity may change while the printing medium 30 continues to be transported to the target location (image transfer location). Then, the shift quantity at the transfer location may be determined from the measured shift quantity at the location of the detecting unit 110.

For this, the method of determining the shift quantity further includes discerning whether the shift quantity has continued to change as the printing medium 30 continues to be transported, and calculating the shift quantity at the target location (for example the transfer location) if the shift quantity continues to change.

Referring to FIGS. 14 and 15, the discerning of the shift quantity change is examined. First, the respective shift quantities of the fed printing medium 30 are calculated through the first and second detecting units 151 and 155 arranged at Px and Py along the media transport path 20 of the printing medium 30. Here, the first and the second detecting units 151 and 155 include the plurality of light receiving elements arranged in the width direction of the printing medium 30. Then, the change of the shift quantity is discerned by comparing the shift quantities detected in the first and second detecting units 151 and 155.

If a change in the shift quantity is discerned, the shift quantity at the target location can be estimated by using Equation (3).

The method of detecting the printing media detecting printing medium according to the above examples acquires the contour form information of the printing medium through the detecting unit and determines the format, the skew quantity and/or the shift quantity. Also, even if the vertex of the leading edge enters an interval between adjacent light receiving elements, the position of the vertex of the leading edge can be calculated.

Further even if at least one or both of the shift quantity and the skew quantity changes during the continued transport of the printing medium, the shift and skew quantities at the target location can be estimated through extrapolation.

Hereinafter, through using the position information of the printing medium detected in the above mentioned method, an image forming apparatus developing an optimized image on the photosensitive body and transferring the same to the printing medium, and a method of creating the image by the image forming apparatus will be explained in detail.

Referring to FIG. 1, the image forming apparatus according to the present exemplary embodiment, includes printing medium feed units 31, 32 and 33, and the image forming unit 10 and the medium detecting device 100.

The image forming unit 10 forms an image on the fed printing medium 30 with an electro-photographic process, and ink-jet process, or some other image forming process.

FIG. 1 illustrates an image forming unit 10 using an electro-photographic process, including a photosensitive body 1, a charger 2, an exposure unit 3, a development unit 4 and 5 that develops the toner image corresponding to the electro-static latent image, a transfer unit 6 that transfers the developed toner image to the printing medium 30 and a fusing unit 8 that fuses the transferred toner image on the printing medium 30.

The medium detecting device 100 disposed on the media transport path detects the contour form information of the fed printing media 30 and determines the format and the feeding position of the printing medium 30 based on the detected contour form information. The medium detecting device 100 may be the same as the medium detecting device explained above and such detailed description is not repeated here.

Also, referring to FIG. 2, the image forming apparatus according to the present exemplary embodiment may further include an image compensating unit 200 and a user interface (UI) unit 300. The image compensating unit 200 compensates for an image forming error through feedback of the contour form information of the fed printing medium 30 detected by the medium detecting device 100. The UI unit 300 informs a user of information regarding the printing medium 30 detected by the discriminating unit 120. Further, the UI unit may be, for example, a software operating in the host computer, a display provided in the image forming apparatus, and/or an alarm.

Referring to FIGS. 1 and 2, the method of image outputting of the image forming apparatus according to the exemplary embodiment includes detecting the contour form information of the fed printing medium 30, determining the format and the feeding position of the printing medium 30 and compensating an image forming error through feedback of the determined format and the feeding position of the printing medium 30 to the image forming unit 10.

The detection of the contour form information and the determination of the format and the position may be the same to the media detecting method formerly mentioned and such detailed description is not repeated here.

The image formation error is compensated based on the contour form information such as, the format of the printing medium 30, the skew quantity and/or the shift quantity. Here, the image compensation is performed by modifying an image signal contained in a light beam which scans the photosensitive body 1 through the exposure unit 3. Specifically, the image signal contained in a scanned line is generated corresponding to the skew and shift quantities of the printing medium 30. For example, the image formation error may be compensated by through controlling the exposure unit 3 to skew the image signal as much as the skew quantity of the printing medium 30 during the formation of the electro-static latent image on the photosensitive body 1. Also, if the printing medium is shifted to one side, the shift quantity may be compensated through adjusting line scanning start and end times of the light beam.

Also for an ink-jet image forming apparatus, the shift quantity may be compensated through adjusting ink-jet start and end times when the ink-jet head is installed in a reciprocating carriage. Accordingly, poor printing from the loss of an image may be prevented for a shifted printing medium 30 by adjusting the start and end of the printing times.

Also, the method of image forming may further include determining whether format of the printing medium corresponds with the user set printing medium standard format and notifying the incompatibility to a user if the format does not correspond to the preset standard format. Alternatively, the method may include adjusting the image data to conform with the detected format, such as printing a partial image in the event the printing medium is determined to be smaller than the format corresponding to the image data and/or compressing or expanding the image data according to the detected format of the printing medium so that the printed image fits within the borders of the printing medium. The adjustment of the image data may be done by the image compensation unit 200. The image compensation unit may be an element of the image forming apparatus 100, an element of the host computer, or be partially located in the host computer and partially located in the image forming apparatus 100, as desired.

In deciding whether the fed printing medium format corresponds with printing media standard format set by a user, the image forming apparatus determines the format of the fed printing medium 30. Here, if the detected format does not correspond with the user set format, the user is notified through the UI unit 300. Then, a user may check and load the correct printing medium 30 on the appropriate medium feed unit (31, 32 and/or 33) corresponding to the user set standard format for the image to be printed.

Also, the image forming apparatus may determine whether there is any other cartridge in one of the printing medium feed units that should be loaded with the size (or format) corresponding to the image size (or user set format) before notifying the a user of the lack of corresponding formats through the UI unit 300. Here, if it is decided that the corresponding printing medium exists, the corresponding printing medium 30 may be fed without notifying the user. If the corresponding printing medium 30 cannot be found in any cartridge, the discriminating unit 120 notifies the user through the UI unit 300.

Also, if the skew or the shift quantity of the printing medium 30 exceeds the permitted value, the image forming apparatus pauses printing and discharges the printing medium 30 through the discharge roller (42 in FIG. 1) or processes the job as a jam. New printing medium 30 may be fed from the printing medium feeding unit 31, 32 or 33 and the image of the paused may be reprinted and the job continued from there. The message requiring to check the load state of the printing medium may be displayed through the UI unit 300.

The image forming apparatus configured as mentioned above acquiring the contour form information of the printing medium 30, may include the media detecting device that detects the format, the skew quantity and/or the shift quantity of the printing medium 30, and may form the image at the correct position on the printing medium 30.

Accordingly, forming of an image misaligned with the printing medium 30 can be prevented even if the printing medium format is not matched. Also, the image may be formed on the desired location on the printing medium 30 by compensating the formation of the image on the photosensitive body 1 with an appropriate quantity even if the printing medium 30 is skewed and/or shifted while transported.

Hereinafter, a color image forming apparatus that can compensate a color registration according to an exemplary embodiment, a color registration device in the color image forming apparatus and a color registration method will be explained.

An electrophotographic color image forming apparatus according to the present exemplary embodiment includes an apparatus which forms a full color image by overlapping an image of a single color with an image of different single color. The overlapped mono color images should be aligned with each other. For this purpose, a compensating unit that performs color registration is included in the color registration device.

Before examining the electrophotographic color image forming apparatus, the general color image forming apparatus will be introduced.

The electrophotographic image forming apparatus is classified to a multi-pass type and a single pass type depending on the number of image forming elements forming the color image on one printing medium 30.

The multi-pass type image forming apparatus is equipped with independent development units of respective colors, and a scanning unit and a photosensitive body for common use, thereby having an advantage of a compact configuration. On the other hand, the multi-pass image forming process is slow in printing compared to the single-pass color printing.

The single pass type electrophotographic color image forming apparatus, having difficulty in color registration, is examined, and a device and method of the color registration is explained in detail.

Figure 19:
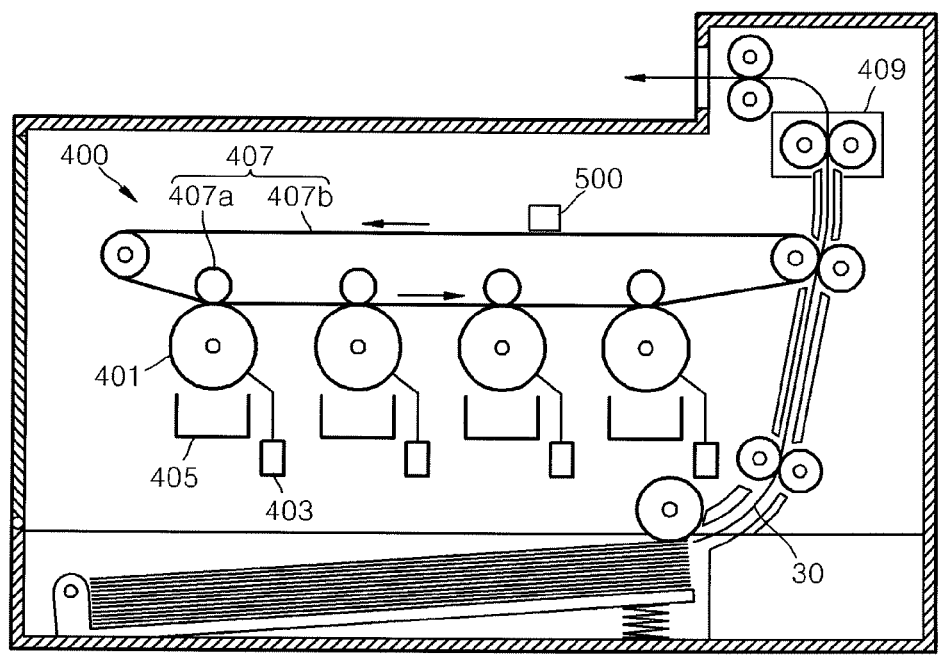
FIG. 19 is a schematic view illustrating a single path type electro-photographic color image forming apparatus according to an exemplary embodiment.
Figure 20:
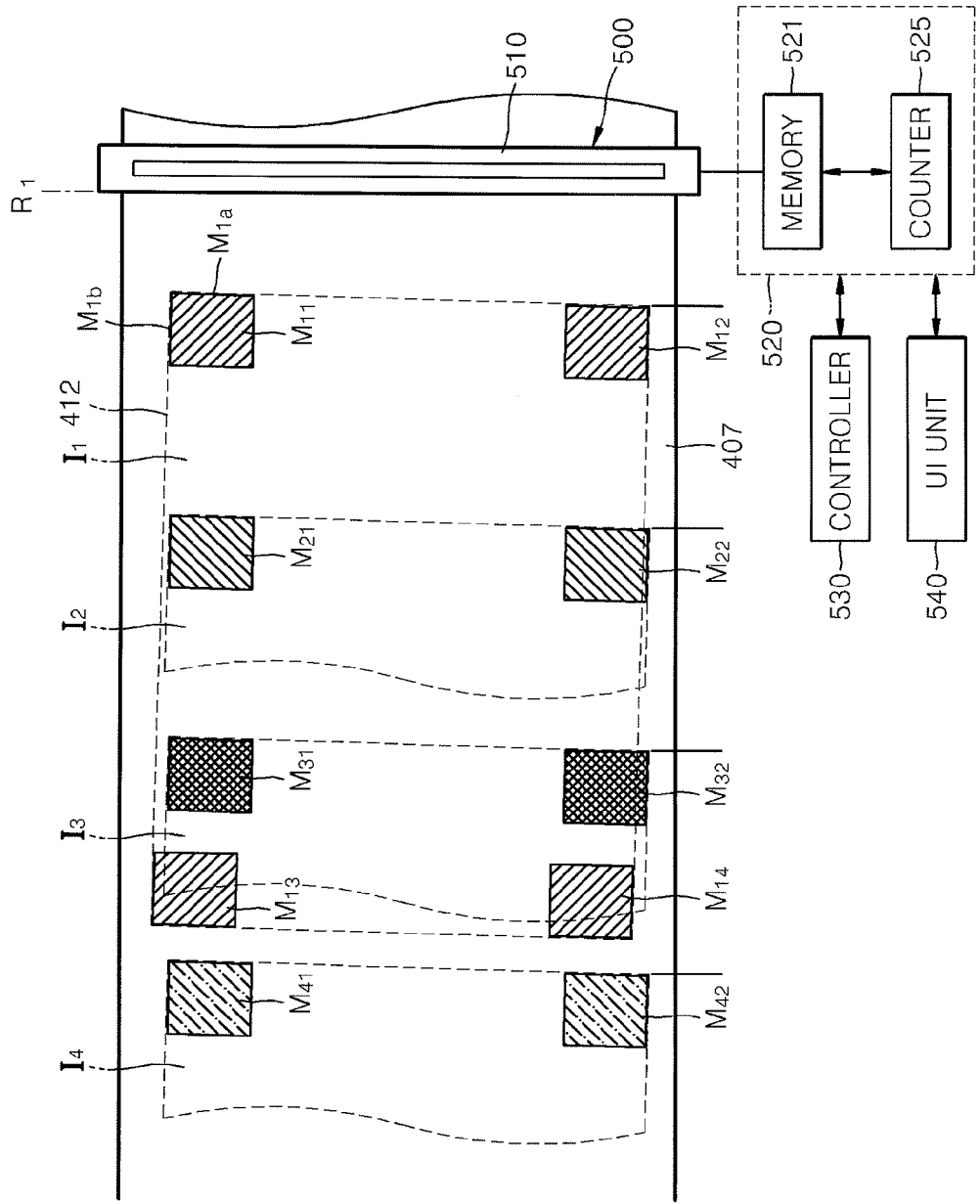
FIG. 20 is a view illustrating a color registration device according to another exemplary embodiment.

FIG. 19 is a schematic view illustrating a single path type electro-photographic color image forming apparatus according to an exemplary embodiment. Further, FIG. 20 is a view illustrating test patterns for respective colors on an image transfer path according to this exemplary embodiment.

Referring to FIG. 19, the color image forming apparatus according to an exemplary embodiment independently forms predetermined images for respective colors, overlaps the images of respective colors to form a color image, and includes an image forming unit 400 and a color registration device 500.

The image forming unit 400 forms the color image to the fed printing medium 30 and test patterns ($M_{11}, \ldots, M_{42}$) of corresponding respective colors proportional to the formats of the printing medium 30 on the image transfer path (for example, transfer unit 407 of belt type illustrated in FIG. 19).

For this, the image forming unit 400 includes a photosensitive body 401, an exposure unit 403 to form a latent image by scanning a light to the photosensitive body 401, a development unit 405 to form a visible image through developing a toner on the latent image on the photosensitive body 401, a transfer unit 407 to transfer the visible toner image developed on the photosensitive body 401 to the printing medium 30, a fusing unit 409 that heats and presses to fuse the image transferred to the printing medium 30, and a color registration device 500.

The development unit 405 disposed to face the photosensitive body 401 develops the toner on a region where the latent image on the photosensitive body 401 is formed. The development unit 405 and the photosensitive body 401 are provided for each color to form a full color image during a single pass. FIG. 19 illustrates an example configuration of the four development units 405 and four photosensitive bodies 401 to implement four colors, yellow, magenta, cyan and black.

The respective exposure units 403 scan light beams to form the latent images on the respective photosensitive bodies 401. For this, the exposure units 403 have independent light beam configurations in order to scan light beams at the same time on the respective plural photosensitive bodies 401.

The transfer unit 407 is arranged to face each photosensitive body 401 and the printing medium 30 fed along the media transport path is disposed therebetween. The transfer unit 407 transfers the toner image formed on each photosensitive body 401 to the printing medium 30. Then, the transferred image on the printing medium 30 is fused through the fuse unit 409.

Though not shown in FIG. 19, each of the plural photosensitive bodies 401 of the single pass way color image forming apparatus is associated with an independent charger at locations to charge the photosensitive body 401 to a predetermined electrical potential, an independent eraser to remove a residual charge remained on the photosensitive body 401, and an independent cleaning unit to remove a material adhered on the photosensitive body 401.

The single pass electrophotographic color image forming apparatus thus configured sequentially transfers and overlaps the toner images formed on the respective photosensitive bodies 401 of each color to the printing medium 30 fed between the photosensitive body 401 and the transfer unit 407

Since the light beams are separately scanned on the plural photosensitive bodies 401, it is difficult to accurately overlap the color images transferred to the printing medium. This difficulty results from a tolerance in assembling components which form the image such as the photosensitive body 401, the exposure unit 403 and the transfer unit 407, and a difference in a start signal between each exposure unit 403.

For example, in order to form an overlapped image of first and second colors by sequentially transferring an image of the first color and an image of the second color to the printing medium 30, the front edge position with respect to the transfer direction of the printing medium of the first color image may not correspond to that of the second color image due to the assembling tolerance of the components and a poorly synchronized scanning start time of the scanning light beams associated with the first and second color images. Also, a misalignment in the scanning direction may be produced due to assembling tolerances.

The mis-alignment of the images is called mis-registration and causes the poor printing.

The color registration device 500 addresses the mis-registration problem and compensates for a color mis-registration by detecting color registration information from contour form information of each color image.

The color registration device 500 installed adjacent to the transfer unit 407 acquires formation information on each color test pattern as will now be discussed.

Here, the transfer unit 407 includes a plural transfer support rollers 407a disposed opposite to each photosensitive body 401 and a transfer belt 407b that winds about the transfer support rollers 407a and on which the printing medium 30 is supported during the transfer of the color image. The transfer belt 407b charges the printing medium 30 to a predetermined electrical potential so that the respective images formed on the plural photosensitive bodies 401 may be sequentially transferred to the fed printing medium 30.

Further, a color test pattern formed on each photosensitive body 401 is transferred to the transfer belt 407b.

If the image forming apparatus is configured as FIG. 19, the test pattern includes a first through a fourth test pattern ($M_{11}$, $M_{12}$)($M_{21}$, $M_{22}$)($M_{31}$, $M_{32}$)($M_{41}$, $M_{42}$) corresponding to each color. Here, the first through the fourth test patterns ($M_{11}$, $M_{12}$)($M_{21}$, $M_{22}$)($M_{31}$, $M_{32}$) and ($M_{41}$, $M_{42}$) are separated by a predetermined distance from each other.

Also, image regions ($I_1$, $I_2$, $I_3$, $I_4$) are used as a reference where the toner image is formed. Specifically, the respective first through fourth test patterns ($M_{11}$, $M_{12}$)($M_{21}$, $M_{22}$)($M_{31}$, $M_{32}$) ($M_{41}$, $M_{42}$) are formed at predetermined locations of corresponding image regions ($I_1$, $I_2$, $I_3$, $I_4$) including opposite side edges of front and end edges of the image region.

The image region $I_1$ corresponds to a region on transfer belt 407b where the printing medium 30 is expected to be located during a printing operation. The image region $I_1$ includes front edge part 411 and a pair of side edge parts 412. Two patterns $M_{11}$, $M_{12}$ included in the first test pattern are respectively disposed at two opposite side edges close to the front edge. That is, a front end edge $M_{1a}$ and a side end edge $M_{1b}$ of the first patterns $M_{11}$ and $M_{12}$ correspond to the front edge part 411 and the side edge part 412 of the image region $I_1$. Then, the width and position (the skew quantity, the shift quantity) of the image region $I_1$ can be determined if the contour form information of the first test patterns $M_{11}$, $M_{12}$ is read.

Here, in order to determine the length of the image region $I_1$, the first test pattern may further include two more test patterns ($M_{13}$, $M_{14}$) at locations corresponding to side edges 412 close to the back edge of the image region $I_1$. Then, the entire contour form of image region $I_1$ may be determined by determining the locations of the four test patterns of the first test pattern ($M_{11}$, $M_{12}$, $M_{13}$, $M_{14}$).

The relationship between the second through fourth test patterns and their corresponding image regions ($I_2$, $I_3$, $I_4$) may be the same as the relationship between the first test pattern and its corresponding image region $I_1$, and a detailed explanation will not be repeated.

The size of the first through fourth test pattern ($M_{11}$, $M_{12}$) ($M_{21}$, $M_{22}$)($M_{31}$, $M_{32}$) and ($M_{41}$, $M_{42}$) is determined in consideration of a resolution of a detecting unit 510. In other words, the test pattern size for a detecting unit 510 of higher resolution may be formed relatively smaller compared to one of lower resolution.

The color registration device 500 according to an exemplary embodiment of the present general inventive concept is disposed across the transfer belt 407b and includes the detecting unit 510 to detect the contour form and their positions information of the first through fourth test patterns ($M_{11}$, $M_{12}$)($M_{21}$, $M_{22}$)($M_{31}$, $M_{32}$) and ($M_{41}$, $M_{42}$), a discriminating unit 520 to determine whether the mis-registration occurs or not based on the detected data from the detecting unit 510 and a controller 530 to compensate the color mis-registration.

The detecting unit 510 is arranged at a predetermined location across the transfer belt 407b in a width direction of the transfer belt 407b where the first through fourth test patterns ($M_{11}$, $M_{12}$)($M_{21}$, $M_{22}$)($M_{31}$, $M_{32}$) and ($M_{41}$, $M_{42}$) information can be detected.

Accordingly, the detecting unit 510 sequentially detects basic information required in the color registration including the size of the first through fourth test patterns ($M_{11}$, $M_{12}$) ($M_{21}$, $M_{22}$)($M_{31}$, $M_{32}$) and ($M_{41}$, $M_{42}$) formed on the transfer belt 407b, the shift quantity and the skew quantity.

The configuration of the detecting unit 510 may be same as the detecting unit 110 to detect the printing medium 30 according to the embodiment illustrated in FIGS. 2 and 3 except that when the transfer belt 407b is not transparent, that the light receiving unit 115 and light source 111 may both be on the exterior side of the transfer belt 407b. The remaining construction of the detecting unit 510 may be the same and such detailed description is not repeated here.

Figure 21:
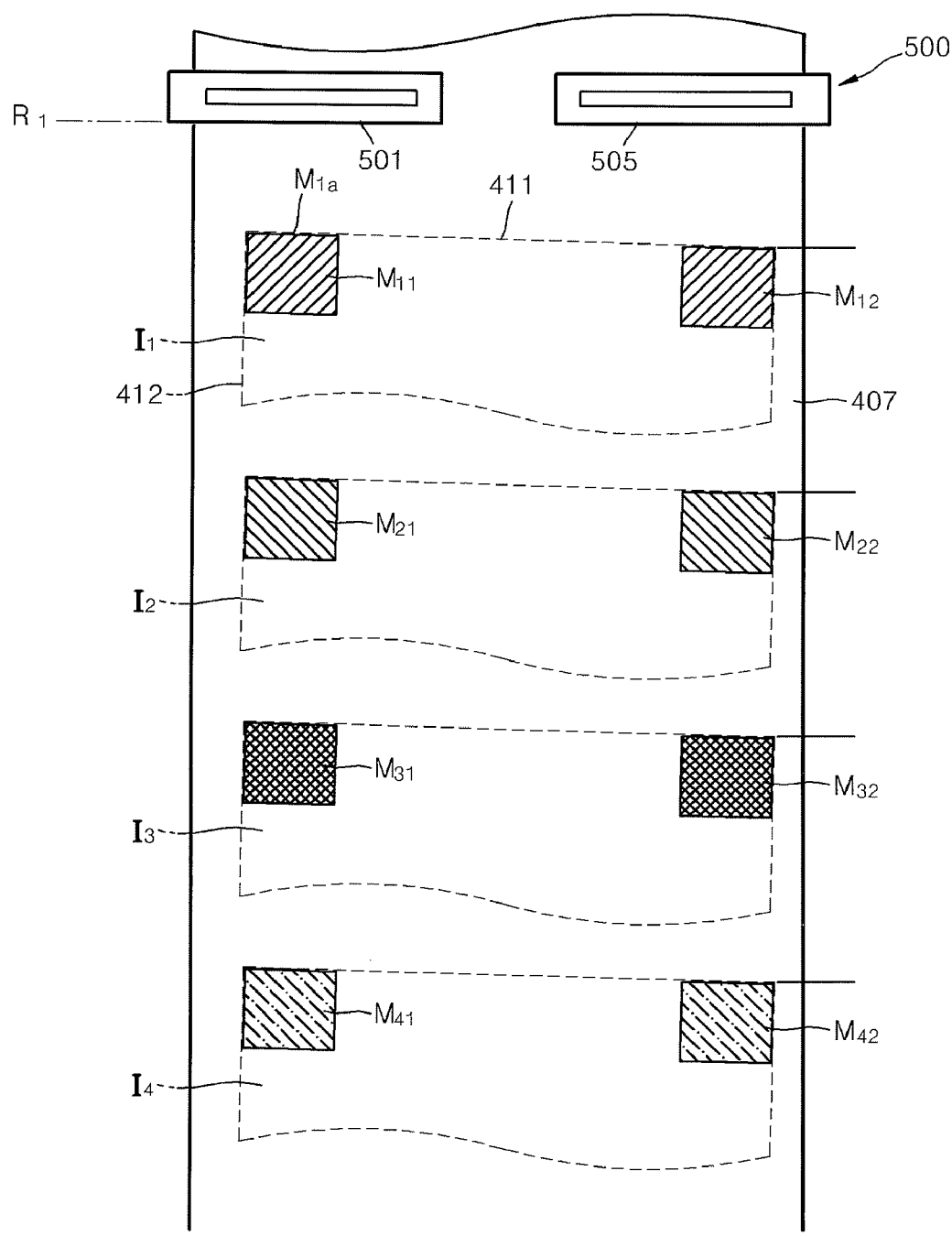
FIG. 21 is a view illustrating a color registration device according to another exemplary embodiment.

However, the detecting unit 510 is not restricted in its configuration disposed the whole region across the whole width but may be configured as FIG. 21.

Referring to FIG. 21, the detecting unit 510 may include first and second detecting units 501 and 505 separately formed on the image transfer path to correspond with the separated test pattern. The first detecting unit 501 installed at one side edge of the transfer belt 407b detects information of the test patterns ($M_{11}$, $M_{21}$, $M_{31}$, $M_{41}$) in the first through fourth test patterns formed on the left top parts of the image region ($I_1$, $I_2$, $I_3$, $I_4$). Further, the detecting unit 505 installed around the other side edge of the transfer belt 407b detects information of the test patterns ($M_{12}$, $M_{22}$, $M_{32}$, $M_{42}$) in the first through fourth test pattern formed on the right top parts of the image region ($I_1$, $I_2$, $I_3$, $I_4$).

The discriminating unit 520 includes a memory 521 and a counter 525, and calculates the front edge positions, the shift quantity, the skew quantity and the size of the first through fourth test pattern ($M_{11}$, $M_{12}$)($M_{21}$, $M_{22}$)($M_{31}$, $M_{32}$) and ($M_{41}$, $M_{42}$) after analyzing the sequentially detected first through fourth test pattern ($M_{11}$, $M_{12}$)($M_{21}$, $M_{22}$)($M_{31}$, $M_{32}$) and ($M_{41}$, $M_{42}$). The calculating method may be the same to that previously explained in the media detecting device such detailed explanation is not repeated.

Also, an interval between the first through fourth test patterns ($M_{11}$, $M_{12}$)($M_{21}$, $M_{22}$)($M_{31}$, $M_{32}$) and ($M_{41}$, $M_{42}$) is set by a predetermined value and is used to evaluate a distance error in the sub scanning direction. That is, the interval between the first through fourth test patterns ($M_{11}$, $M_{12}$)($M_{21}$, $M_{22}$)($M_{31}$, $M_{32}$) and ($M_{41}$, $M_{42}$) set to a predetermined value is compared with the measured results of the first through fourth test patterns ($M_{11}$, $M_{12}$)($M_{21}$, $M_{22}$)($M_{31}$, $M_{32}$) and ($M_{41}$, $M_{42}$) through the detecting unit 510. This is examined in more detail referring to FIG. 22.

Figure 22:
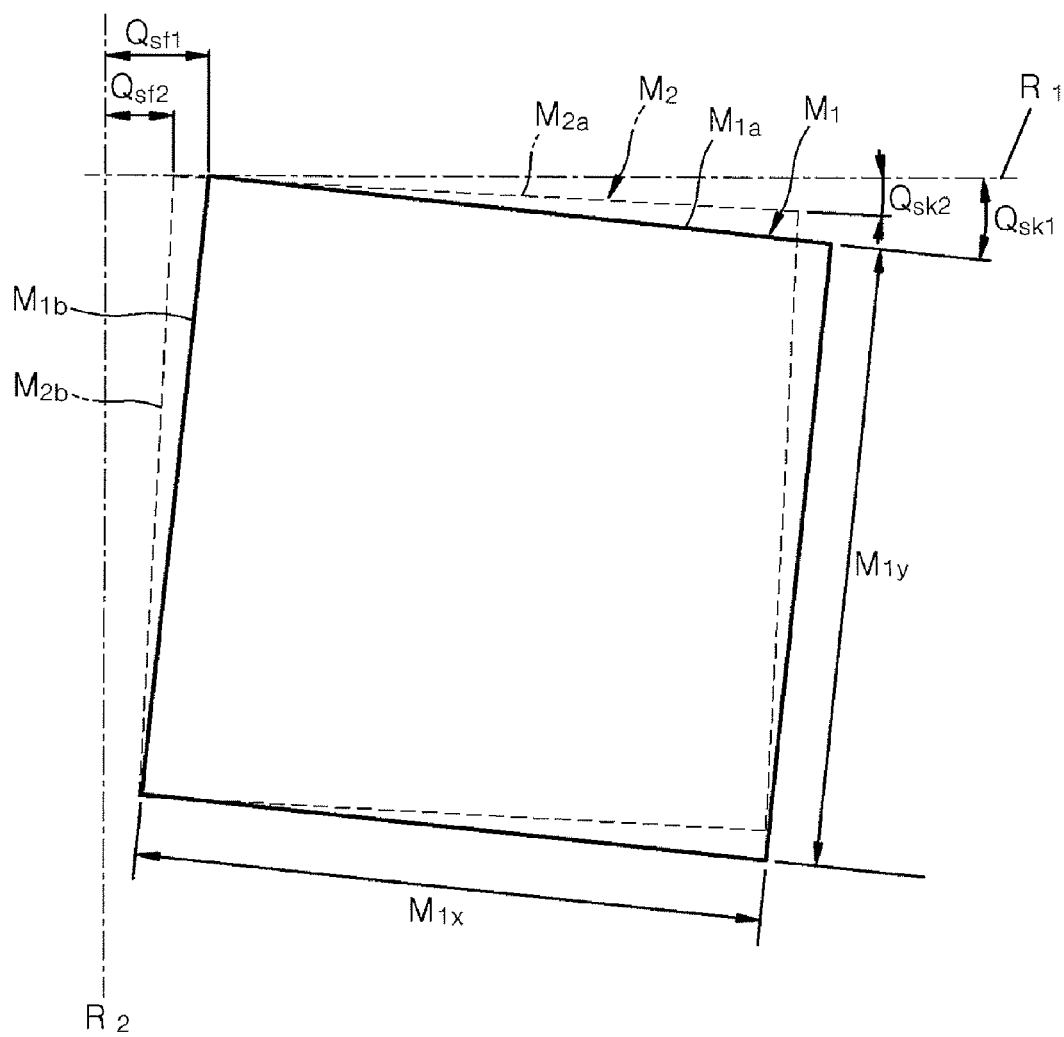
FIG. 22 is a view illustrating a relation of a first and a second test patterns arrangement of the color registration device according to an exemplary embodiment.

FIG. 22 illustrates an overlapping of the first test pattern $M_1$ with the second test pattern $M_2$. Specifically FIG. 22 illustrates a first test pattern and the second test pattern $M_2$ superimposed as a reference. The second test pattern $M_2$ is superimposed at a location in consideration of the moving velocity of the transfer belt 407b. This imitates a mixed color image formed by overlapping color images of different colors.

Referring to FIG. 22, a first and a second reference lines $R_1$ and $R_2$ are imaginary lines corresponding to the front edge and the left side edge of the test pattern in an ideal case. The skew and shift quantities are calculated based on the first and second reference lines $R_1$ and $R_2$.

Based on the first and second reference lines $R_1$ and $R_2$, FIG. 22 illustrates that the first test pattern $M_1$ has a skew quantity $Q_{sk1}$ (an angle between the top edge $M_{1a}$ and the first reference line $R_1$) and a shift quantity $Q_{sf1}$ (a gap between a vertex made by the top edge $M_{1a}$ and the side edge $M_{1b}$ and the second reference line $R_2$) while the second test pattern $M_2$ has a skew quantity $Q_{sk2}$ (an angle between the top edge $M_{2a}$ and the first reference line $R_1$) and a shift quantity $Q_{sf2}$ (a gap between a vertex made by the top edge $M_{2a}$ and the side edge $M_{2b}$ and the second reference line $R_2$). Also, the size of the first test pattern $M_1$, width $M_{1x}$ and length $M_{1y}$ can be measured.

Then, color registration between the first and the second test patterns, $M_1$ and $M_2$ can be accomplished by considering the skew quantities $Q_{sk1}$ and $Q_{sk2}$, and the shift $Q_{sf1}$ and $Q_{sf2}$ quantities and adjusting the light scanning time of each color related to an amount of the error in the controller 530.

The controller 530 recognizes an image of overlapped with each color to be transferred based on the first through fourth test patterns ($M_{11}$, $M_{12}$)($M_{21}$, $M_{22}$)($M_{31}$, $M_{32}$) and ($M_{41}$, $M_{42}$). Further, an error in the edge positions in the main and/or sub scanning direction between different colors, magnification of each color image, the skew and the shift quantities are estimated. Then, based on these estimated values, parameters that control the development units 405 and the light scanning units of respective colors such as a horizontal and vertical synchronization signals, and a shift quantity are reset in order to take into account the first through fourth test patterns ($M_{11}$, $M_{12}$)($M_{21}$, $M_{22}$)($M_{31}$, $M_{32}$) and ($M_{41}$, $M_{42}$).

Here, the adjustment of the first through fourth test patterns ($M_{11}$, $M_{12}$)($M_{21}$, $M_{22}$)($M_{31}$, $M_{32}$) and ($M_{41}$, $M_{42}$) may be made by adjusting the other test patterns, based on a single test pattern and/or adjusting the first through fourth test patterns ($M_{11}$, $M_{12}$)($M_{21}$, $M_{22}$)($M_{31}$, $M_{32}$) and ($M_{41}$, $M_{42}$) based on arbitrary reference (design) lines. The color registration of each color can be compensated through resetting parameters necessary to form the image as mentioned.

The color image forming apparatus may further include a user interface (UI) device 540. The UI device illustrates user information about the color registration determined by the discriminating unit 520.

Hereinafter, a method of color registration in the color image forming apparatus will be explained in detail.

Referring to FIGS. 19-22, a method of color registration of the color image forming apparatus according to an exemplary embodiment includes forming the test patterns ($M_{11}$, $M_{12}$)($M_{21}$, $M_{22}$)($M_{31}$, $M_{32}$) and ($M_{41}$, $M_{42}$) corresponding to the respective colors proportional to the size of a printing medium 30 to be transferred along an image transfer path, detecting the contour form information of the test patterns ($M_{11}$, $M_{12}$)($M_{21}$, $M_{22}$)($M_{31}$, $M_{32}$) and ($M_{41}$, $M_{42}$) of respective colors, determining whether the mis-registration occurs based on the data detected in the detecting unit 510 and compensating the mis-registration.

The detecting of the contour form information on the test patterns ($M_{11}$, $M_{12}$)($M_{21}$, $M_{22}$)($M_{31}$, $M_{32}$) and ($M_{41}$, $M_{42}$) may be the same as the detecting of the printing medium contour information, a detailed explanation will not be repeated.

Whether mis-registration occurs or not is determined based on comparison of contour form information of the test patterns, and may include the skew quantity and the shift quantity.

Compensation of mis-registration is based on the contour form information of the test patterns ($M_{11}$, $M_{12}$)($M_{21}$, $M_{22}$)($M_{31}$, $M_{32}$) and ($M_{41}$, $M_{42}$) such as the size of the patterns dependent on the format of the printing medium 30, the skew quantity, and the shift quantity. Here, compensation of the mis-registration includes compensating an image signal of a light beam that scans the photosensitive body 401 through the exposure unit (403 in FIG. 8). Particularly, the scanning line image signals of the respective colors produced through a respective exposure unit 403 are adjusted to compensate for the skew and shift quantities of the test patterns ($M_{11}$, $M_{12}$)($M_{21}$, $M_{22}$)($M_{31}$, $M_{32}$) and ($M_{41}$, $M_{42}$). That is, by shifting and skewing the respective image signals in accordance with the skew and shift quantities of the respective colors when forming the latent images, the color images are aligned and their mis-registration is compensated.

The method of color registration of the present information may further include informing a user of the color registration information.

The image forming apparatus of the above described configuration may include a media detecting device that acquires the contour form information of the fed printing medium 30 and correctly measures the format of the printing medium 30, the skew quantity and the shift quantity and forms an image at the correct position on the printing medium 30.

The color registration apparatus and the method of thereof can compensate through using a test pattern corresponding to a real image data to be formed different from a conventional apparatus using a particular pattern such as a line of a segment. The correct compensation can be made for positional alignments in main and sub scanning directions between the color images of respective colors, the skew quantity, shift quantity and resolutions for the respective color images.

The image forming apparatus and the image output method employing the color registration apparatus thus described may precisely compensate a mis-registration resulting from tolerances of the components related in forming an image and an optical aberration.

Although a few exemplary embodiments of the present general inventive concept have been illustrated and described, it will be appreciated by those skilled in the art that changes may be made in these embodiments without departing from the principles and spirit of the general inventive concept, the scope of which is defined in the appended claims and their equivalents. As used in this disclosure, the term "preferably" is non-exclusive and means "preferably, but not limited to." Terms in the claims should be given their broadest interpretation consistent with the general inventive concept as set forth in this description. For example, the terms "coupled" and "connect" (and derivations thereof) are used to connote both direct and indirect connections/couplings. As another example, "having" and "including", derivatives thereof and similar transitional terms or phrases are used synonymously with "comprising" (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. A color registration apparatus to independently form images of predetermined respective colors and to compensate a mis-registration between overlapped images of respective colors employed in an image forming apparatus, comprising:
    a detecting unit to detect contour form and position information of respective test patterns for each color image formed on an image transfer path by the image forming apparatus proportional to a corresponding format of a printing medium where a color image will be transferred; and
    a controller to compensate a mis-registration between the overlapped images of respective colors based on data detected by the detecting unit,
    wherein each test pattern comprises a first edge corresponding to a top edge part of the printing medium and a second edge corresponding to one side edge of the printing medium.

2. The color registration apparatus of claim 1, wherein the detecting unit comprises:
    a light source to radiate a light; and
    a plurality of light receiving elements aligned to have a length larger than a maximum width of the printing medium permitted by the image forming apparatus, the plurality of light receiving elements extending across the image transfer path in a width direction of the test patterns, and
    wherein interference of each test pattern is detected by the plurality of light receiving elements to determine a contour form of the printing medium, a skew quantity and a shift quantity of each test pattern.

3. The color registration apparatus of claim 2, wherein the color patterns are separately formed on opposite side edges along the image transfer path; and the detecting unit includes two spaced apart sub-units separately formed and positioned to correspond with the separated test patterns on the opposite side edges along the image transfer path.

4. The color registration apparatus of claim 2, wherein the plurality of light receiving elements have a same size and are separated from each other by a constant interval.

5. The color registration apparatus of claim 1, further comprising a discriminating unit which discriminates whether there is a mis-registration and an extent of the mis-registration based on the data detected by the detecting unit.

6. The color registration apparatus of claim 5, wherein the discriminating unit comprises:

a memory to store the contour form information of the respective test patterns; and a counter to calculate a transfer time between the respective test patterns, and wherein the discriminating unit determines the color registration between the respective test patterns through comparing information of the respective test patterns detected by the detecting unit and the counter and information of the respective test patterns stored in the memory.

7. The color registration apparatus of claim 6, wherein each test pattern comprises:

a first test pattern corresponding to a leading edge and opposites side edges at the leading edge of the printing medium; and a second test pattern corresponding to a trailing edge and opposites side edges at the trailing edge of the printing medium.

8. A method of a color registration that independently forms images of predetermined respective colors and compensate a mis-registration between overlapped images of respective colors employed in an image forming apparatus which forms a color image by overlapping images of respective colors, the method comprising:

forming respective test patterns for each color image on an image transfer path proportional to a corresponding a format of a printing medium where the color image will be transferred;

detecting contour form information of each test pattern; and compensating the color mis-registration based on the detected contour form information of the fed printing medium, wherein the detecting of the contour form of each test pattern comprises:

radiating a light;

receiving the radiated light by a plurality of light receiving elements which are aligned to have a length longer than a maximum width of the printing medium permitted by the image forming apparatus, the plurality of light receiving elements extending across an image transfer path of the printing medium;

at predetermined times during an existence of the respective test patterns, outputting a signal corresponding to the radiated light received by the plurality of light receiving elements; and recognizing the contour form of the respective test patterns using the output signal.

9. The method of the color registration of claim 8, further comprising determining whether there is a mis-registration and an extent of the mis-registration based on the contour form of the respective test patterns.

10. The method of the color registration of claim 9, wherein determining whether there is a mis-registration comprises determining sizes of the respective test patterns;

determining skew quantities of the respective test patterns; and determining shift quantities of the respective test patterns.

11. The method of the color registration of claim 10, wherein determining the sizes of the respective test patterns comprises:

calculating widths of the respective test patterns using an arithmetic operation having as variables a pass time of the respective test patterns, a location of individual light receiving elements of the detecting unit and a predetermined moving speed of the image transfer path.

12. The method of the color registration of claim 11, wherein the determining the sizes of the respective test patterns comprises:

determining a moving direction of the respective test patterns;

calculating widths of the respective test patterns with the output signal;

storing formats of the respective test patterns; and comparing the widths of the respective test patterns and preset formats.

13. The method of the color registration of claim 12, wherein calculating the widths of the respective test patterns with the output signal satisfies the following equations:

$$P_{width} = \sqrt{X^2 + Y^2}$$

$$X = ABS(i\_ccw - i\_cw) \times (w+d) + m$$

$$Y = f \times V \times T$$

where, for the respective test pattern, ABS means absolute value of, i_cw is an index number of the light receiving element disposed at a location which first meets a vertex of the respective test pattern and i_ccw is an index number of the light receiving element disposed at a location which meets an opposite vertex of the respective test pattern, w is the width of the light receiving element, d is a width of the interval between the light receiving elements, m is a margin that compensates to consider when the edge of each test pattern covers one light receiving element or the interval, f is a number of counts counted during an entering of the test pattern from the first entering of a vertex of the test pattern till the last entering of the other vertex of the test pattern, V is a moving speed of each test pattern, and T is a detecting period of the light receiving element.

14. The method of the color registration of claim 10, wherein the plurality of light receiving elements are separated from their adjacent light receiving elements by a predetermined interval, and determining the sizes of the respective test patterns further comprises determining the position of at least one vertex of a leading edge of the respective test pattern within an interval between the adjacent light receiving elements when the at least one vertex of the respective test pattern enters the interval between the adjacent light receiving elements.

15. The method of the color registration of claim 14, wherein determining the position of at least one vertex of a leading edge of the respective test patterns within an interval between the adjacent light receiving elements comprises:

storing a relationship of a skew quantity and an output pattern of a transition of an output of the light receiving elements in a lookup table;
periodically storing sensed output values of the light receiving elements;
determining the skew quantity using the sensed output values of the light receiving elements and the relationship stored in the lookup table;
calculating a first line extending along the leading edge of each test pattern and a second line extending along a side edge of each test pattern; and
calculating the position of the at least one vertex of the leading edge of each test pattern from an intersection point of the first line and the second line.

16. The method of the color registration of claim 10, wherein determining the skew quantities of the respective test patterns comprises for each test pattern:
storing a count counted from a time when the test pattern is first detected until two opposite side edges of the test pattern is detected;
deciding whether the test pattern is skewed according to which light receiving element among the plurality of light receiving elements first detects the respective test patterns;
storing index values of the light receiving elements disposed at locations which first meet the first two vertexes of the test pattern; and
calculating the skew quantity based on the count and the stored index values.

17. The method of the color registration of claim 16, wherein, the skew quantities are determined in accordance with the following equations:

$$\text{Skew quantity} = \arctan(Y/X)$$

$$X = \text{ABS}(i\_cw - i\_ccw) \times (w+d) + m$$

$$Y = f \times V \times T$$

where, for the respective test pattern, ABS means absolute value of, i_cw is an index number of the light receiving element disposed at a location which first meets a vertex of the test pattern and i_ccw is an index number of the light receiving element disposed at a location which meets the opposite vertex of the test pattern, w is the width of the light receiving element, d is a width of the interval between the light receiving elements, m is a margin that compensates to consider when the edges of the respective test patterns cover one light receiving element or the interval, f is a number of counts counted during an entering of the test pattern from the first entering of a vertex of the test pattern till the last entering of the other vertex of the test pattern, V is a moving speed of the respective test patterns, and T is a detecting period of the light receiving element.

18. The method of the color registration of claim 17, wherein determining the skew quantities of the respective test patterns further comprises:
determining whether the skew quantities continue to change while continuing to transfer the respective test patterns; and
estimating the skew quantities at a predetermined target location if the skew quantities are determined to continue to change.

19. The method of the color registration of claim 10, wherein determining the shift quantities of the respective test patterns comprises:
determining which light receiving elements among the plurality of the light receiving elements are located at left and right portions of the leading edge of the respective test pattern.

20. The method of the color registration of claim 19, the shift quantities satisfies following equation:

$$\text{shift quantity} = [(i\_cw + i\_ccw)/2 - i\_cnt] \times (w+d) + m$$

where, for the respective test pattern, ABS means absolute value of, i_cw is an index number of the light receiving element disposed at a location which first meets a vertex of the test pattern and i_ccw is an index number of the light receiving element disposed at a location which meets the opposite vertex of the test pattern, w is the width of each light receiving element, d is the width of an interval between each light receiving element, m is a margin and i_cnt is an index number of the light receiving element expected to be located at the center of the light receiving element.

21. The method of the color registration of claim 20, wherein determining the shift quantities of the respective test patterns further comprises, for a respective test pattern:
determining whether the shift quantity continues to change while transferring the respective test patterns; and
calculating the shift quantity at a predetermined target location if the shift quantity of the respective test pattern is determined to continue to change.

22. An image forming apparatus that independently forms images of predetermined respective colors and forms a color image by overlapping the images of respective colors, comprising:
an image forming unit to form respective test patterns for each color image on an image transfer path proportional to a corresponding format of a fed printing medium where the color image will be transferred; and
a color registration apparatus to independently form images of predetermined respective colors and to compensate a mis-registration between overlapped images of respective colors, including a detecting unit to detect a contour form and position information of respective test patterns for each color image formed on the image transfer path, and
a controller to compensate a mis-registration between overlapped images of respective colors based on data detected by the detecting unit,
wherein each test pattern comprises a first edge corresponding to a top edge part of the printing medium and a second edge corresponding to a side edge of the printing medium.

23. The image forming apparatus of claim 22, wherein the detecting unit comprises:
a light source to radiate a light; and
a plurality of light receiving elements aligned to have a length larger than a maximum width of the printing medium permitted by the image forming apparatus, the plurality of light receiving elements extending across the image transfer path in a width direction of the test patterns; and
wherein interference of each test pattern is detected by the plurality of light receiving elements to determine a contour form, a skew quantity and a shift quantity of the test patterns.

24. The image forming apparatus of claim 23, wherein the plurality of light receiving elements have a same size with each other and are separated from each other by a constant interval.

25. The image forming apparatus of claim 23, wherein the plurality of light receiving elements have a same size with each other and are separated from each other by a constant interval.

26. The image forming apparatus of claim 22, further comprising a discriminating unit to discriminate whether there is a mis-registration and an extent of the mis-registration based on data detected by the detecting unit.

27. The image forming apparatus of claim 26, wherein the discriminating unit comprises:
   a memory to store the contour form information of respective test patterns; and
   a counter to calculate a transfer time between the respective test patterns;
   wherein the discriminating unit determines the color registration between the respective test patterns through comparing information of the respective test patterns detected by the detecting unit and the counter and information of the respective test patterns stored in the memory.

28. The image forming apparatus of claim 27, wherein each test pattern comprises:
   a first test pattern corresponding to a leading edge and opposites side edges at the leading edge of the printing medium; and
   a second test pattern corresponding to a trailing edge and opposites side edges at the trailing edge of the printing medium.

29. The image forming apparatus of claim 22, further comprises a user interface unit to inform a user whether sizes of the respective test patterns accord with preset formats.

30. A method of creating an image by an image forming apparatus that independently forms images of predetermined respective colors and forms a color image by overlapping the images of respective colors, the method comprising:
   forming respective test patterns for each color image on an image transfer path proportional to a corresponding format of a printing medium where the color image will be transferred;
   detecting contour form information of each test pattern;
   creating an image having color registration compensated based on the detected contour form information of the fed printing medium,
   wherein the detecting of the contour form information of each test pattern comprises:
   radiating a light;
   receiving the radiated light by a plurality of light receiving elements which are aligned to have a length longer than a maximum permitted width of the printing medium permitted by the image forming apparatus, the plurality of light receiving elements extending across an image transfer path of the printing medium;
   at predetermined times during an existence of the respective test patterns, outputting a signal corresponding to the radiated light received by the plurality of light receiving elements; and
   recognizing the contour form information of the respective test patterns using the output signal.

31. The method of image outputting of the image forming apparatus of claim 30, further comprising determining whether there is a mis-registration and an extent of the mis-registration based on the contour form of the respective test patterns.

32. The method of image outputting of the image forming apparatus of claim 31, wherein the determining whether there is a mis-registration comprises
   determining the sizes of the respective test patterns;
   determining the skew quantities of the respective test patterns; and
   determining the shift quantities of the respective test patterns.

33. The method of image outputting of the image forming apparatus of claim 32, wherein the determining the sizes of the respective test patterns comprises:
   calculating widths of the respective test patterns using an arithmetic operation having as variables a pass time of the respective test patterns, a location of individual light receiving elements of the detecting unit and a predetermined speed of the image transfer path.

34. The method of image outputting of the image forming apparatus of claim 33, wherein the determining the sizes of the respective test patterns comprises:
   determining a moving direction of the respective test patterns;
   calculating widths of the respective test patterns from the output signal; and
   wherein the method further comprises comparing the determined size of the text pattern with an expected size.

35. The method of image outputting of the image forming apparatus of claim 34, wherein the calculating the widths of the respective test patterns with the output signal satisfies following equation:

$$P_{width} = \sqrt{X^2 + Y^2}$$

$$X = ABS(i\_cw - i\_ccw) \times (w + d) + m$$

$$Y = f \times V \times T$$

where, for the respective test pattern, ABS means absolute value of, i_cw is an index number of the light receiving element disposed at a location which first meets a vertex of the test pattern and i_ccw is an index number of the light receiving element disposed at a location which meets an opposite vertex of the respective test pattern, w is the width of the light receiving element, d is a width of the interval between the light receiving elements, m is a margin that compensates to consider when the edge of each test pattern covers one light receiving element or the interval, f is a number of counts counted during an entering of the test pattern from the first entering of a vertex of the test pattern till the last entering of the other vertex of the test pattern, V is a moving speed of each test pattern, and T is a detecting period of the light receiving element.

36. The method of image outputting of the image forming apparatus of claim 32, wherein the plurality of light receiving elements are separated from their adjacent light receiving elements by a predetermined interval, and
   determining the sizes of the respective test patterns further comprises determining the position of at least one vertex of a leading edge of the respective test pattern within an interval between the adjacent light receiving elements when the at least one vertex of the respective test pattern enters the interval between the adjacent light receiving elements.

37. The method of image outputting of the image forming apparatus of claim 36, wherein the determining the position of at least one vertex of a leading edge of the respective test pattern within an interval between the adjacent light receiving elements comprises:
   storing a relationship of a skew quantity and an output pattern of a transition an output of the light receiving elements in a lookup table;

periodically storing sensed output values of the light receiving elements;

determining the skew quantity using the sensed output values of the light receiving elements and the relationship stored in the lookup table;

calculating a first line extending along the leading edge of each test pattern and a second line extending along a side edge of each test pattern; and calculating the position of the at least one vertex of the leading edge of each test pattern from an intersection point of the first line and the second line.

38. The method of image outputting of the image forming apparatus of claim 32, wherein determining the skew quantities of the respective test patterns comprises for each test pattern:

storing a count counted from a time when the test pattern is first detected until two opposite side edges of the test pattern is detected;

deciding whether the test pattern is skewed according to which light receiving element among the plurality of light receiving elements first detects the respective test patterns;

storing index values of the light receiving elements disposed at locations which first meet the first two vertexes of the test pattern; and calculating the skew quantity based on the count and the stored index values.

39. The method of image outputting of the image forming apparatus of claim 38, the skew quantities satisfy following equations:

$$\text{Skew quantity} = \arctan(Y/X)$$

$$X = \text{ABS}(i\_cw - i\_ccw) \times (w+d) + m$$

$$Y = f \times V \times T$$

where, for the respective test pattern, ABS means absolute value of, i_cw is an index number of the light receiving element disposed at a location which first meets a vertex of the respective test pattern and i_ccw is an index number of the light receiving element disposed at a location which meets the opposite vertex of the test pattern, w is the width of the light receiving element, d is the width of the interval between the light receiving elements, m is a margin that compensates to consider when the edges of the respective test patterns cover one light receiving element or the interval, f is a number of counts counted during an entering of the test pattern from the first entering of a vertex of the test pattern till the last entering of the other vertex of the test pattern, V is a moving speed of the respective test patterns, and T is a detecting period of the light receiving element.

40. The method of image outputting of the image forming apparatus of claim 39, wherein the determining the skew quantities of the respective test patterns further comprises:

discerning whether the skew quantities continue to change while continuing to transfer the respective test patterns; and estimating the skew quantities at a predetermined target location if the skew quantities are determined to continue to change.

41. The method of image outputting of the image forming apparatus of claim 32, wherein determining the shift quantities of the respective test patterns comprises, for a respective test pattern:

determining which light receiving elements among the plurality of the light receiving elements are located at left and right portions of the leading edge of the respective test pattern.

42. The method of image outputting of the image forming apparatus of claim 41, the shift quantities satisfies following equation:

$$\text{shift quantity} = [(i\_cw + i\_ccw)/2 - i\_cnt] \times (w+d) + m$$

where, for the respective test pattern, ABS means absolute value of, i_cw is an index number of the light receiving element disposed at a location which first meets a vertex of the test pattern and i_ccw is an index number of the light receiving element disposed at a location which meets the opposite vertex of the test pattern, w is the width of each light receiving element, d is the width of an interval between each light receiving element, m is a margin and i_cnt is an index number of the light receiving element expected to be located at the center of the light receiving element.

43. The method of image outputting of the image forming apparatus of claim 42, wherein determining the shift quantities of the respective test patterns further comprises, for a respective test pattern:

determining whether the shift quantity continues to change while transferring the respective test patterns; and calculating the shift quantity at a predetermined target location if the shift quantity is determined to continue to change.

* * * * *